United States Patent
Takahashi

(10) Patent No.: US 12,512,716 B2
(45) Date of Patent: Dec. 30, 2025

(54) ROTARY ELECTRIC MACHINE

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 305 days.

(21) Appl. No.: 18/309,742

(22) Filed: Apr. 28, 2023

(65) Prior Publication Data

US 2023/0283137 A1     Sep. 7, 2023

Related U.S. Application Data

(63) Continuation of application No. PCT/JP2021/039643, filed on Oct. 27, 2021.

(30) Foreign Application Priority Data

Nov. 2, 2020    (JP) ................................ 2020-183988

(51) Int. Cl.
     *H02K 3/47*        (2006.01)

(52) U.S. Cl.
     CPC ...................................... *H02K 3/47* (2013.01)

(58) Field of Classification Search
     None
     See application file for complete search history.

(56) References Cited

U.S. PATENT DOCUMENTS

| | | | | |
|---|---|---|---|---|
| 2020/0161939 A1* | 5/2020 | Takahashi | ............... | H02K 17/16 |
| 2020/0162003 A1* | 5/2020 | Takahashi | ............... | H02K 1/187 |
| 2020/0328639 A1* | 10/2020 | Takahashi | ............... | H02K 21/22 |
| 2020/0336033 A1* | 10/2020 | Takahashi | ............... | H02P 21/22 |

(Continued)

FOREIGN PATENT DOCUMENTS

| | | |
|---|---|---|
| JP | S50-161602 A | 12/1975 |
| JP | S54125404 A | 9/1979 |

(Continued)

OTHER PUBLICATIONS

WO-2019131913-A1 Machine Translation (Year: 2019).*

(Continued)

*Primary Examiner* — Oluseye Iwarere
*Assistant Examiner* — Masoud Vaziri
(74) *Attorney, Agent, or Firm* — Maschoff Brennan

(57) ABSTRACT

A field element includes magnetic poles having polarities alternate in a circumferential direction. A multi-phase armature winding includes a phase winding including winding segments for each phase. An armature is tooth-less and includes a cylindrical armature core. The winding segment includes a pair of intermediate conductor portions at a predetermined interval in the circumferential direction and link portions connecting the intermediate conductor portions in an annular shape. The intermediate conductor portions and the link portion include multi-wound conductive wire members. The intermediate conductor portions are disposed side by side along a curved surface on a peripheral surface of the armature core. The intermediate conductor portion has a rectangular transverse section. A dimension between the end surface of the intermediate conductor portion on the armature core side and the armature core in the radial direction differ in the circumferential direction.

8 Claims, 65 Drawing Sheets

(56) References Cited

U.S. PATENT DOCUMENTS

| | | | |
|---|---|---|---|
| 2022/0006356 A1 | 1/2022 | Takahashi et al. | |
| 2022/0006357 A1 | 1/2022 | Takahashi et al. | |
| 2022/0006358 A1 | 1/2022 | Takahashi et al. | |
| 2022/0014074 A1 | 1/2022 | Takahashi et al. | |
| 2022/0014075 A1 | 1/2022 | Takahashi et al. | |
| 2022/0045578 A1 | 2/2022 | Takahashi et al. | |
| 2022/0181935 A1* | 6/2022 | Tamura | H02K 3/28 |
| 2023/0039361 A1* | 2/2023 | Mawatari | H02K 3/34 |
| 2023/0078039 A1* | 3/2023 | Iwase | H02K 5/203 |
| | | | 310/180 |
| 2023/0299625 A1 | 9/2023 | Tsuchiya et al. | |

FOREIGN PATENT DOCUMENTS

| | | | | |
|---|---|---|---|---|
| JP | 2003-319597 A | 11/2003 | | |
| JP | 2019-122230 A | 7/2019 | | |
| JP | 2020-178491 A | 10/2020 | | |
| WO | WO-2019131913 A1 * | 7/2019 | | H02K 3/34 |
| WO | 2020/175222 A1 | 9/2020 | | |

OTHER PUBLICATIONS

U.S. Appl. No. 18/458,629, filed Aug. 30, 2023, titled "Rotary Electric Machine and Method for Controlling Rotary Electric Machine"; 112 pages.

U.S. Appl. No. 18/458,611, filed Aug. 30, 2023, titled "Rotary Electric Machine"; 148 pages.

* cited by examiner

COMPARATIVE EXAMPLE

FIG. 19
(a)
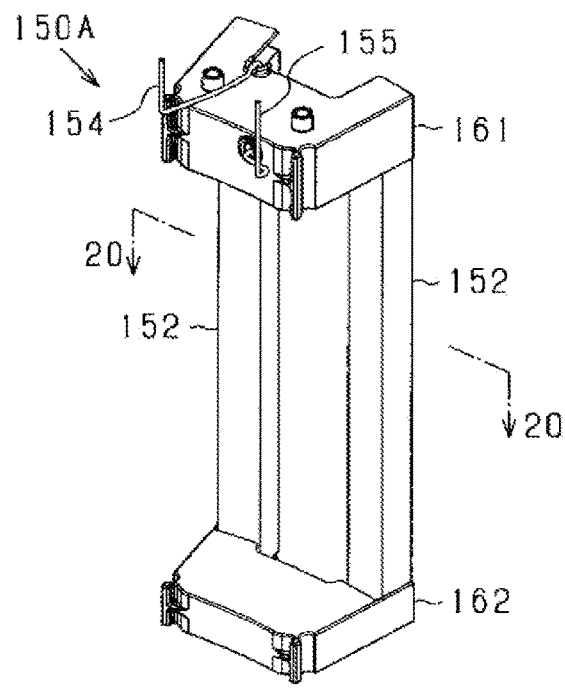
(b)
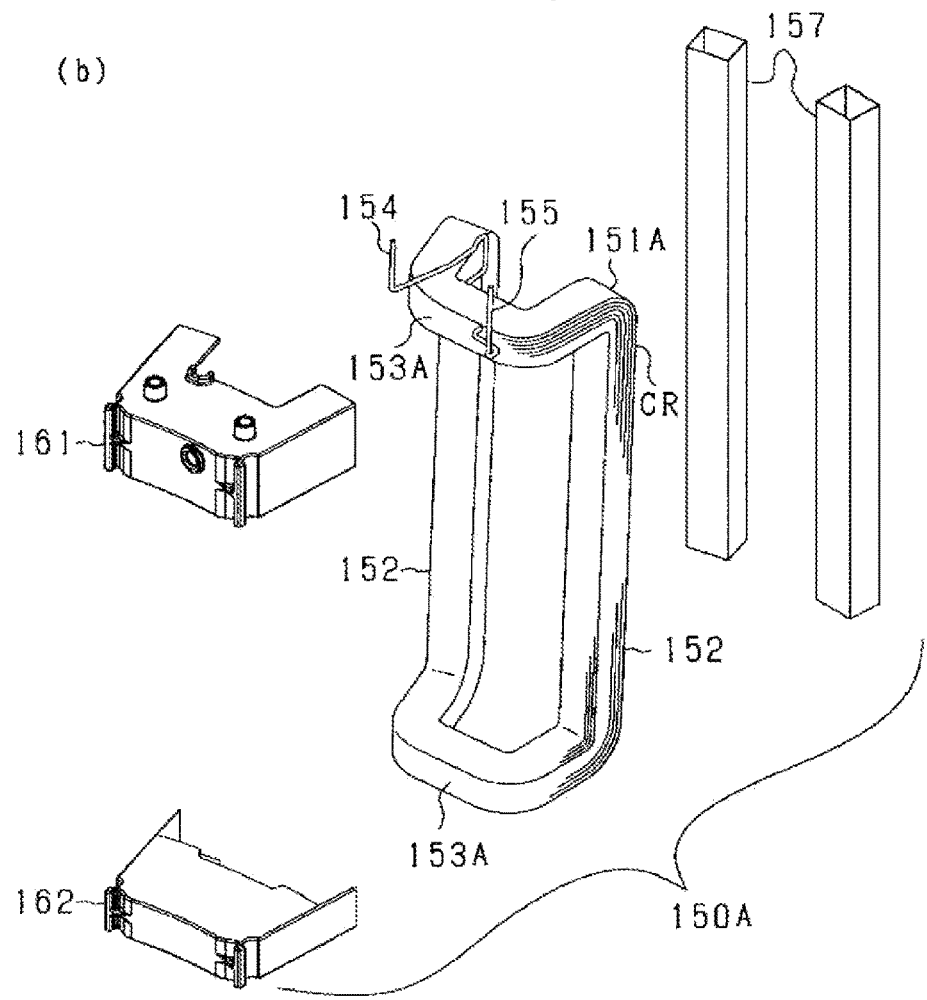

FIG. 21
(a)
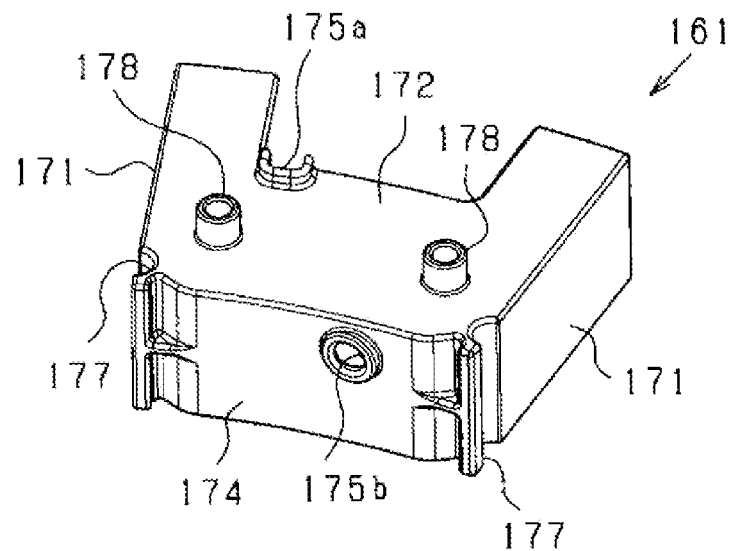
(b)
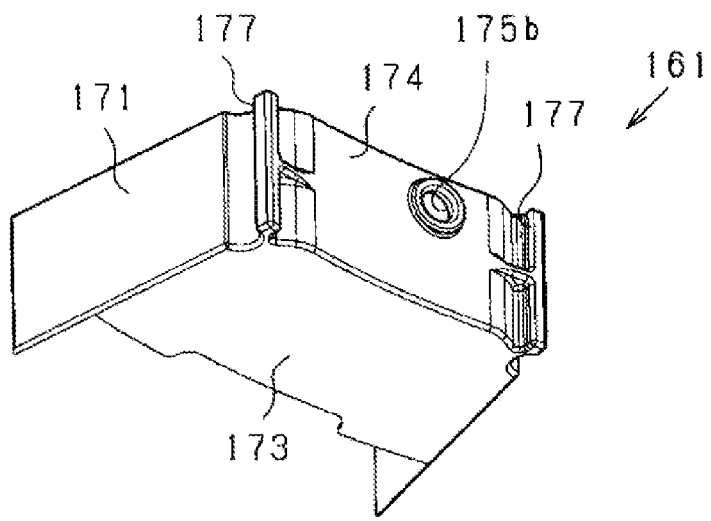

FIG. 22
(a)
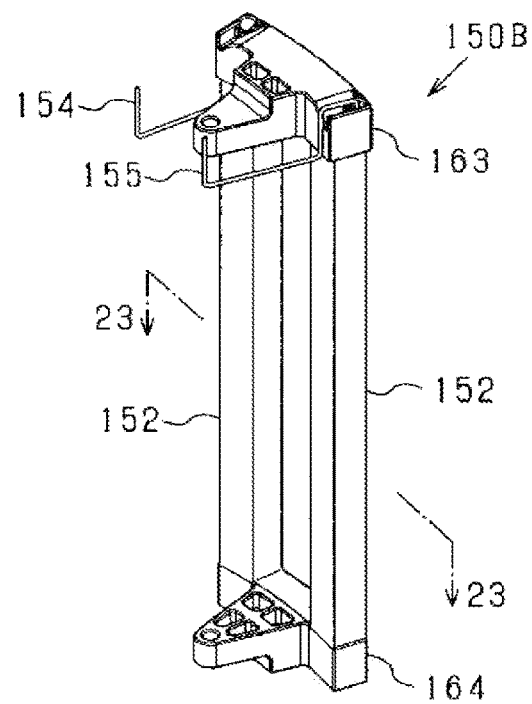
(b)
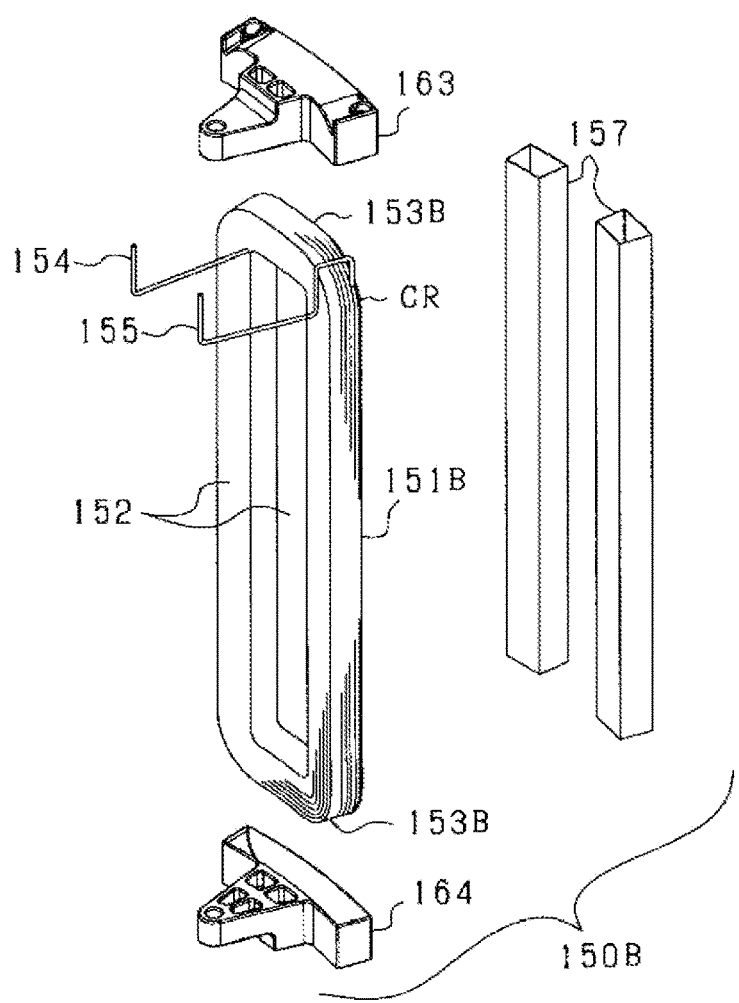

FIG. 24
(a)
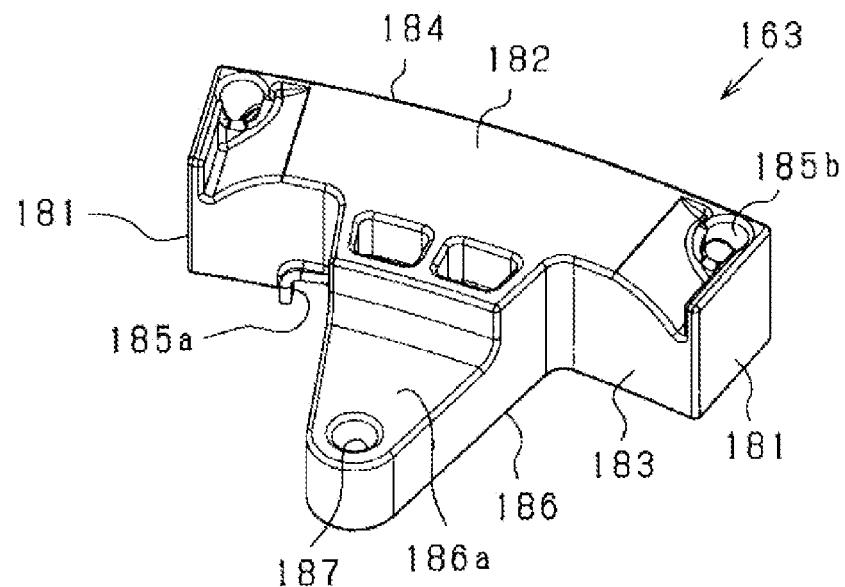
(b)
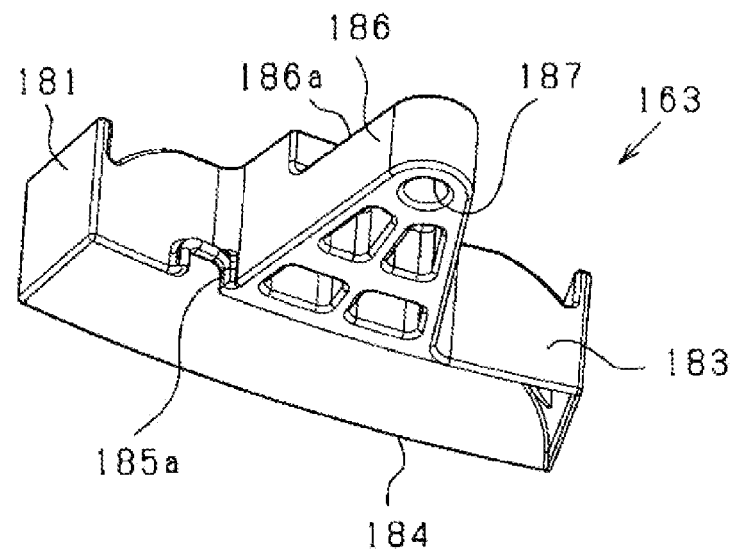

FIG. 39
(a)
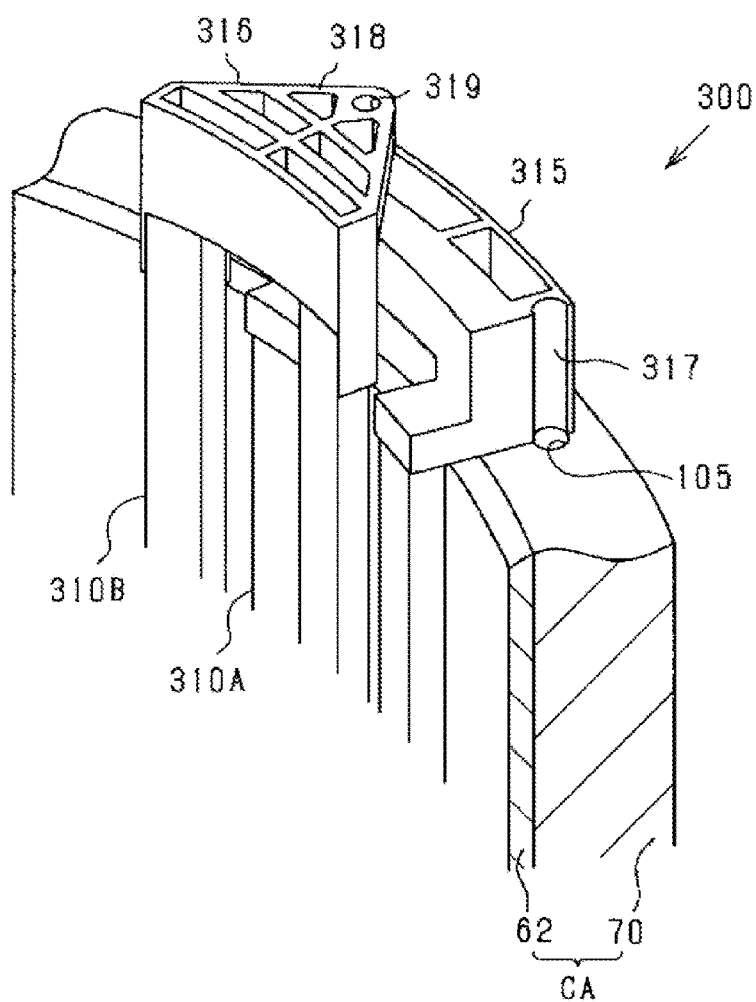
(b)
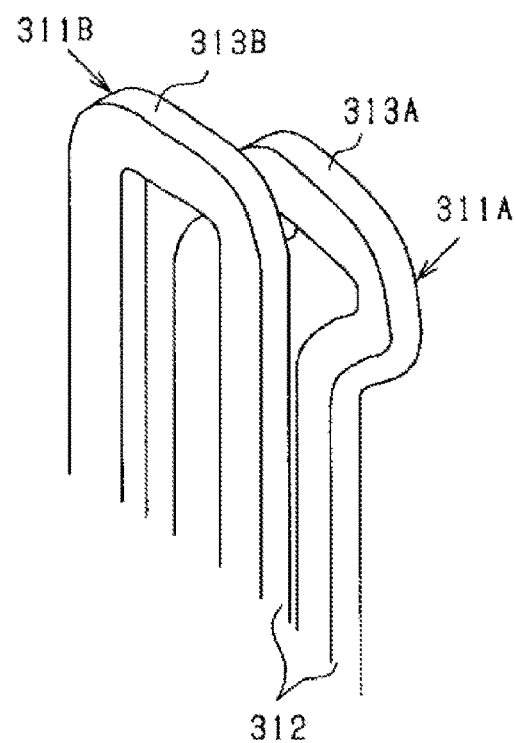

FIG. 63
(a)
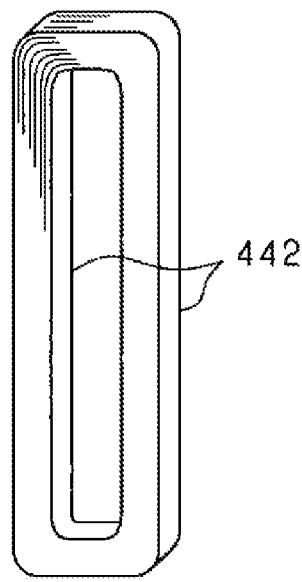
(b)
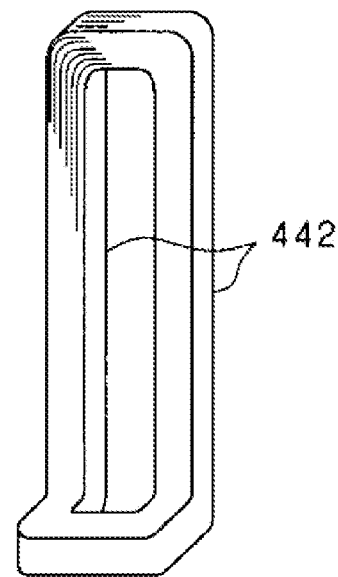
(c)
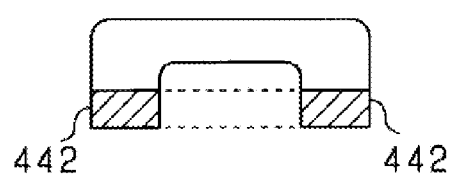
(d)
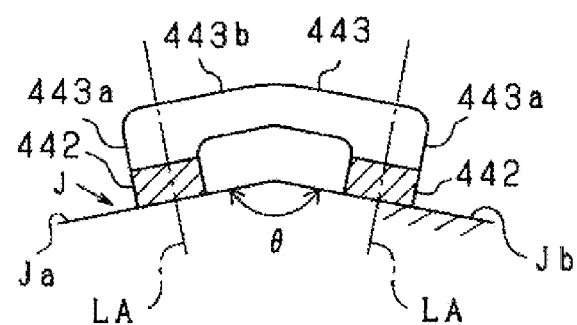
(e)
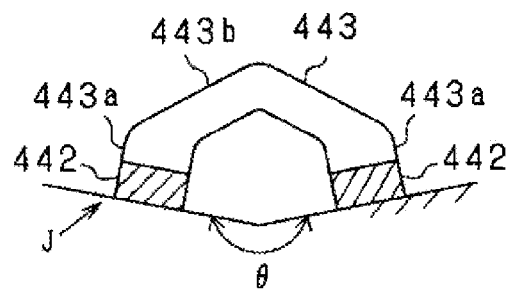

FIG. 65
(a)
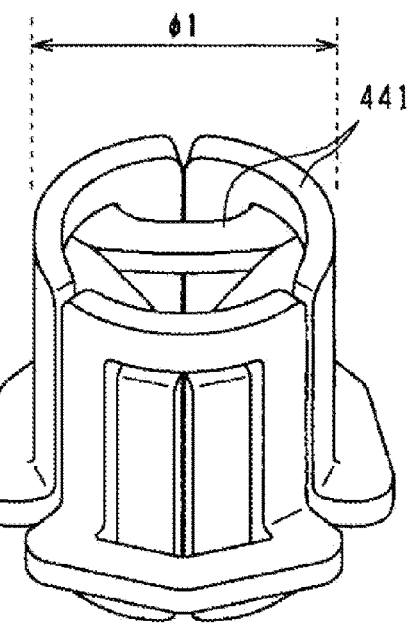
(b)
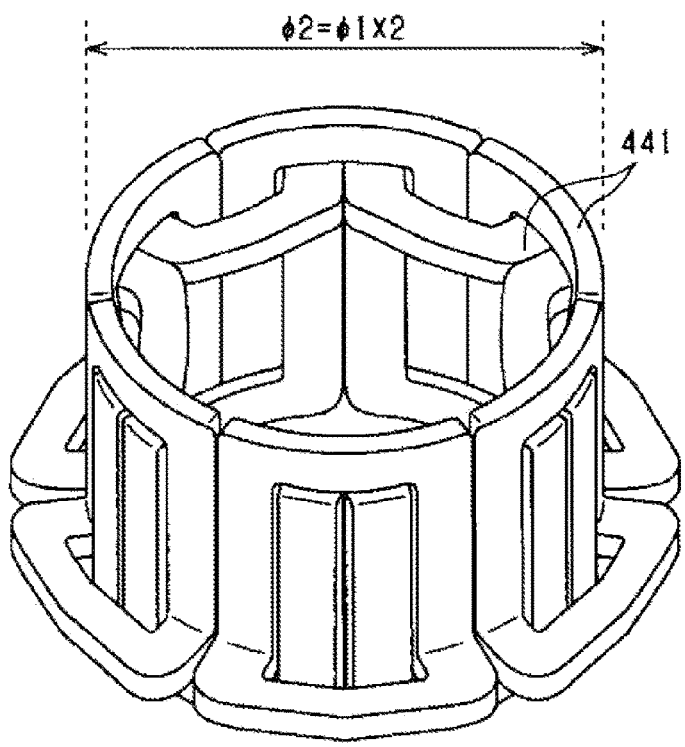

FIG. 69
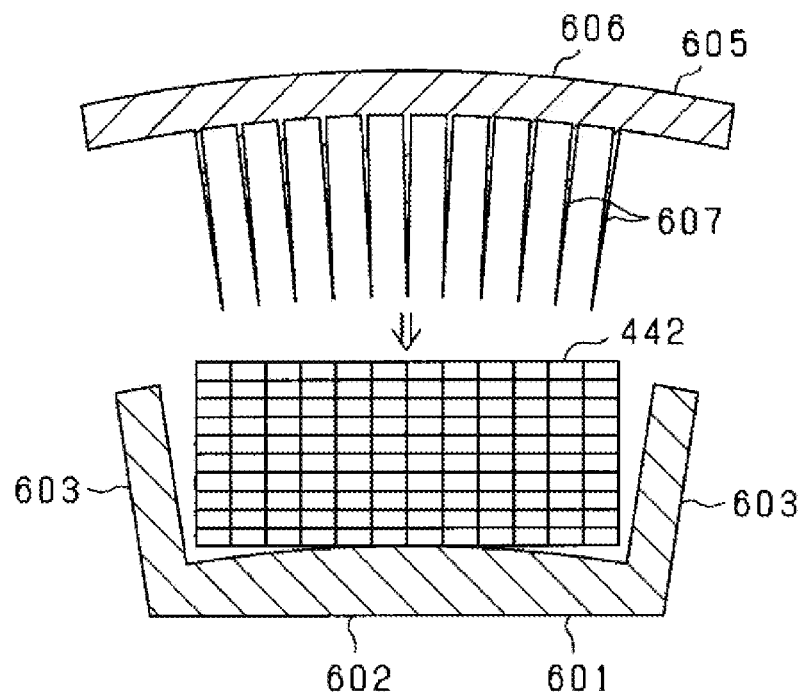
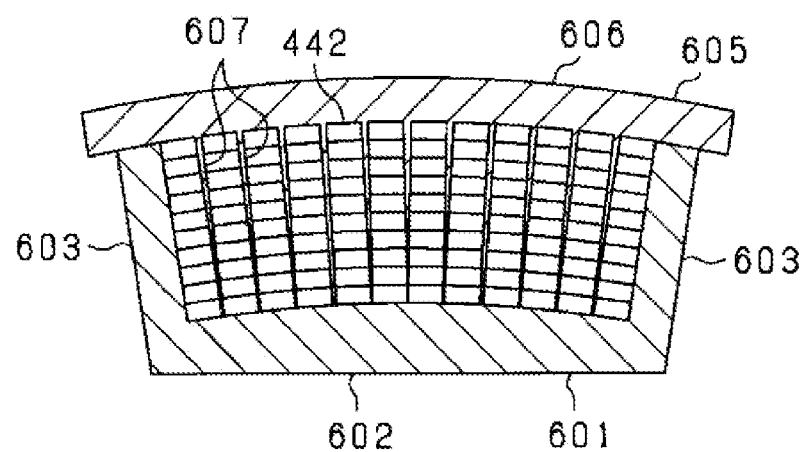

FIG. 71
(a)
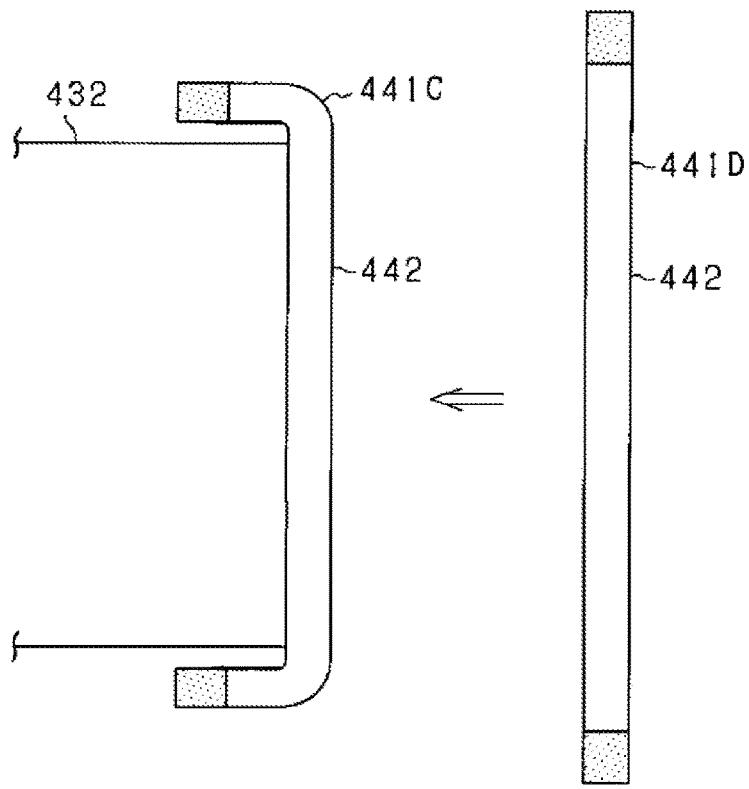
(b)
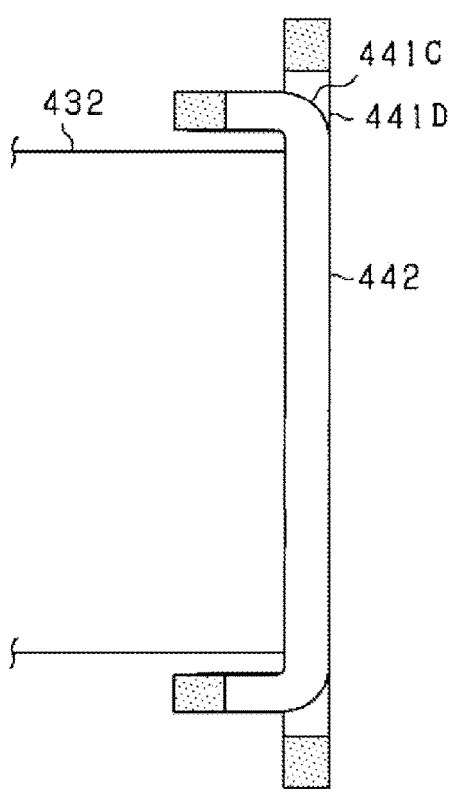

ROTARY ELECTRIC MACHINE

CROSS REFERENCE TO RELATED APPLICATION

The present application is a continuation application of International Patent Application No. PCT/JP2021/039643 filed on Oct. 27, 2021, which designated the U.S. and claims the benefit of priority from Japanese Patent Application No. 2020-183988 filed on Nov. 2, 2020. The entire disclosures of all of the above applications are incorporated herein by reference.

TECHNICAL FIELD

The disclosure in this specification relates to a rotary electric machine.

BACKGROUND

A conventionally known rotary electric machine includes a rotor having a electromagnetic structure.

SUMMARY

According to an aspect, a rotary electric machine includes a field element having a plurality of magnetic poles having polarities that are alternate in a circumferential direction and an armature including an armature winding and an armature core, the armature winding being multi-phase and including a phase winding including a plurality of winding segments for each phase.

BRIEF DESCRIPTION OF THE DRAWINGS

The foregoing and other objects, features, and beneficial advantages of the present disclosure will become more apparent from the following detailed description with reference to the accompanying drawings. The drawings include:

FIG. 19 is a set of views illustrating a configuration of the first coil module;

FIG. 21 is a perspective view illustrating a configuration of an insulating cover;

FIG. 22 is a view illustrating a configuration of the second coil module;

FIG. 24 is a perspective view illustrating a configuration of the insulating cover;

FIG. 39 is a view illustrating a configuration of the stator unit having an inner rotor structure;

FIG. 63 is a view for explaining a method of manufacturing the winding segment;

FIG. 65 is a set of views including (a) a perspective view illustrating a stator winding in the case of four poles, and (b) a perspective view illustrating the stator winding in the case of eight poles;

FIG. 69 is a view for explaining a method of manufacturing the winding segment;

FIG. 71 is a front view illustrating a state where the winding segments are assembled to the stator core.

DETAILED DESCRIPTION

Figure 1:
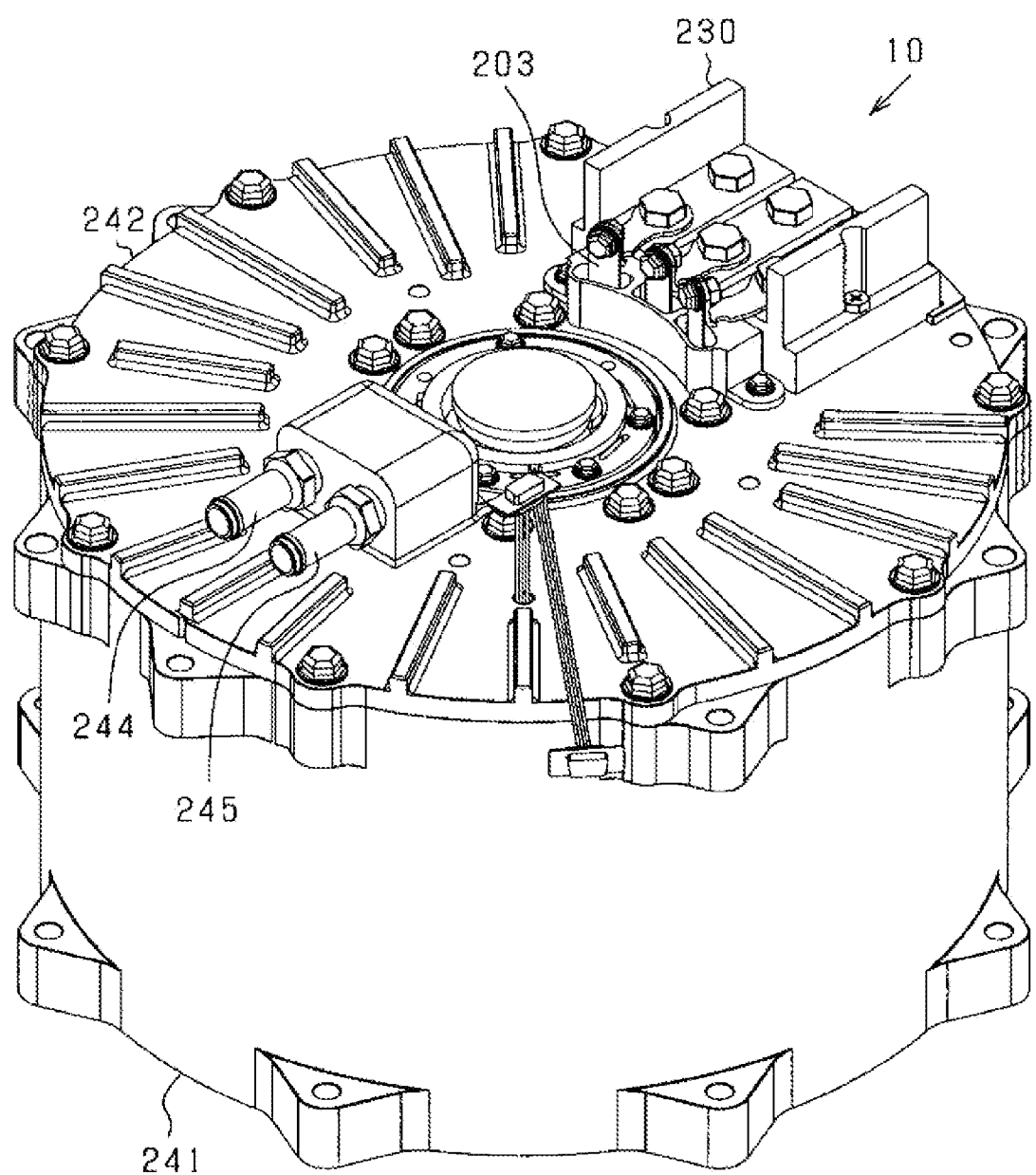
FIG. 1 is a perspective view illustrating an entire rotary electric machine according to a first embodiment.

Hereinafter, examples of the present disclosure will be described.

According to an example of the present disclosure, a rotary electric machine includes a field element having a plurality of magnetic poles having polarities alternate in a circumferential direction, and an armature having a multi-phase armature winding. Additionally, the armature includes an armature core having a tooth-less structure that does not include a tooth, and is configured so as to assemble an armature winding with respect to the armature core.

In an armature having a tooth-less structure, an armature winding is disposed along an outer peripheral surface or an inner peripheral surface of an armature core. In this case, in the coil side portion of the armature winding facing the armature core on the inner side and outer side in the radial direction, the following configuration is conceivable. That is, the transverse section of the winding for each phase is formed in a quadrangular shape. Further, the winding end surface on the armature core side is formed in an arc shape in accordance with the curved surface on the outer peripheral surface or the inner peripheral surface of the armature core. However, there seems to be room for improvement from the viewpoint of heat dissipation of the armature winding in the existing technique for a configuration in which the facing surfaces of the intermediate conductor portion and the armature core are brought into close contact with each other in the form of curved surfaces.

According to a first example, a rotary electric machine comprises:

a field element having a plurality of magnetic poles having polarities that are alternate in a circumferential direction; and an armature including an armature winding and an armature core, the armature winding being multi-phase and including a phase winding including a plurality of winding segments for each phase, the armature core being tooth-less, in a cylindrical shape, and opposed to the field element in a radial direction of the armature winding.

The field element and the armature face each other in the radial direction. Each of the winding segments includes a pair of intermediate conductor portions and link portions. The pair of intermediate conductor portions are provided at a predetermined interval in the circumferential direction. The link portions are provided on one end side and an other end side of the pair of intermediate conductor portions in an axial direction, in an annular shape, and connect the pair of intermediate conductor portions. The pair of intermediate conductor portions and the link portions include a conductive wire member that is multi-wound. The pair of intermediate conductor portions are provided side by side along a curved surface of an outer peripheral surface of the armature core or a curved surface of an inner peripheral surface of the armature core. Each of the pair of intermediate conductor portions has a rectangular transverse section. A dimension between an end surface of the intermediate conductor portion, which is on a side of the armature core in the radial direction, and the armature core in the radial direction differs in the circumferential direction.

In the rotary electric machine of this means, the armature has a tooth-less structure, and a plurality of winding segments constituting the armature winding are assembled on the inner side or the outer side of a cylindrical armature core in the radial direction. The winding segments are disposed side by side in a circumferential direction along an outer peripheral surface or an inner peripheral surface of the armature core. The transverse section of the intermediate conductor portion is rectangular, and the dimensions in the radial direction between the intermediate conductor portion and the armature core differ in the circumferential direction at the end surface in the radial direction on the armature core side. With this configuration, heat dissipating ability required for the rotary electric machine can be improved. That is, in the above-described configuration, the dimensions in the radial direction between the intermediate conductor portion and the armature core differ in the circumferential direction. In other words, the end surface of the intermediate conductor portion in the radial direction includes a portion close to the armature core and a portion far from the armature core. In this case, the winding segments can be assembled in a state of being close to the armature core that is the back yoke in the armature having a tooth-less structure. At the same time, a heat dissipation portion that dissipates heat generated in the winding segments between the intermediate conductor portion and the armature core can be secured. As a result, in the rotary electric machine including the armature having a tooth-less structure, heat in the armature can be appropriately dissipated.

Consideration is made on the configuration in which the intermediate conductor portion having a rectangular transverse section is disposed on the curved surface of the armature core. If the sizes of the winding segments are equal to each other, the smaller the radius (core radius) of the curved surface of the armature core, in other words, the larger the curvature of the curved surface, the larger the difference in dimension in the radial direction between the intermediate conductor portion and the armature core (the difference in dimension in the radial direction between the central portion in the circumferential direction and both ends in the circumferential direction). For example, in a rotary electric machine in which the core radius of the armature is small and the number of magnetic poles is small, that is, in a rotary electric machine in which the number of winding segments is small, a difference in dimension in the radial direction between the intermediate conductor portion and the armature core becomes significant. In this case, the armature having a small core radius is considered to have a smaller heat capacity than the armature having a large core radius. However, the difference in dimension in the radial direction between the intermediate conductor portion and the armature core is increased, so that heat dissipation can be improved.

In a second example, according to a first example, the end surface of the intermediate conductor portion, which is on the side of the armature core in the radial direction, is orthogonal to a straight line, which passes through a center position of the intermediate conductor portion in the circumferential direction and an axial center of the rotary electric machine. A dimension, which is between a central portion of the end surface in the circumferential direction and the armature core in the radial direction, differs from a dimension, which is between each of ends of the end surface in the circumferential direction and the armature core in the radial direction.

In the above-described configuration, the end surface in the radial direction of each intermediate conductor portion is in the direction orthogonal to the straight line passing through the center position in the circumferential direction of the intermediate conductor portion and the axial center of the rotary electric machine. Accordingly, the dimensions in the radial direction differ between the central portion in the circumferential direction and both ends in the circumferential direction between the intermediate conductor portion and the armature core. Specifically, in the configuration in which the armature winding is disposed on the outer side of the armature core in the radial direction (e.g., outer rotor type rotary electric machine), the dimension in the radial direction is larger at both ends in the circumferential direction than at the central portion in the circumferential direction. On the other hand, in the configuration in which the armature windings are disposed on the inner side of the armature core in the radial direction (e.g., inner rotor type rotary electric machine), the dimension in the radial direction is larger at the central portion in the circumferential direction than at both ends in the circumferential direction. In this case, in the armature winding, the intermediate conductor portions arranged along the curved surface of the armature core can be disposed in the same state with respect to the armature core.

In a third example, according to the first example or the second example, a sealing member having an insulation property is interposed between the armature core and the end surface of the intermediate conductor portion in the radial direction. A thermal conductivity of the sealing member is higher than a thermal conductivity of an insulating film of the conductive wire member.

In the above-described configuration, a sealing member having an insulation property is interposed between the end surface in the radial direction of each intermediate conductor portion and the armature core. With this arrangement, heat can be dissipated through the sealing member and the intermediate conductor portion can be fixed by using the sealing member. In addition, since the thermal conductivity of the sealing member is made higher than the thermal conductivity of the insulating film of the conductive wire member, the heat dissipating ability of each winding segment is improved.

In a fourth example, according to any one of the first example to the third example, the winding segments include an inner bent winding in which at least one of the link portions at both ends in the axial direction is bent inward in the radial direction. In the inner bent winding, each of the link portions includes a pair of base end portions extending in the radial direction and a connecting portion extending in the circumferential direction between the pair of base end portions. A central portion of the connecting portion is curved to protrude outward in the radial direction or to protrude in the axial direction.

In the configuration including the inner bent winding in which the link portion is bent inward in the radial direction as the winding segment, when the inner bent windings are adjacent to each other in the circumferential direction, interference between the link portions of the respective inner bent windings is considered to easily occur. In this regard, in the link portion of the inner bent winding, the connecting portion extending in the circumferential direction between the pair of base end portions is curved such that the central portion thereof protrudes outward in the radial direction or protrudes in the axial direction. With this configuration, the link portions of the respective inner bent winding can be prevented from interfering with each other in the circumferential direction. In addition, the connecting portion extending in the circumferential direction is curved in the link portion. The curved portion serves as an interval adjusting portion that adjusts an interval between the extending ends of the pair of base end portions. Thus, the curved portion contributes to preventing the link portions in the circumferential direction from interfering with each other. In this case, in particular, since the connecting portion is curved so as to protrude outward in the radial direction or protrude in the axial direction, an available space on the inner side of the armature in the radial direction can be expanded. Further, interference with the rotating shaft or the like of the rotary electric machine can be prevented by reducing the amount of protrusion toward the inner side in the radial direction.

According to a fifth example, a rotary electric machine comprises:
 a field element having a plurality of magnetic poles having polarities that are alternate in a circumferential direction; and
 an armature including an armature winding and an armature core, the armature winding being multi-phase and including a phase winding including a plurality of winding segments for each phase, the armature core being tooth-less, in a cylindrical shape, and opposed to the field element in a radial direction of the armature winding.

The field element and the armature face each other in the radial direction. Each of the winding segments includes a pair of intermediate conductor portions and link portions. The pair of intermediate conductor portions are provided at a predetermined interval in the circumferential direction. The link portions are provided on one end side and an other end side in an axial direction, in an annular shape, and connect the pair of intermediate conductor portions. The pair of intermediate conductor portions and the link portions include a conductive wire member that is multi-wound. In the pair of intermediate conductor portions, an interval between the conductive wire members arranged in the circumferential direction is wider on the outer side in the radial direction than on the inner side in the radial direction.

In the rotary electric machine of this means, the armature has a tooth-less structure, and a plurality of winding segments constituting the armature winding are assembled on the inner side or the outer side of a cylindrical armature core in the radial direction. The winding segments are disposed side by side in a circumferential direction along an outer peripheral surface or an inner peripheral surface of the armature core. In the intermediate conductor portion, the interval between the conductive wire members arranged in the circumferential direction is wider on the outer side in the radial direction than on the inner side in the radial direction. With this configuration, heat dissipating ability required for the rotary electric machine can be improved. That is, the above-described configuration has been made in view of the fact that the circumferential lengths of the armature winding between the inner side and the outer side in the radial direction. In the intermediate conductor portion, the conductive wire members on the inner side in the radial direction are densely arranged in the circumferential direction, whereas the conductive wire members on the outer side in the radial direction are coarsely arranged in the circumferential direction. With this configuration, the heat dissipation portion that releases the heat generated in each winding segment can be secured between the conductive wire members. As a result, in the rotary electric machine including the armature having a tooth-less structure, heat in the armature can be appropriately dissipated.

In a sixth example, according to the fifth example, in each of the winding segments, the conductive wire member is a square wire having a quadrangular section, and the square wire is multi-wound, such that side surfaces face each other in the radial direction and the circumferential direction. In each of the intermediate conductor portions, a plurality of the conductive wire members is arranged in each of the radial direction and the circumferential direction, the side surfaces of the square wire closely face each other in the radial direction, and the side surfaces of the square wire face each other in the circumferential direction more apart than in the radial direction.

In the above-described configuration, the side surfaces of the square wires closely face each other in the radial direction, and the side surfaces of the square wires face each other more apart in the circumferential direction than in the radial direction. Therefore, the thickness of the intermediate conductor portion in the radial direction is a predetermined thickness in accordance with the number of turns of the square wire (conductive wire member). Further, the widths of the intermediate conductor portion in the circumferential direction differ between the inner side and the outer side in the radial direction in accordance with the separation distance between the square wires. In this case, only the width dimension in the circumferential direction between the inner side and the outer side of the radial direction is adjusted while the thickness in the radial direction of the intermediate conductor portion is constant in the circumferential direction.

In a seventh example, according to the fifth example and the sixth example, a sealing member having an insulation property is interposed between the conductive wire members in each of the intermediate conductor portions. A thermal conductivity of the sealing member is higher than a thermal conductivity of an insulating film of the conductive wire member.

In the above-described configuration, a sealing member having an insulation property is interposed between the conductive wire members in the intermediate conductor portions. With this arrangement, heat can be dissipated through the sealing member and the conductive wire member can be fixed by using the sealing member. In addition, since the thermal conductivity of the sealing member is made higher than the thermal conductivity of the insulating film of the conductive wire member, the heat dissipating ability of each winding segment is improved.

In an eighth example, according to any one of the first example to the seventh example, the armature winding is a three-phase winding. In each of the winding segments, the pair of intermediate conductor portions are provided apart from each other at an interval of full pitch winding, one of intermediate conductor portions of the winding segment of an other of two phases and one of intermediate conductor portions of the winding segment of an other of the two phases are provided between the pair of intermediate conductor portions, and the link portion of at least one of two winding segments, in which the link portions overlap each other in the circumferential direction, is bent in the radial direction to avoid interference between the two winding segments. A fixing portion is provided on an inner side of a curved portion of the link portion, which is bent in the radial direction and extends in the radial direction, to fix the winding segment to the armature core or to an integrated object integrated with the armature core.

In the three-phase armature winding, one intermediate conductor portion for each of the winding segments of the other two phases is disposed between a pair of intermediate conductor portions in the winding segment. The link portion of at least one winding segment is bent in the radial direction between the winding segments in which the link portions overlap each other in the circumferential direction, so that the intermediate conductor portions can be disposed side by side in the circumferential direction along the circumferential surface of the armature core while avoiding mutual interference of the winding segments. In addition, in view of the configuration in which the link portion is bent in the radial direction, the winding segment is fixed to the armature core or an integrated object thereof on the inner side of the curved portion of the link portion, so that the winding segment can be suitably fixed in the armature having a tooth-less structure.

In a ninth example, according to the first example to the eighth example, the field element is of a surface permanent magnet type and includes magnets whose number corresponds to a number of poles in the circumferential direction. The diameter of the armature winding is "φ40 mm to φ100 mm"×n, where a number of the magnetic poles of the rotary electric machine is 4n, a number of the winding segments is 6n, and n is a natural number.

In the surface permanent magnetic rotary electric machine, magnets whose number corresponds to the number of poles are disposed side by side in the circumferential direction in the field element. The specification of the magnet for each magnetic pole is determined in accordance with the diameter (coil diameter) of the armature winding and the number of poles. In this case, if the coil diameter with respect to the number of poles is too small, the width of the magnet in the circumferential direction becomes small at each magnetic pole, and there is a concern over a decrease in magnetic loading. On the other hand, if the coil diameter is too large with respect to the number of poles, the width of the magnet in the circumferential direction increases, the magnetic loading can be expected to increase, but the electric loading cannot be expected to increase so much. Therefore, there is a concern that the torque enhancement effect commensurate with the increase in size of the rotary electric machine cannot be expected.

In this regard, the discloser of the present application has found that there is an appropriate range of the coil diameter with respect to the number of poles in order to strike a balance between magnetic loading and electric loading. The discloser of the present application sets the diameter of the armature winding to be "φ40 mm to φ100 mm"×n when the number of magnetic poles is 4n and the number of the winding segments is 6n in the rotary electric machine. As a result, the torque in the rotary electric machine can be optimized.

In a tenth example, according to the first example to the ninth example, the field element is of a surface permanent magnet type and includes magnets whose number corresponds to a number of poles in the circumferential direction. W/Lg=2.5 to 7 is satisfied, where W represents a width of the magnet of one pole in the circumferential direction, and Lg represents a distance between one of the magnets and the armature core in the radial direction.

Figure 66:
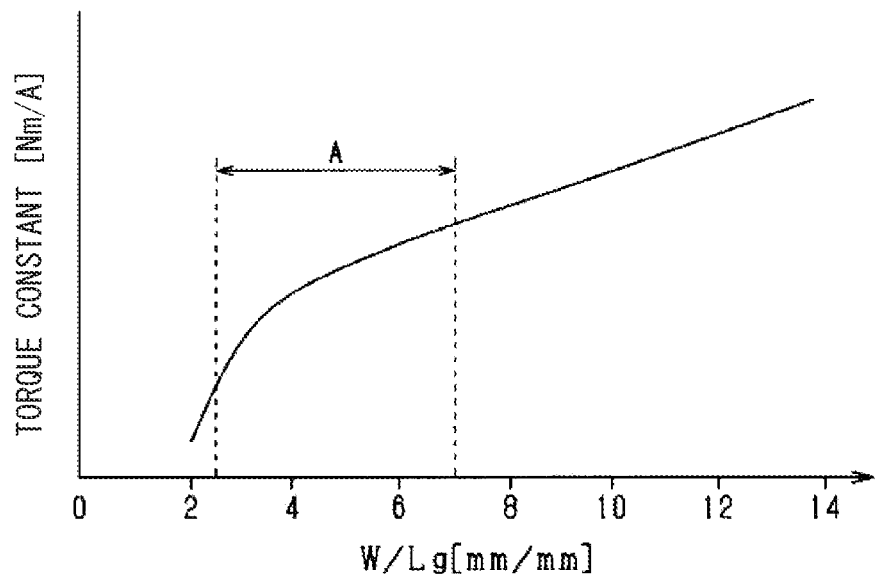
FIG. 66 is a graph illustrating a relationship between W/Lg and a torque constant.

In the surface permanent magnetic tooth-less rotary electric machine, "W/Lg" has a correlation with the torque constant [Nm/A] indicating torque per turn of the armature winding. "W/Lg" is a ratio of a width W in the circumferential direction of the magnet for one pole to a distance Lg in the radial direction between the magnet and the armature core. However, in this case, the slope of the increase in the torque constant with respect to the increase in "W/Lg" varies depending on the magnitude of "W/Lg". Specifically, there is a correlation illustrated in FIG. 66 between "W/Lg" and the torque constant, and in the correlation, there is a point of inflection at which the slope of the torque constant with respect to "W/Lg" changes. In this case, magnetic loading and electric loading can be balanced well by determining "W/Lg" within a range A at or near the point of inflection. That is, in a case where "W/Lg" is smaller than the range A, there is a concern over decrease in torque due to a too low magnetic loading, but in a case where "W/Lg" is greater than the range A, an increase in the torque constant cannot be expected even if "W/Lg" is increased. Therefore, "W/Lg" at or near the point of inflection is adopted and is, specifically, set to satisfy "W/Lg=2.5 to 7". In the relationship of FIG. 66, a sintered neodymium magnet is used as the magnet, and the magnet thickness is set to ½ of the pole pitch.

In an eleventh example, according to the first example to the tenth example, the field element is of a surface permanent magnet type and includes magnets whose number corresponds to a number of poles in the circumferential direction. In each of the magnets, a direction of an easy axis of magnetization is oriented such that the easy axis of magnetization is in parallel to a d-axis, which is a magnetic pole center, on a side of the d-axis, as compared with the easy axis of magnetization on a side of a q-axis, which is a magnetic pole boundary, or inclined with respect to a pair of acting surfaces, which are inflow and outflow surfaces of a magnetic flux and face each other, and a direction of inclination thereof is inclined with respect to the d-axis such that the easy axis of magnetization approaches the d-axis on a side of the armature winding.

In the above-described configuration, the magnetic flux at each magnetic pole can be strengthened, but there is a concern over an increase in eddy-current loss. In this regard, since the armature winding is formed using a winding segment formed by multiply winding conductive wire members, eddy-current loss can be reduced. In the winding segment, when the conductive wire member includes a twisted wire in which a plurality of wires are twisted, a further eddy current reduction effect can be obtained.

The embodiments will be described below with reference to the drawings. Parts of the embodiments functionally and/or structurally corresponding to each other and/or associated with each other will be denoted by the same reference numbers or by reference numbers which are different in the hundreds place from each other. The corresponding and/or associated parts may refer to the explanation in the other embodiments.

The rotary electric machine according to the embodiments is configured to be used, for example, as a power source for vehicles. The rotary electric machine may, however, be used widely for industrial, automotive, aerial, domestic, office automation, or game applications. In the following embodiments, the same or equivalent parts will be denoted by the same reference numbers in the drawings, and explanation thereof in detail will be omitted.

First Embodiment

Figure 2:
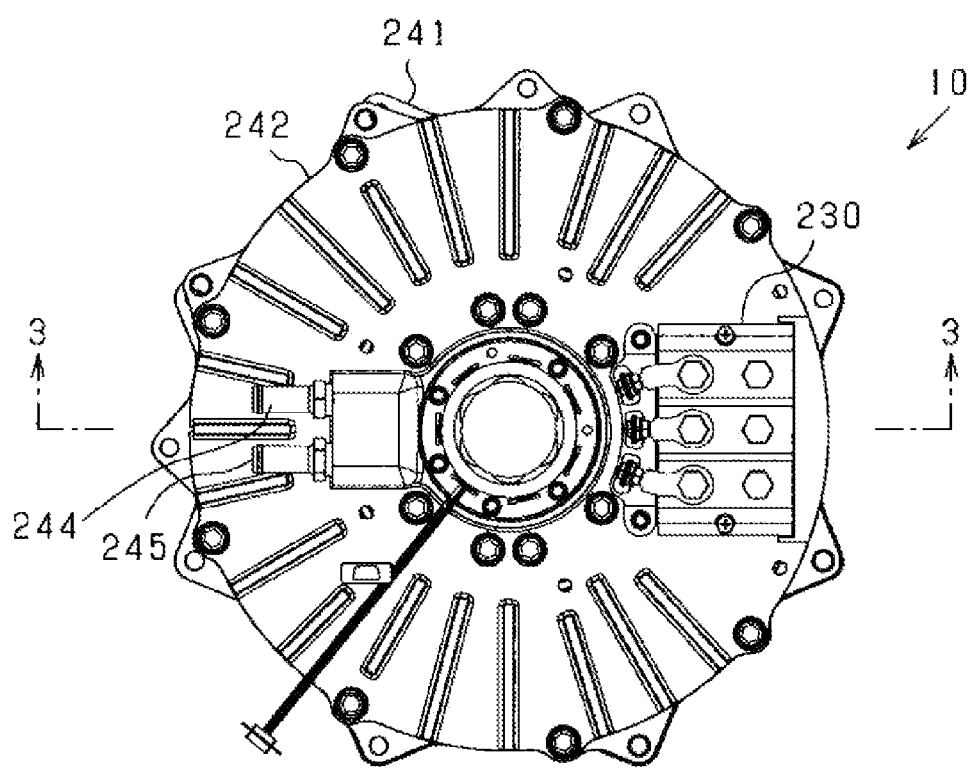
FIG. 2 is a plan view of the rotary electric machine.
Figure 3:
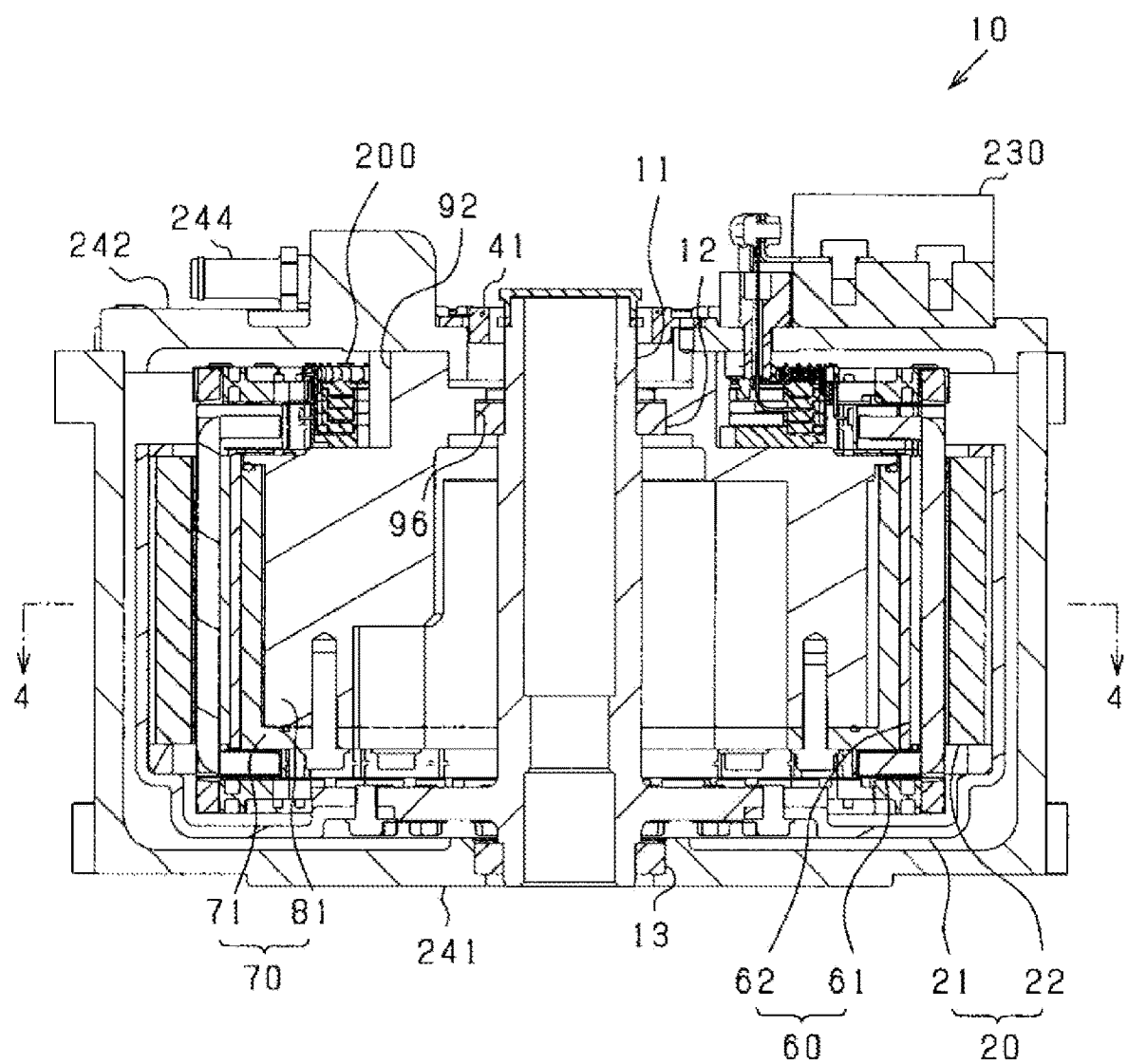
FIG. 3 is a longitudinal sectional view of the rotary electric machine.
Figure 4:
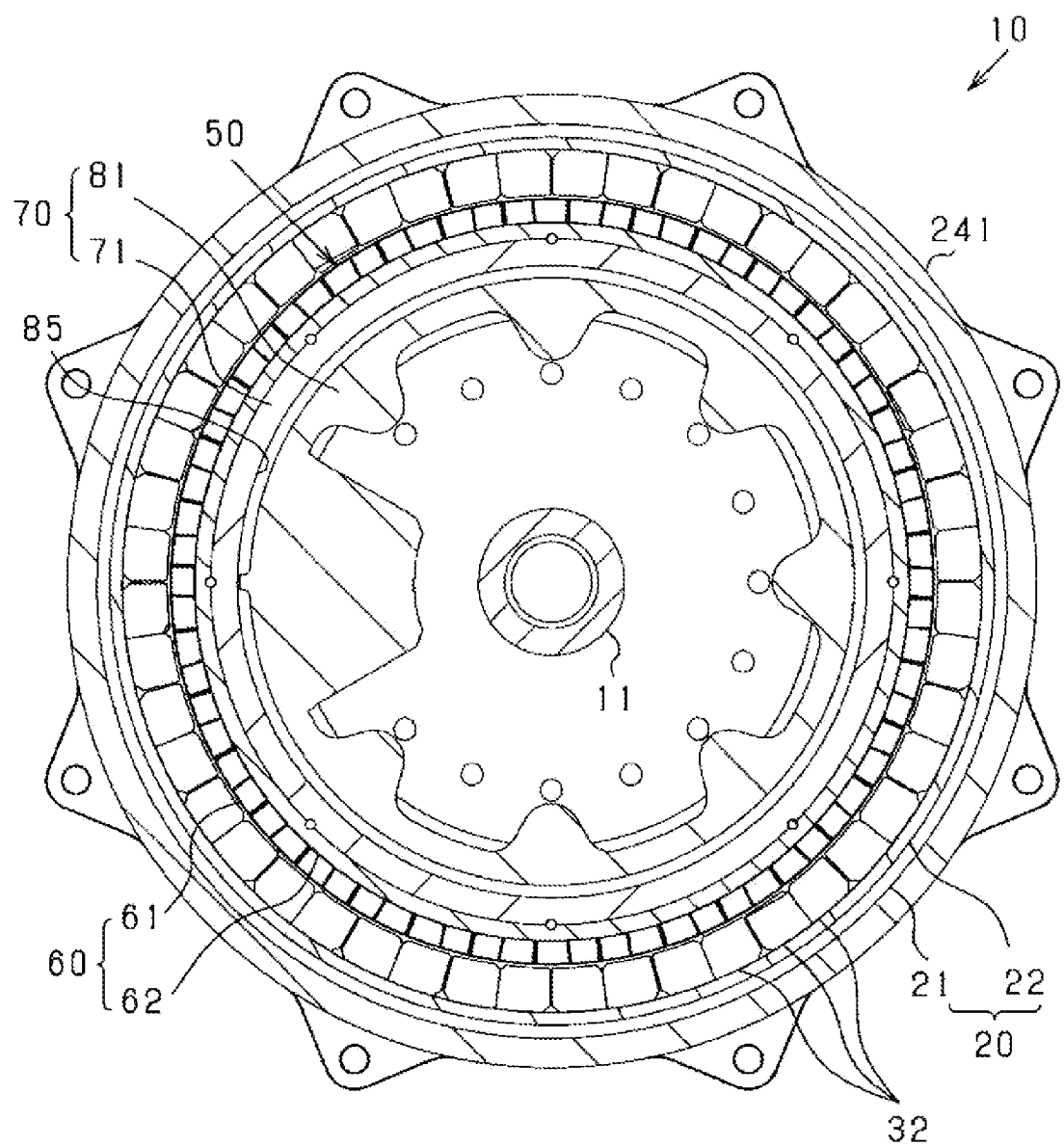
FIG. 4 is a transverse sectional view of the rotary electric machine.
Figure 5:
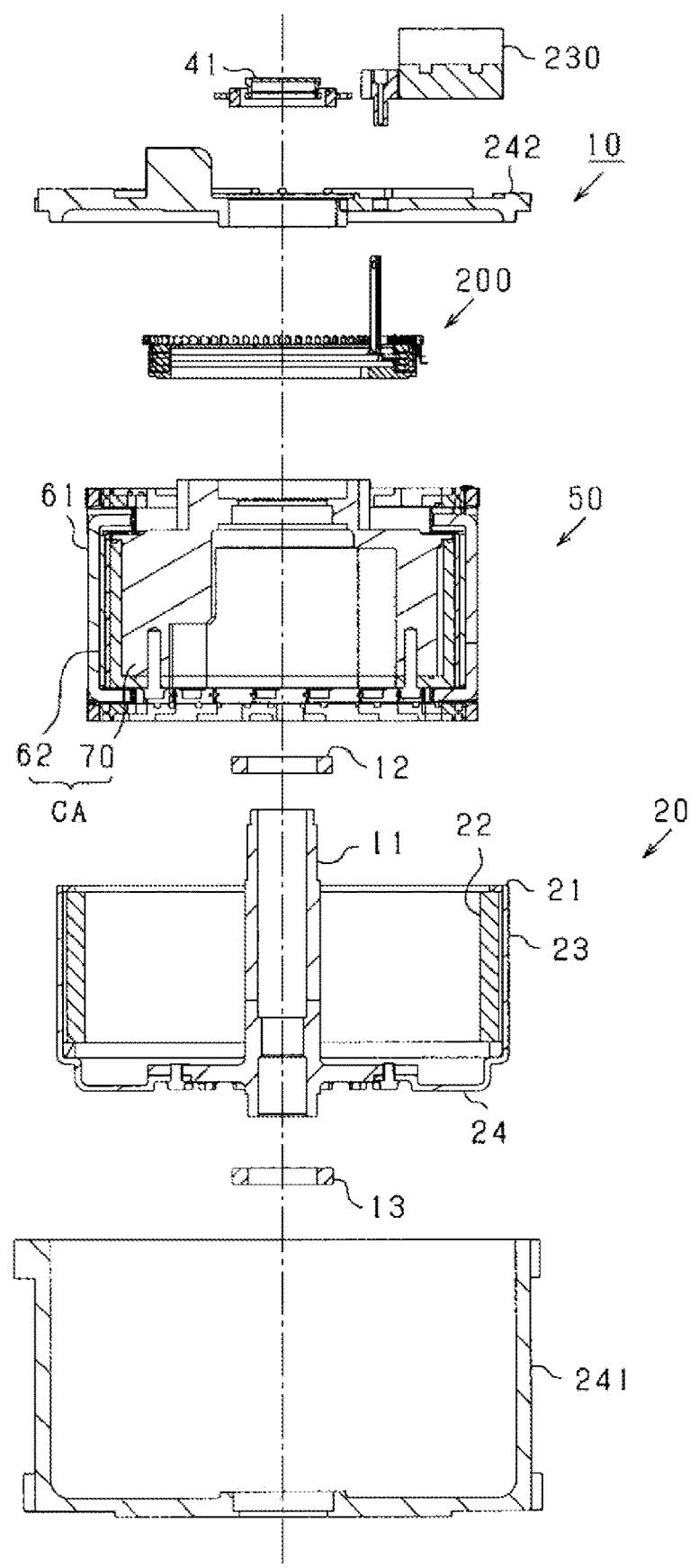
FIG. 5 is an exploded sectional view of the rotary electric machine.

A rotary electric machine 10 according to the present embodiment is a synchronous multi-phase alternating current (AC) motor and has an outer rotor structure (outer rotating structure). A schema of the rotary electric machine 10 is illustrated in FIGS. 1 to 5. FIG. 1 is a perspective view illustrating the entire rotary electric machine 10. FIG. 2 is a plan view of the rotary electric machine 10. FIG. 3 is a longitudinal sectional view of the rotary electric machine 10 (a sectional view taken along line 3-3 in FIG. 2). FIG. 4 is a transverse sectional view of the rotary electric machine 10 (a sectional view taken along line 4-4 in FIG. 3). FIG. 5 is an exploded sectional view illustrating components of the rotary electric machine 10 in an exploded manner. In the following description, in the rotary electric machine 10, a direction in which a rotating shaft 11 extends is defined as an axial direction, a direction radially extending from a center of the rotating shaft 11 is defined as a radial direction, and a direction circumferentially extending around the rotating shaft 11 is defined as a circumferential direction.

In a broad classification, the rotary electric machine 10 includes: a rotary electric machine body including a rotor 20, a stator unit 50, and a bus bar module 200; and a housing 241 and a housing cover 242 both of which are provided so as to surround the rotary electric machine body. Each of these members is disposed coaxially with the rotating shaft 11 integrally provided in the rotor 20, and is assembled in the axial direction in a predetermined order to form the rotary electric machine 10. The rotating shaft 11 is supported by a pair of bearings 12 and 13 provided in the stator unit 50 and the housing 241, respectively, and is rotatable in this state. The bearings 12 and 13 are, for example, radial ball bearings having an inner race, an outer race, and a plurality of balls disposed therebetween. The rotation of the rotating shaft 11 causes, for example, the axle of a vehicle to rotate. The rotary electric machine 10 can be mounted on a vehicle by fixing the housing 241 to a vehicle body frame or the like.

In the rotary electric machine 10, the stator unit 50 is provided so as to surround the rotating shaft 11, and the rotor 20 is disposed on the outer side of the stator unit 50 in the radial direction. The stator unit 50 includes a stator 60 and a stator holder 70 assembled to the inner side of the stator 60 in the radial direction. The rotor 20 and the stator 60 are disposed to face each other in the radial direction with an air gap interposed therebetween. The rotor 20 rotates integrally with the rotating shaft 11, so that the rotor 20 rotates on the outer side of the stator 60 in the radial direction. The rotor 20 corresponds to a "field element", and the stator 60 corresponds to an "armature".

Figure 6:
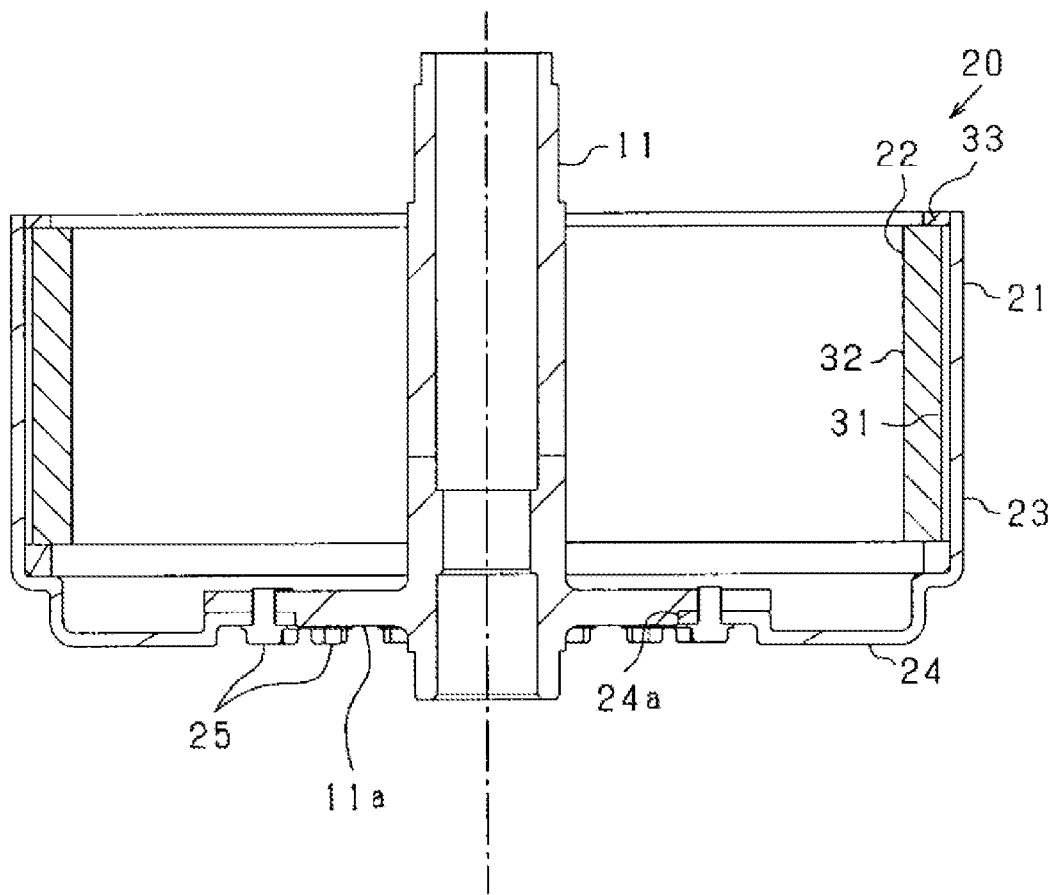
FIG. 6 is a sectional view of a rotor.

FIG. 6 is a longitudinal sectional view of the rotor 20. As illustrated in FIG. 6, the rotor 20 includes a substantially cylindrical rotor carrier 21 and an annular magnet unit 22 fixed to the rotor carrier 21. The rotor carrier 21 includes a cylinder 23 having a cylindrical shape and an end plate portion 24 provided at one end of the cylinder 23 in the axial direction. The cylinder 23 and the end plate portion 24 are integrated to form the rotor carrier 21. The rotor carrier 21 functions as a magnet retainer, and the magnet unit 22 is fixed to the inner side of the cylinder 23 in the radial direction in an annular shape. A through-hole 24*a* is formed in the end plate portion 24. The rotating shaft 11 is fixed to the end plate portion 24 by using a fastener 25 such as a bolt while the rotating shaft 11 is inserted through the through-hole 24*a*. The rotating shaft 11 has a flange 11*a* extending in a direction intersecting (orthogonal to) the axial direction. The rotor carrier 21 is fixed to the rotating shaft 11 while the flange 11*a* and the end plate portion 24 are surface-joined.

The magnet unit 22 includes a cylindrical magnet holder 31, a plurality of magnets 32 fixed to an inner peripheral surface of the magnet holder 31, and an end plate 33 fixed to an opposite side of the end plate portion 24 of the rotor carrier 21 among both sides in the axial direction. The magnet holder 31 has the same length dimension as the magnet 32 in the axial direction. The magnet 32 is provided in a state of being surrounded by the magnet holder 31 from the outer side in the radial direction. The magnet holder 31 and the magnet 32 are fixed while being in contact with the end plate 33 at the end on one side in the axial direction. The magnet unit 22 corresponds to a "magnet unit".

Figure 7:
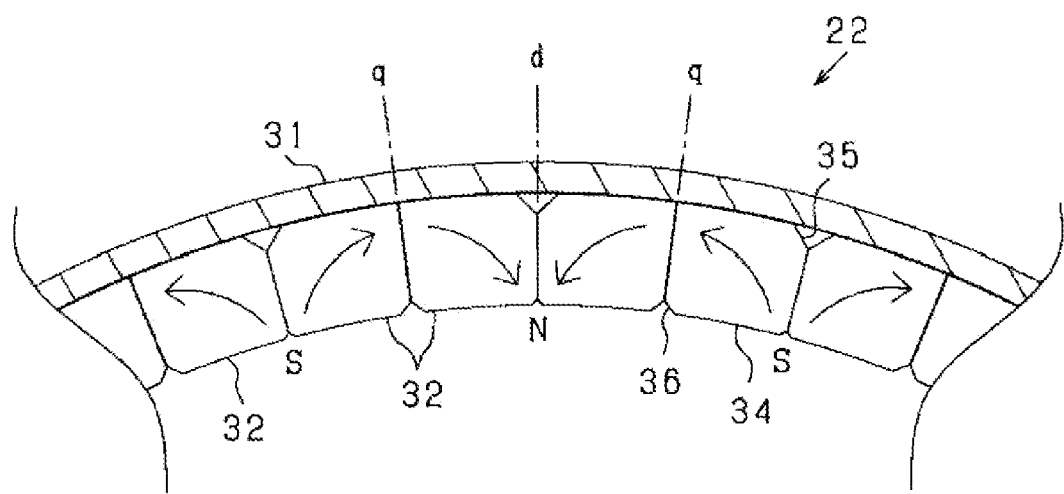
FIG. 7 is a partial transverse sectional view illustrating a sectional structure of a magnet unit.

FIG. 7 is a partial transverse sectional view illustrating a sectional structure of the magnet unit 22. In FIG. 7, the direction of the easy axis of magnetization of the magnet 32 is indicated by an arrow.

In the magnet unit 22, the magnets 32 are provided side by side such that the polarities are alternately changed along the circumferential direction of the rotor 20. Thus, the magnet unit 22 has a plurality of magnetic poles in the circumferential direction. The magnet 32 is a polar anisotropic permanent magnet, and is formed using a sintered neodymium magnet having an intrinsic coercive force of 400 [kA/m] or more and a remanent flux density Br of 1.0 [T] or more.

A peripheral surface of the magnet 32 on the inner side in the radial direction (stator 60 side) is a magnetic flux acting surface 34 on which a magnetic flux is transmitted and received. The magnet unit 22 intensively generates a magnetic flux in a region on or near the d-axis serving as the center of the magnetic pole on the magnetic flux acting surface 34 of the magnet 32. Specifically, in the magnet 32, the directions of the easy axis of magnetization differ between the d-axis side (portion closer to the d-axis) and the q-axis side (portion closer to the q-axis). The direction of the easy axis of magnetization on the d-axis side is parallel to the d-axis, whereas the direction of the easy axis of magnetization on the q-axis side is orthogonal to the q-axis. In this case, an arc-shaped magnetic path is formed along the direction of the easy axis of magnetization. In short, the magnet 32 is oriented such that the direction of the easy axis of magnetization is parallel to the d-axis serving as the center of the magnetic pole on a side of the d-axis as compared with that on a side of the q-axis serving as the boundary of the magnetic pole.

In the magnet 32, since the magnetic path is formed in an arc shape, the length of the magnetic path is greater than the thickness dimension of the magnet 32 in the radial direction. With this configuration, the permeance of the magnet 32 increases, and the magnet 32 can exhibit an ability equivalent or corresponding to a magnet having a large volume of magnets, without changing the volume of magnets.

Two magnets 32 adjacent to each other in the circumferential direction as one set constitutes one magnetic pole. That is, the plurality of magnets 32 arranged in the circumferential direction in the magnet unit 22 has division surfaces on the d-axis and the q-axis. The magnets 32 are disposed while being in contact with or close to each other. The magnet 32 has an arc-shaped magnetic path as described above. On the q-axis, the N-pole and the S-pole face each other in the magnets 32 adjacent to each other in the circumferential direction. Therefore, the permeance on or near the q-axis can be improved. In addition, since the magnets 32 on both sides across the q-axis attract each other, the magnets 32 can maintain a state where the magnets 32 are in contact with each other. Therefore, this also contributes to improvement of permeance.

Figure 8:
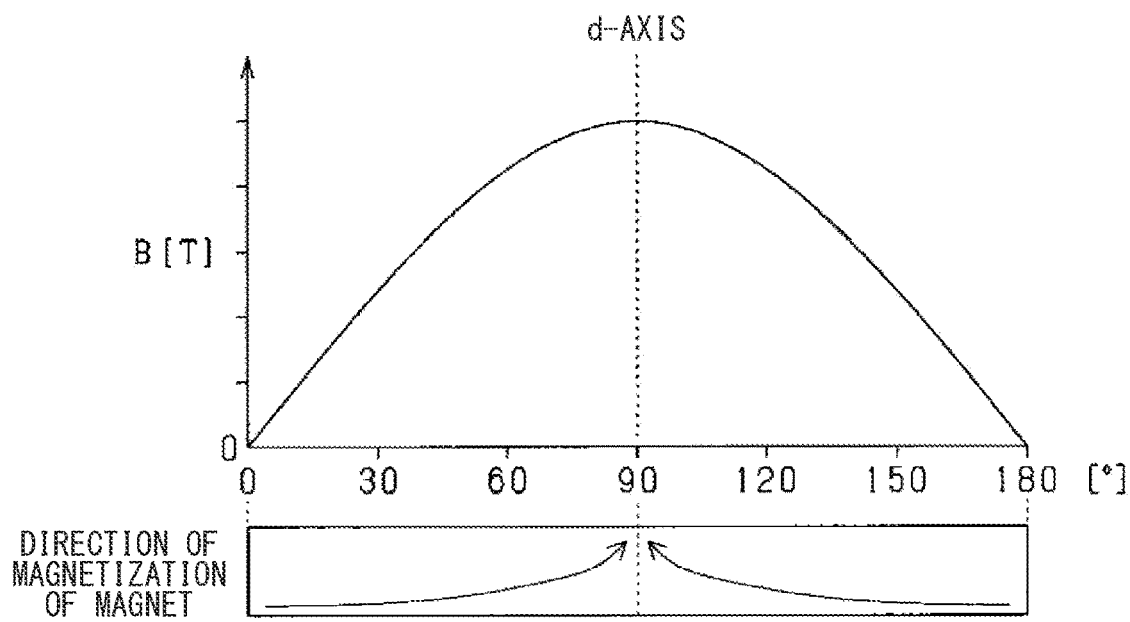
FIG. 8 is a graph illustrating a relationship between an electrical angle and a magnetic flux density for a magnet according to the embodiment.
Figure 9:
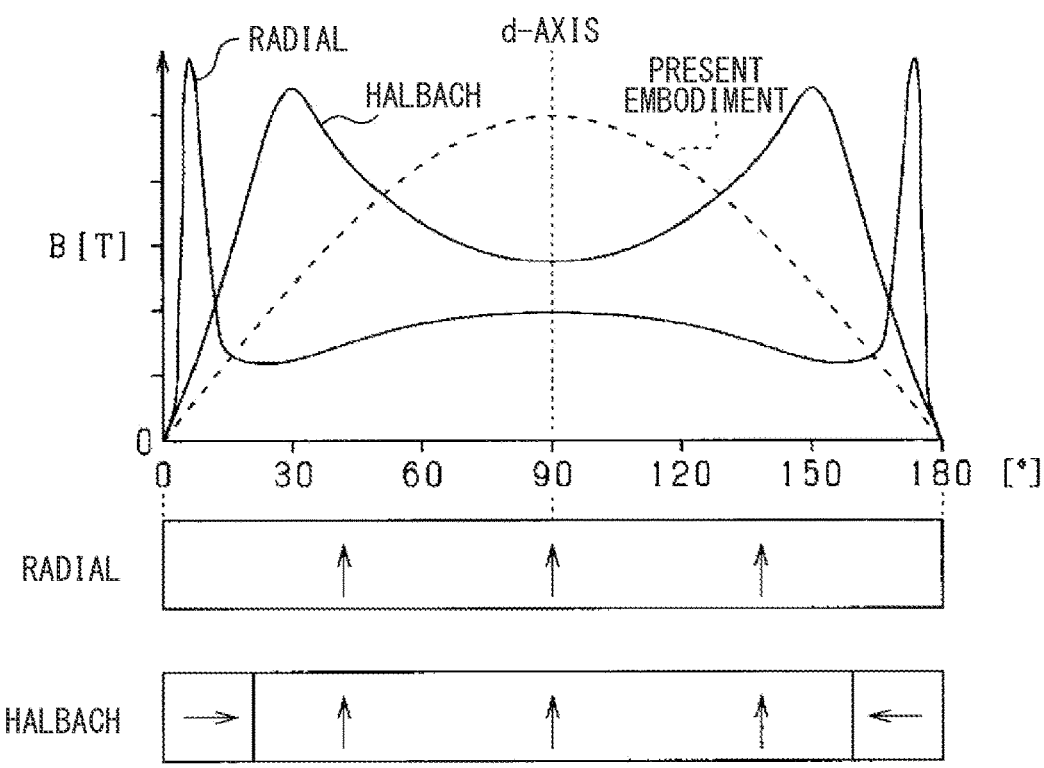
FIG. 9 is a graph illustrating a relationship between an electrical angle and a magnetic flux density for a magnet according to a comparative example.

In the magnet unit 22, since a magnetic flux flows in an arc shape between the adjacent N-pole and S-pole by each magnet 32, the magnetic path thereof is longer than, for example, that of the radial anisotropic magnet. Therefore, as illustrated in FIG. 8, the shape of the magnetic flux density distribution is close to a sine wave. As a result, unlike the magnetic flux density distribution of the radial anisotropic magnet illustrated in FIG. 9 as a comparative example, the magnetic flux can be concentrated on the center side of the magnetic pole, and the torque of the rotary electric machine 10 can be increased. Further, in the magnet unit 22 according to the present embodiment, the fact that there is a difference in the magnetic flux density distribution as compared with the conventional Halbach array magnet can be confirmed. In FIGS. 8 and 9, the horizontal axis represents the electrical angle, and the vertical axis represents the magnetic flux density. In FIGS. 8 and 9, 90° on the horizontal axis represents the d-axis (i.e., the center of the magnetic pole), and 0° and 180° on the horizontal axis each represent the q-axis.

That is, according to each magnet 32 having the above-described configuration, the magnetic flux on the d-axis is strengthened in the magnet unit 22, and the change in the magnetic flux on or near the q-axis is suppressed. Accordingly, implementation of the magnet unit 22 can be suitably performed in which the surface magnetic flux change from the q-axis to the d-axis is gentle in each magnetic pole.

The sine wave matching percentage of the magnetic flux density distribution is only required to be a certain value, for example, a value of 40% or more. This value setting can reliably improve the amount of magnetic flux in the central portion of the waveform, as compared with the case of using a radially oriented magnet or a parallel oriented magnet having a sine wave matching percentage of about 30%. Alternatively, when the sine wave matching percentage is set to 60% or more, the amount of magnetic flux in the central portion of the waveform can be reliably improved, as compared with a concentrated magnetic flux array such as a Halbach array.

In the radial anisotropic magnet illustrated in FIG. 9, the magnetic flux density changes steeply on or near the q-axis. As the change in the magnetic flux density is steeper, the eddy current undesirably increases in a stator winding 61 of the stator 60 to be described later. The magnetic flux change on the stator winding 61 side is also steep. On the other hand, in the present embodiment, the magnetic flux density distribution has a magnetic flux waveform close to a sine wave. Therefore, on or near the q-axis, the change in the magnetic flux density is smaller than the change in the magnetic flux density of the radial anisotropic magnet. This feature makes it possible to prevent the generation of eddy currents.

In the magnet 32, a recess 35 is formed in a predetermined range including the d-axis on the outer peripheral surface on the outer side in the radial direction, and a recess 36 is formed in a predetermined range including the q-axis on the inner peripheral surface on the inner side in the radial direction. In this case, according to the direction of the easy axis of magnetization of the magnet 32, the magnetic path is shortened on or near the d-axis on the outer peripheral surface of the magnet 32, and the magnetic path is shortened on or near the q-axis on the inner peripheral surface of the magnet 32. Therefore, considering the difficulty in causing the magnet 32 to generate a sufficient magnetic flux at a place where the length of the magnetic path is small, the magnet is removed at a place where the magnetic flux is weak.

The magnet unit 22 may use the magnets 32 whose number is identical to the number of the magnetic poles. For example, the magnet 32 is preferably provided such that one magnet is disposed between the d-axes, which serve as the centers of two magnetic poles adjacent to each other in the circumferential direction. In this case, the magnet 32 has a center in the circumferential direction on the q-axis and has a division surface on the d-axis. Alternatively, the magnet 32 may have a center in the circumferential direction on the d-axis instead of the q-axis. As the magnet 32, instead of using magnets whose number is twice the number of magnetic poles or magnets whose number is identical to the number of magnetic poles, an annular magnet connected in an annular shape may be used.

As illustrated in FIG. 3, a resolver 41 as a rotation sensor is provided at an end (upper end in the drawing) on the opposite side of the joint portion with the rotor carrier 21 among both sides in the axial direction of the rotating shaft 11. The resolver 41 includes a resolver rotor fixed to the rotating shaft 11 and a resolver stator disposed to face the outer side of the resolver rotor in the radial direction. The resolver rotor has a disk ring shape. The resolver rotor is provided coaxially with the rotating shaft 11 while the rotating shaft 11 is inserted therethrough. The resolver stator includes a stator core and a stator coil, and is fixed to the housing cover 242.

Figure 10:
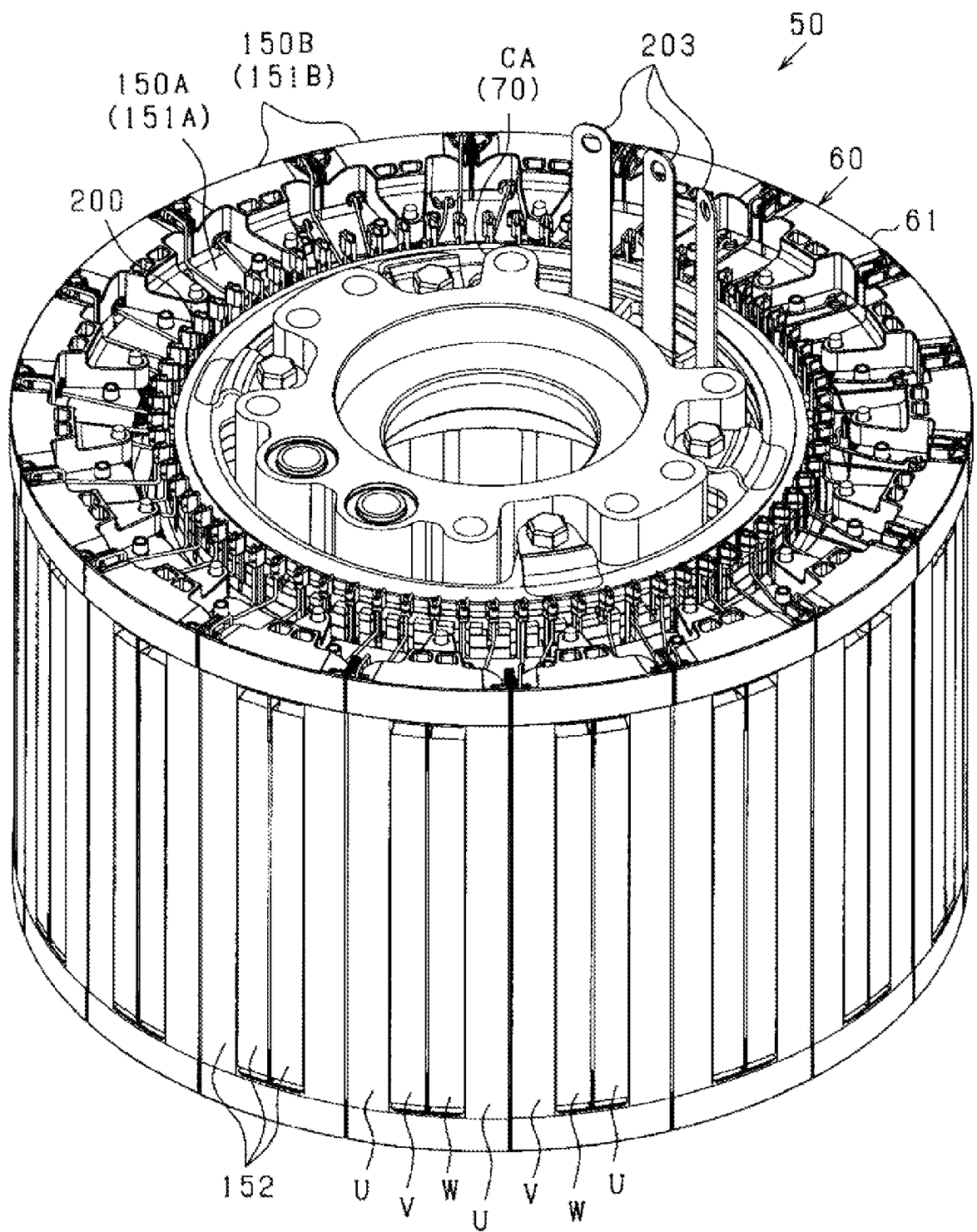
FIG. 10 is a perspective view of a stator unit.
Figure 11:
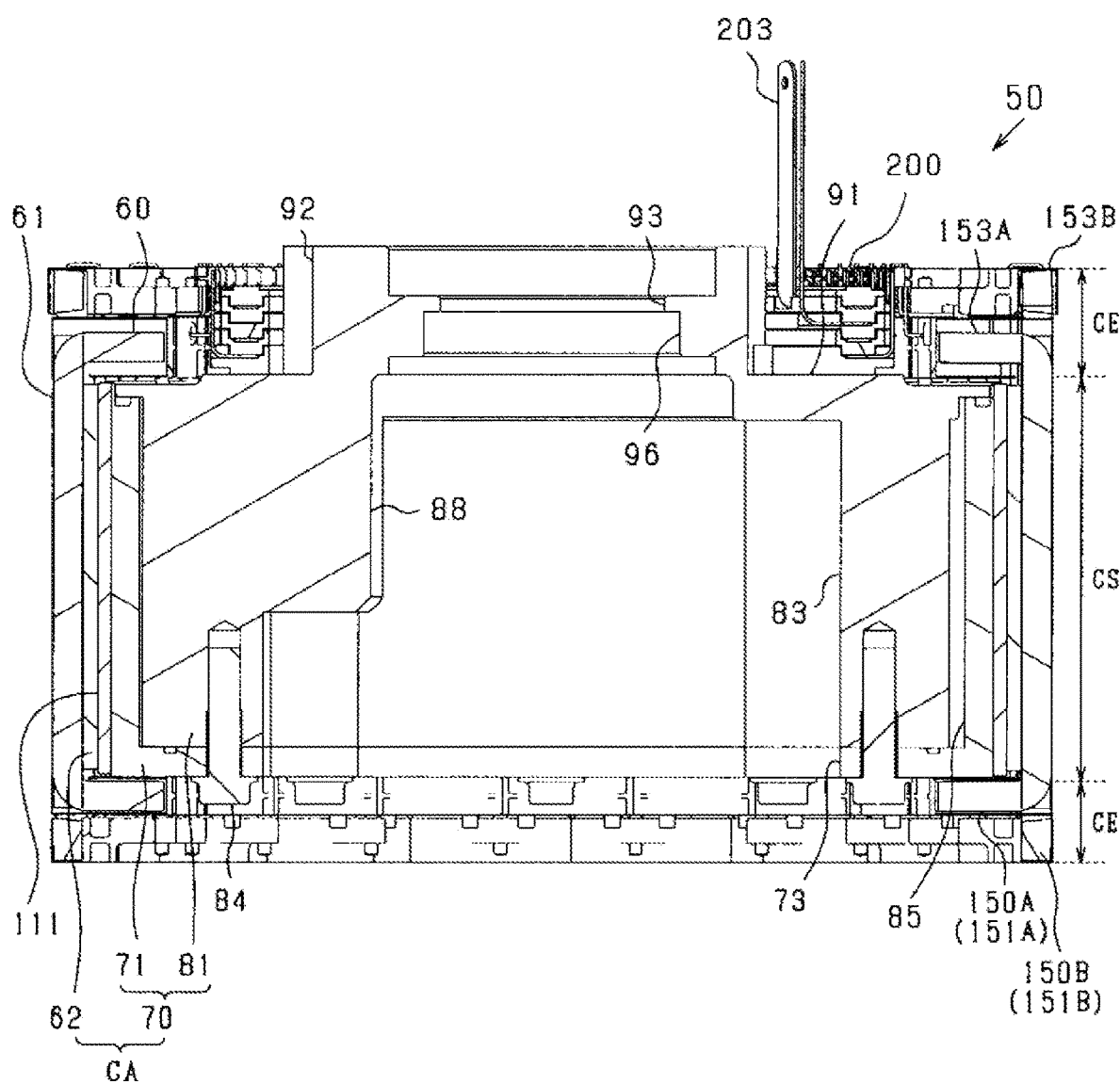
FIG. 11 is a longitudinal sectional view of the stator unit.

Next, a configuration of the stator unit 50 will be described. FIG. 10 is a perspective view of the stator unit 50, and FIG. 11 is a longitudinal sectional view of the stator unit 50. FIG. 11 is a longitudinal sectional view at the same position as FIG. 3.

The stator unit 50 includes the stator 60 and the stator holder 70 on the inner side of the stator 60 in the radial direction. The stator 60 includes the stator winding 61 and a stator core 62. The stator core 62 and the stator holder 70 are integrally provided as a core assembly CA, and a plurality of winding segments 151 constituting the stator winding 61 are assembled to the core assembly CA. The stator winding 61 corresponds to an "armature winding", the stator core 62 corresponds to an "armature core", and the stator holder 70 corresponds to an "armature retainer". The core assembly CA corresponds to a "support member".

Figure 12:
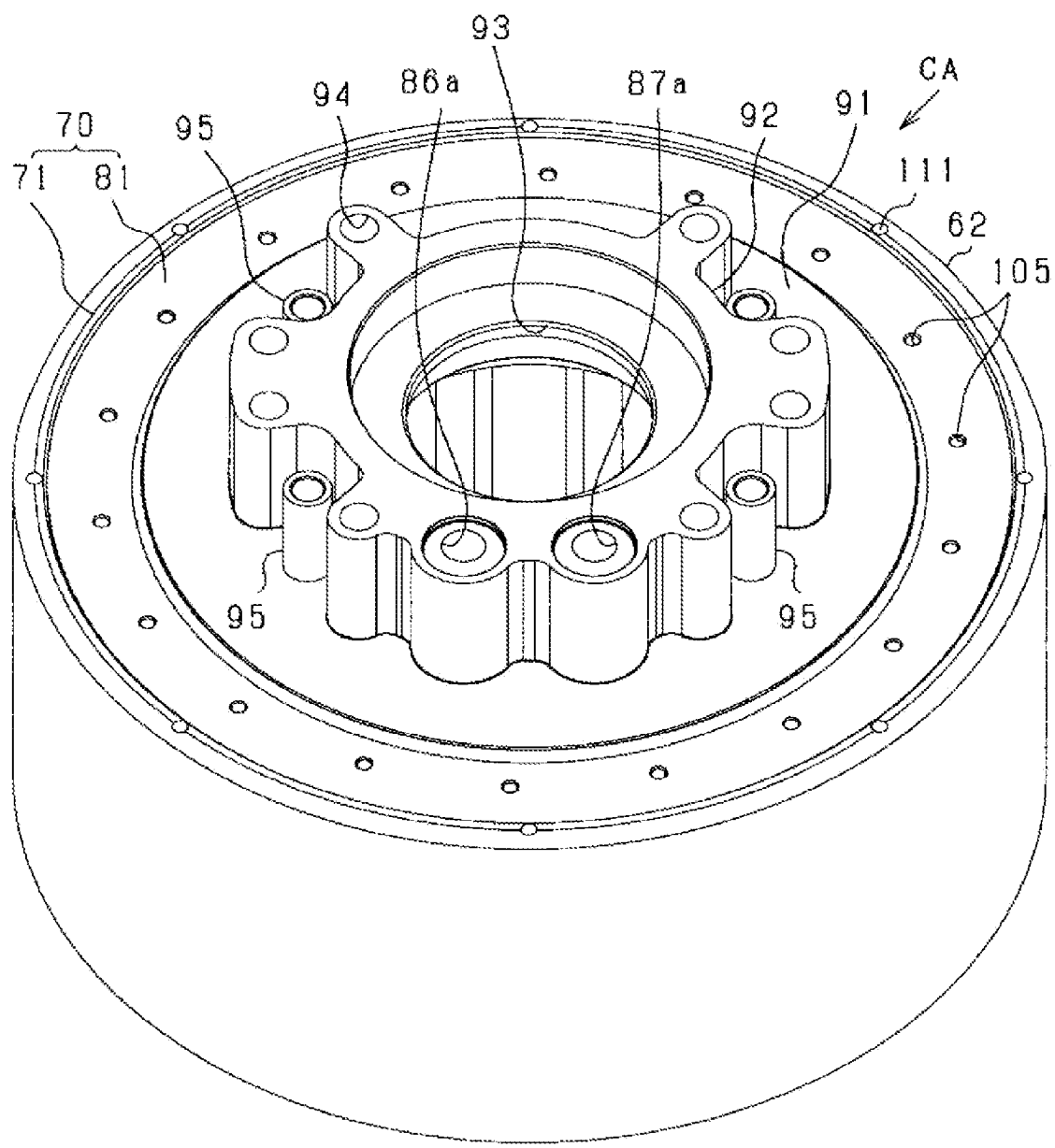
FIG. 12 is a perspective view of a core assembly as viewed from one side in an axial direction.
Figure 13:
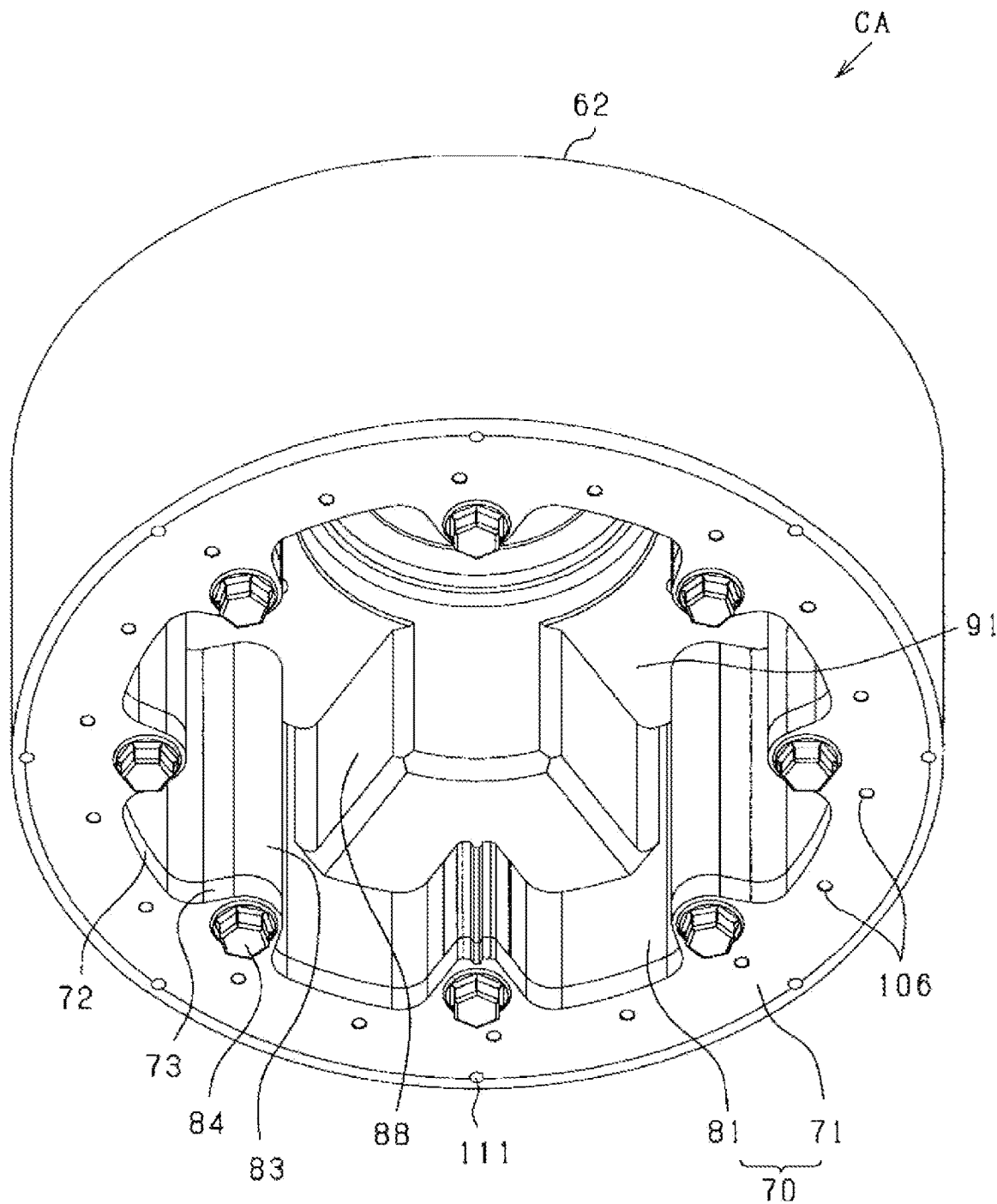
FIG. 13 is a perspective view of the core assembly as viewed from the other side in the axial direction.
Figure 14:
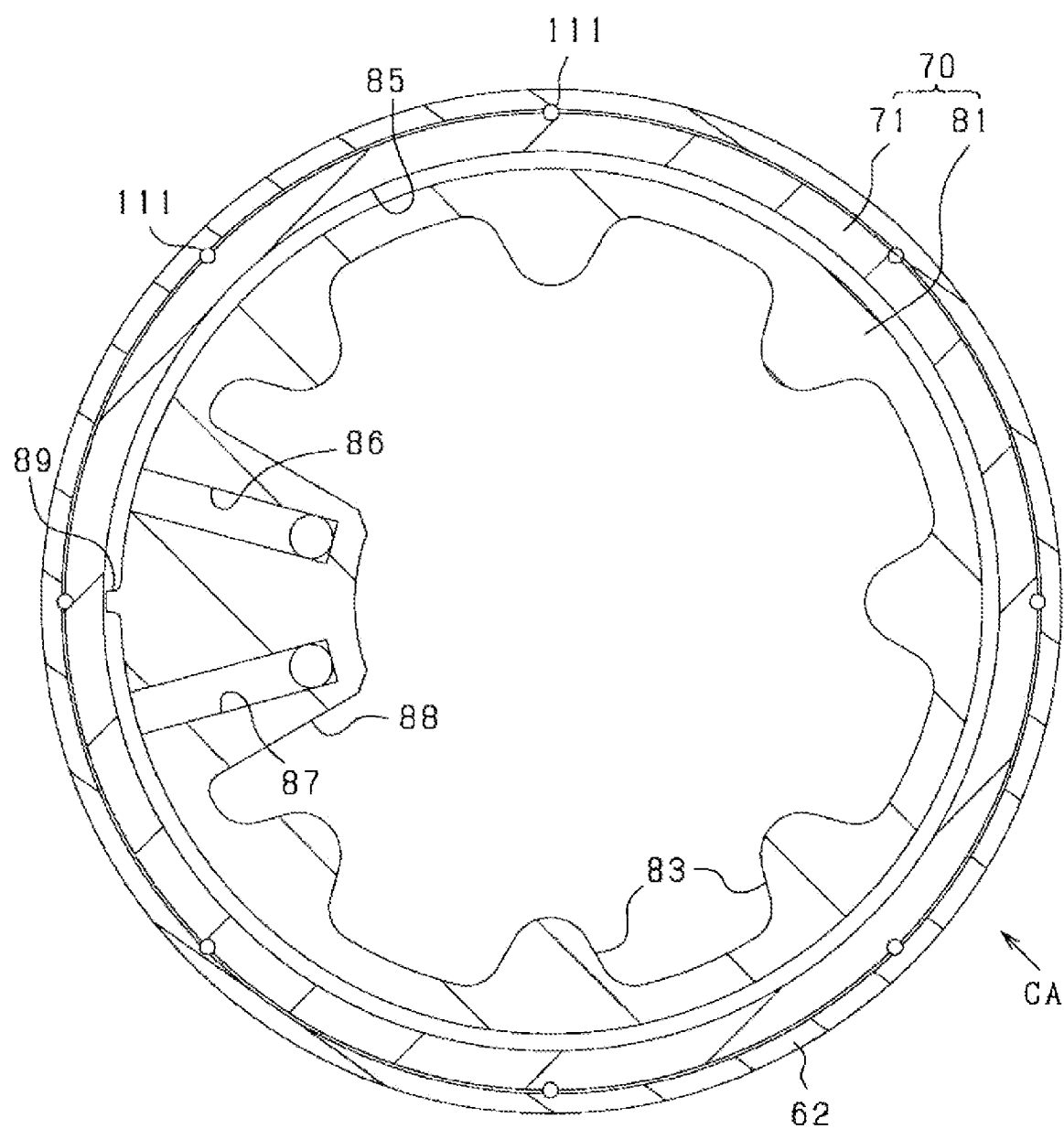
FIG. 14 is a transverse sectional view of the core assembly.
Figure 15:
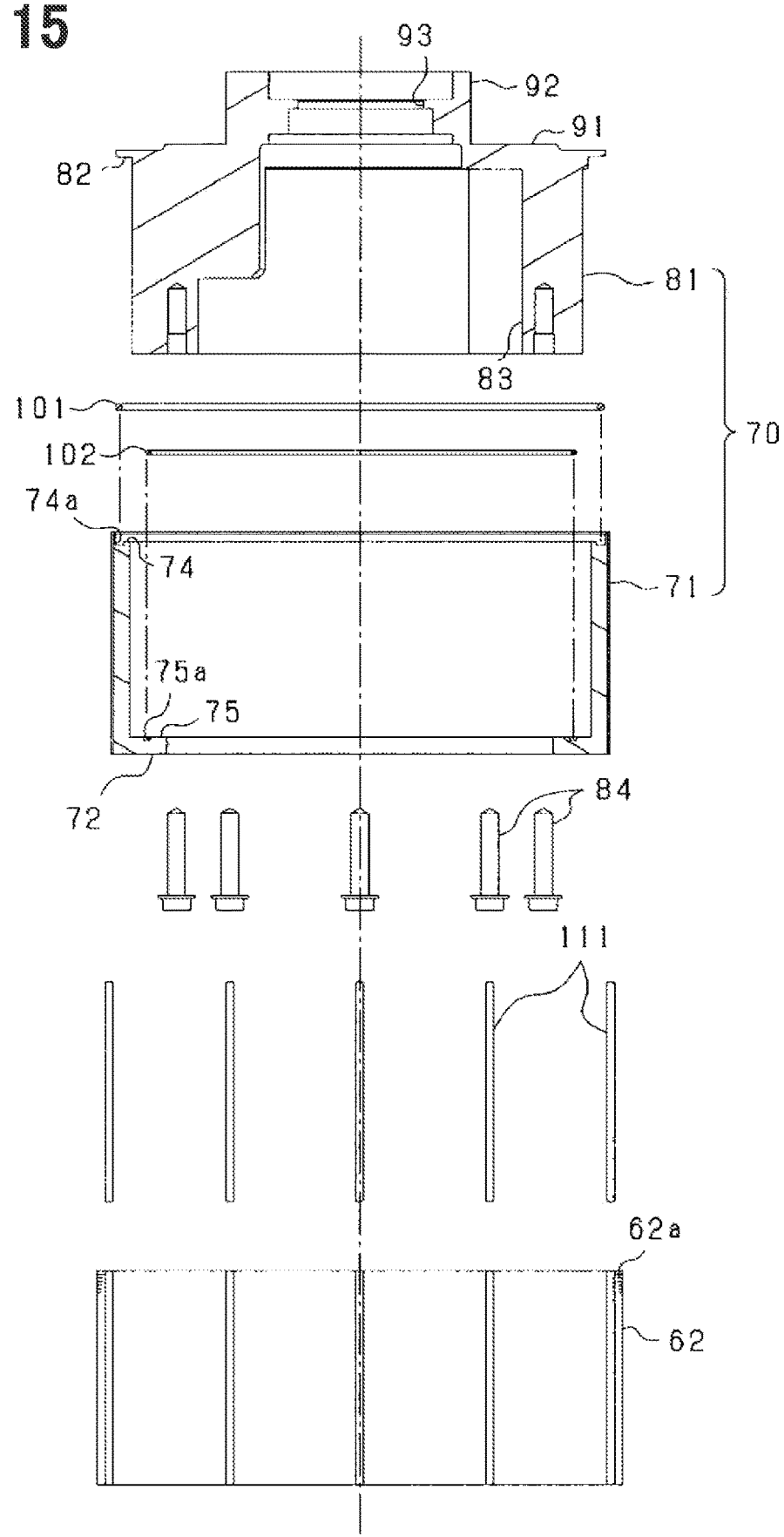
FIG. 15 is an exploded sectional view of the core assembly.

First, the core assembly CA will now be described. FIG. 12 is a perspective view of the core assembly CA as viewed from one side in the axial direction. FIG. 13 is a perspective view of the core assembly CA as viewed from the other side in the axial direction. FIG. 14 is a transverse sectional view of the core assembly CA. FIG. 15 is an exploded sectional view of the core assembly CA.

As described above, the core assembly CA includes the stator core 62 and the stator holder 70 assembled on the inner side of the stator core 62 in the radial direction. In other words, the stator core 62 is integrally assembled to the outer peripheral surface of the stator holder 70.

The stator core 62 is formed as a core sheet stacked body in which core sheets 62a including a magnetic steel sheet, which is a magnetic member, are stacked in the axial direction. The stator core 62 has a cylindrical shape having a predetermined thickness in the radial direction. The stator winding 61 is assembled to the outer side of the stator core 62 in the radial direction, that is, the rotor 20 side. The outer peripheral surface of the stator core 62 has a curved surface shape without protrusions and recesses. The stator core 62 functions as a back yoke. The stator core 62 is formed by stacking a plurality of the core sheets 62a in the axial direction. The core sheet 62a is punched into, for example, an annular plate shape. However, a stator core having a helical core structure may be used as the stator core 62. In the stator core 62 having a helical core structure, a strip-shaped core sheet is used. This core sheet is wound in an annular shape and is stacked in the axial direction to form the stator core 62 having a cylindrical shape as a whole.

In the present embodiment, the stator 60 has a slot-less structure having no tooth for forming a slot, but the configuration thereof may use any of the following (A) to (C).

(A) The stator 60 includes a conductor-to-conductor member between each adjacent two of the conductor portions (intermediate conductor portions 152 to be described later) in the circumferential direction. As the conductor-to-conductor member, a magnetic material having a relationship of $Wt \times Bs \le Wm \times Br$ is used, where Wt represents a width dimension in the circumferential direction of the conductor-to-conductor member in one magnetic pole, Bs represents a saturation magnetic flux density of the conductor-to-conductor member, Wm represents a width dimension in the circumferential direction of the magnet 32 in one magnetic pole, and Br represents a remanent flux density of the magnet 32.

(B) The stator 60 includes a conductor-to-conductor member between each adjacent two of the conductor portions (intermediate conductor portions 152) in the circumferential direction. A non-magnetic material is used as the conductor-to-conductor member.

(C) The stator 60 does not include a conductor-to-conductor member between each adjacent two of the conductor portions (intermediate conductor portions 152) in the circumferential direction.

As illustrated in FIG. 15, the stator holder 70 includes an outer cylinder member 71 and an inner cylinder member 81. The outer cylinder member 71 is disposed on the outer side in the radial direction and the inner cylinder member 81 is disposed on the inner side in the radial direction, and they are integrally assembled to form the stator holder 70. Each of these members 71 and 81 includes, for example, metal such as aluminum or cast iron, or carbon fiber reinforced plastic (CFRP).

The outer cylinder member 71 is a cylindrical member having the outer peripheral surface and the inner peripheral surface, both of which are formed into an exact circular curved surface. An annular flange 72 extending inward in the radial direction is formed on one end side in the axial direction. The flange 72 includes a plurality of protrusions 73 extending inward in the radial direction at predetermined intervals in the circumferential direction (see FIG. 13). The outer cylinder member 71 includes facing surfaces 74 and 75 each facing the inner cylinder member 81 in the axial direction on one end side and the other end side in the axial direction, respectively. Annular grooves 74a and 75a that extend annularly are formed on the facing surfaces 74 and 75.

The inner cylinder member 81 is a cylindrical member having an outer diameter dimension smaller than an inner diameter dimension of the outer cylinder member 71. An outer peripheral surface of the inner cylinder member 81 is an exact circular curved surface concentric with the outer cylinder member 71. The inner cylinder member 81 includes an annular flange 82 extending outward in the radial direction on one end side in the axial direction. The inner cylinder member 81 is to be assembled to the outer cylinder member 71 while being in contact with the facing surfaces 74 and 75 of the outer cylinder member 71 in the axial direction. As illustrated in FIG. 13, the outer cylinder member 71 and the inner cylinder member 81 are assembled to each other by using a fastener 84 such as a bolt. Specifically, a plurality of protrusions 83 extending inward in the radial direction is formed on the inner peripheral side of the inner cylinder member 81 at predetermined intervals in the circumferential direction. The protrusions 73 and 83 are fastened to each other by using the fastener 84 while the end surface of the protrusion 83 in the axial direction and the protrusion 73 of the outer cylinder member 71 are stacked.

As illustrated in FIG. 14, the outer cylinder member 71 and the inner cylinder member 81 are assembled to each other. In this state, an annular gap is formed between the inner peripheral surface of the outer cylinder member 71 and the outer peripheral surface of the inner cylinder member 81. This gap space serves as a coolant path 85 through which a coolant such as cooling water flows. The coolant path 85 is provided in an annular shape in the circumferential direction of the stator holder 70. More specifically, the inner cylinder member 81 includes a path formation wall 88. The path formation wall 88 protrudes inward in the radial direction on the inner peripheral side of the inner cylinder member 81. In the path formation wall 88, an inlet path 86 and an outlet path 87 are formed, and each of the paths 86 and 87 is open to the outer peripheral surface of the inner cylinder member 81. The inner cylinder member 81 includes, on the outer peripheral surface thereof, a partition 89 for partitioning the coolant path 85 into an inlet side and an outlet side. This configuration allows a coolant flowing in from the inlet path 86 to flow through the coolant path 85 in the circumferential direction, and then flow out from the outlet path 87.

The inlet path 86 and the outlet path 87 each include a one end extending in the radial direction to be open to the outer peripheral surface of the inner cylinder member 81, and each include the other end extending in the axial direction to be open to the end surface of the inner cylinder member 81 in the axial direction. FIG. 12 illustrates an inlet opening 86a communicating with the inlet path 86 and an outlet opening 87a communicating with the outlet path 87. The inlet path 86 and the outlet path 87 respectively communicate with an inlet port 244 and an outlet port 245 (see FIG. 1) attached to the housing cover 242. The coolant enters and exits through the ports 244 and 245, respectively.

A sealing members 101 and 102 for preventing leakage of the coolant in the coolant path 85 is provided at a joint portion between the outer cylinder member 71 and the inner cylinder member 81 (see FIG. 15). Specifically, the sealing members 101 and 102 are, for example, O-rings. The sealing members 101 and 102 are provided in a manner that the annular grooves 74a and 75a of the outer cylinder member 71 respectively receive the sealing members 101 and 102, and the outer cylinder member 71 and the inner cylinder member 81 respectively compress the sealing members 101 and 102.

As illustrated in FIG. 12, the inner cylinder member 81 has an end plate portion 91 on one end side in the axial direction. The end plate portion 91 includes a boss 92 having a hollow cylindrical shape extending in the axial direction. The Boss 92 is provided so as to surround an insertion hole 93 through which the rotating shaft 11 is inserted. The boss 92 includes a plurality of fastener 94 for fixing the housing cover 242. The end plate portion 91 includes a plurality of rods 95 extending in the axial direction on the outer side of the boss 92 in the radial direction. The rod 95 is a portion serving as a fixing portion for fixing the bus bar module 200, and details thereof will be described later. The boss 92 serves as a bearing retainer that retains the bearing 12. The bearing 12 is fixed to a bearing fixing portion 96 provided on the inner peripheral portion of the boss 92 (see FIG. 3).

As illustrated in FIGS. 12 and 13, the outer cylinder member 71 and the inner cylinder member 81 are respectively formed with recesses 105 and 106, both of which are used for fixing a plurality of coil modules 150 to be described later.

Specifically, as illustrated in FIG. 12, a plurality of the recesses 105 are formed at equal intervals in the circumferential direction on the end surface of the inner cylinder member 81 in the axial direction, more specifically, the outer end surface of the end plate portion 91 in the axial direction around the boss 92. As illustrated in FIG. 13, a plurality of the recesses 106 are formed at equal intervals in the circumferential direction on the end surface of the outer cylinder member 71 in the axial direction, more specifically, on the outer end surface of the flange 72 in the axial direction. These recesses 105 and 106 are each provided so as to be arranged on an imaginary circle concentric with the core assembly CA. The recesses 105 and 106 are provided at the same position in the circumferential direction, and the intervals and the number thereof are the same.

The stator core 62 is assembled while generating a compression force in the radial direction with respect to the stator holder 70 in order to secure the strength of assembly with respect to the stator holder 70. Specifically, the stator core 62 is fitted and fixed to the stator holder 70 with a predetermined interference by shrink-fitting or press-fitting. In this case, the stator core 62 and the stator holder 70 can be said to be assembled while stress in the radial direction from one of them to the other is generated. In the case of increasing the torque of the rotary electric machine 10, for example, increase of the diameter of the stator 60 is conceivable. In such a case, the tightening force of the stator core 62 is increased in order to strengthen the joining of the stator core 62 to the stator holder 70. However, if the compressive stress (in other words, residual stress) of the stator core 62 is increased, there is a concern that the stator core 62 may be damaged.

To avoid the above problem, in the present embodiment, in the configuration in which the stator core 62 and the stator holder 70 are fitted and fixed to each other with predetermined interference, a regulation portion is provided at portions where the stator core 62 and the stator holder 70 face each other in the radial direction. The regulation portion regulates displacement of the stator core 62 in the circumferential direction by engagement in the circumferential direction. That is, as illustrated in FIGS. 12 to 14, a plurality of engagement members 111 as regulation portions are provided at predetermined intervals in the circumferential direction between the stator core 62 and the outer cylinder member 71 of the stator holder 70 in the radial direction. The engagement members 111 suppress positional shift between the stator core 62 and the stator holder 70 in the circumferential direction. In this case, a recess is preferably provided in at least one of the stator core 62 and the outer cylinder member 71, and the engagement member 111 may be engaged in the recess. Instead of the engagement member 111, a protrusion may be provided on one of the stator core 62 and the outer cylinder member 71.

In the above-described configuration, the stator core 62 and the stator holder 70 (outer cylinder member 71) are provided while mutual displacement in the circumferential direction is regulated by the engagement member 111 in addition to being fitted and fixed with predetermined interference. Therefore, even if the interference in the stator core 62 and the stator holder 70 is relatively small, the stator core 62 can be prevented from being displaced in the circumferential direction. Since a desired displacement prevention effect can be obtained even if the interference is relatively small, the stator core 62 can be prevented from being damaged due to an excessively large interference. As a result, the displacement of the stator core 62 can be appropriately prevented.

An annular internal space may be formed on the inner peripheral side of the inner cylinder member 81 so as to surround the rotating shaft 11. For example, an electrical component constituting an inverter as a power converter may be disposed in the internal space. The electrical component is, for example, an electrical module making a semiconductor switching element and a capacitor into a package. The electrical module is disposed in contact with the inner peripheral surface of the inner cylinder member 81, so that the electrical module can be cooled by the coolant flowing through the coolant path 85. On the inner peripheral side of the inner cylinder member 81, the plurality of protrusions 83 may be eliminated or the protruding height of the protrusions 83 may be reduced. This change can expand the internal space on the inner peripheral side of the inner cylinder member 81.

Next, the configuration of the stator winding 61 assembled to the core assembly CA will be described in detail. As illustrated in FIGS. 10 and 11, the stator winding 61 is assembled to the core assembly CA. The plurality of winding segments 151 constituting the stator winding 61 are assembled to the outer side of the core assembly CA in the radial direction, that is, to the outer side of the stator core 62 in the radial direction, to be arranged in the circumferential direction.

The stator winding 61 has a plurality of phase windings. The phase windings of respective phases are disposed in a predetermined order in the circumferential direction to be formed in a cylindrical shape (annular shape). In the present embodiment, the stator winding 61 has a three-phase windings including the U-phase, the V-phase, and the W-phase windings.

As illustrated in FIG. 11, the stator 60 includes, in the axial direction, a portion corresponding to a coil side CS facing the magnet unit 22 in the rotor 20 in the radial direction, and a portion corresponding to a coil end CE that is the outer side of the coil side CS in the axial direction. In this case, the stator core 62 is provided in a range corresponding to the coil side CS in the axial direction.

In the stator winding 61, the phase winding of each phase has the plurality of winding segments 151 (see FIG. 16), and the winding segments 151 are individually provided as the coil module 150. That is, the winding segments 151 in the phase windings of each phase are integrally provided to form the coil module 150. The coil modules 150 whose number is predetermined and corresponds to the number of poles constitute the stator winding 61. The coil modules 150 (winding segments 151) of the respective phases are disposed side by side in a predetermined order in the circumferential direction. The conductor portion of the respective phases are thus disposed side by side in a predetermined order at the coil side CS of the stator winding 61. FIG. 10 illustrates an arrangement order of the U-phase, V-phase, and W-phase conductor portions at the coil side CS. In the present embodiment, the number of magnetic poles is set to 24, but the number thereof can be freely set.

Figure 16:
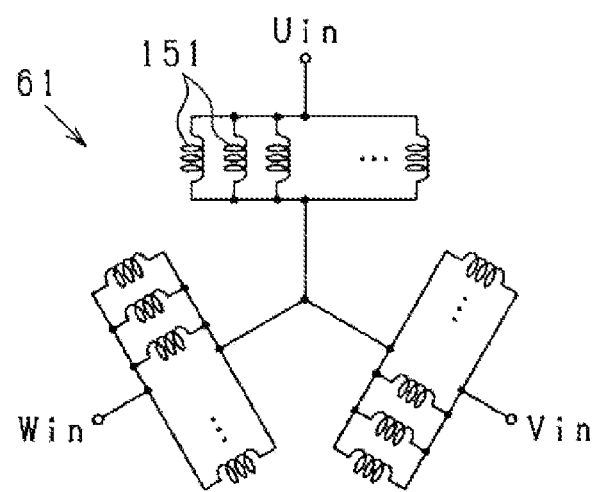
FIG. 16 is a circuit diagram illustrating a connection state of a winding segment in each three-phase winding.

In the stator winding 61, the winding segments 151 of the coil modules 150 are connected in parallel or in series for respective phases, thereby forming phase windings of respective phases. FIG. 16 is a circuit diagram illustrating a connection state of the winding segment 151 in each three-phase winding. FIG. 16 illustrates the winding segments 151 in the phase windings of respective phases in a state of being connected in parallel.

As illustrated in FIG. 11, the coil module 150 is assembled on the outer side of the stator core 62 in the radial direction. In this case, the coil module 150 is assembled while both end portions thereof in the axial direction protrude outward in the axial direction from the stator core 62 (that is, the coil end CE side). In other words, the stator winding 61 has a portion corresponding to the coil end CE protruding outward in the axial direction from the stator core 62, and a portion corresponding to the coil side CS on the inner side of the coil end CE in the axial direction.

The coil module 150 has two types of shapes. One is a shape in which the winding segment 151 is bent inward in the radial direction, that is, bent toward the stator core 62 at the coil end CE. The other is a shape in which the winding segment 151 is not bent inward in the radial direction and extends linearly in the axial direction at the coil end CE. In the following description, for convenience, the winding segment 151 having a bent shape on both end sides in the axial direction is also referred to as a "first winding segment 151A", and the coil module 150 having the first winding segment 151A is also referred to as a "first coil module 150A". On the other hand, the winding segment 151 not having a bent shape on both end sides in the axial direction is also referred to as a "second winding segment 151B", and the coil module 150 having the second winding segment 151B is also referred to as a "second coil module 150B".

Figure 17:
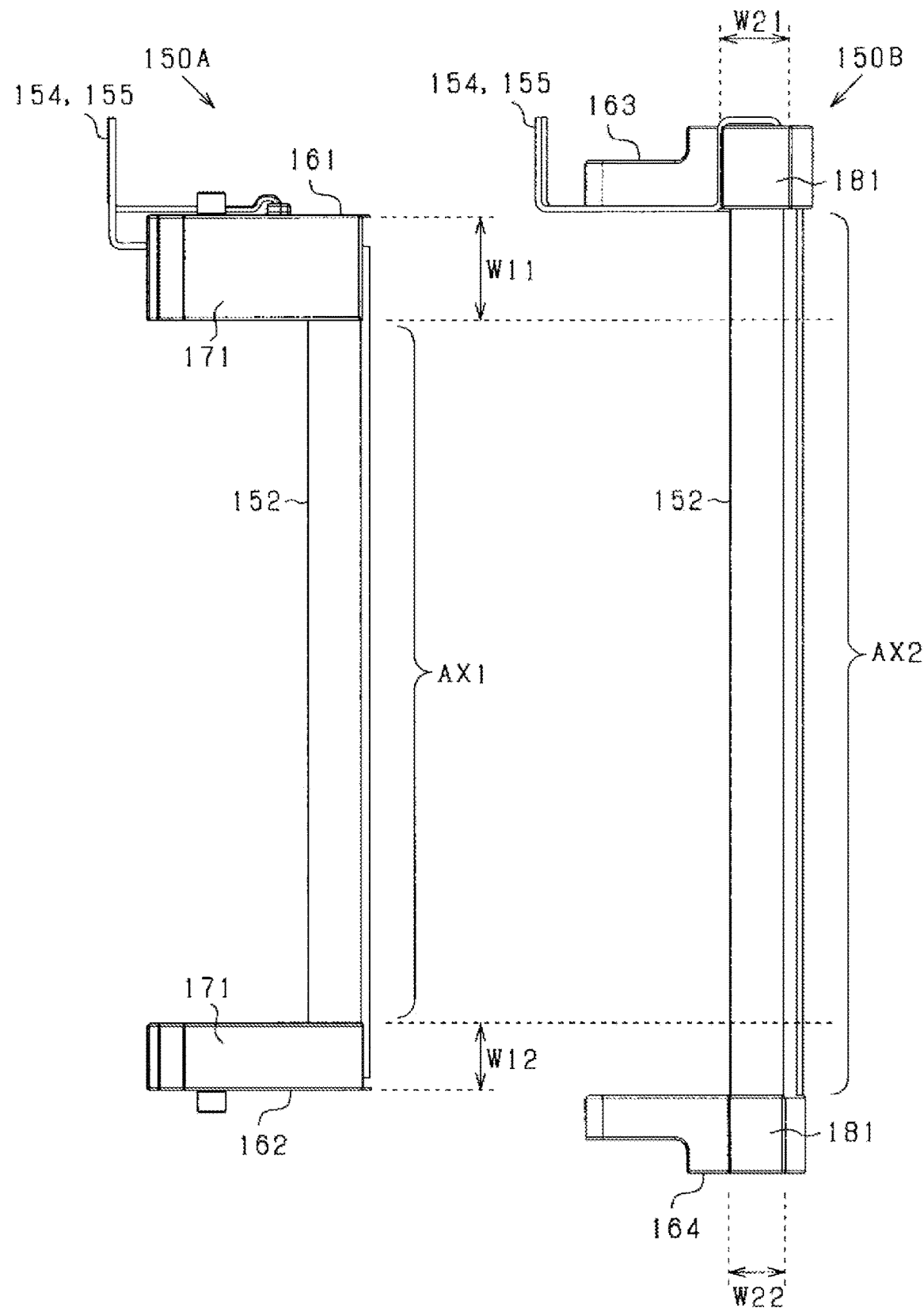
FIG. 17 is a side view illustrating a first coil module and a second coil module arranged side by side for comparison.
Figure 18:
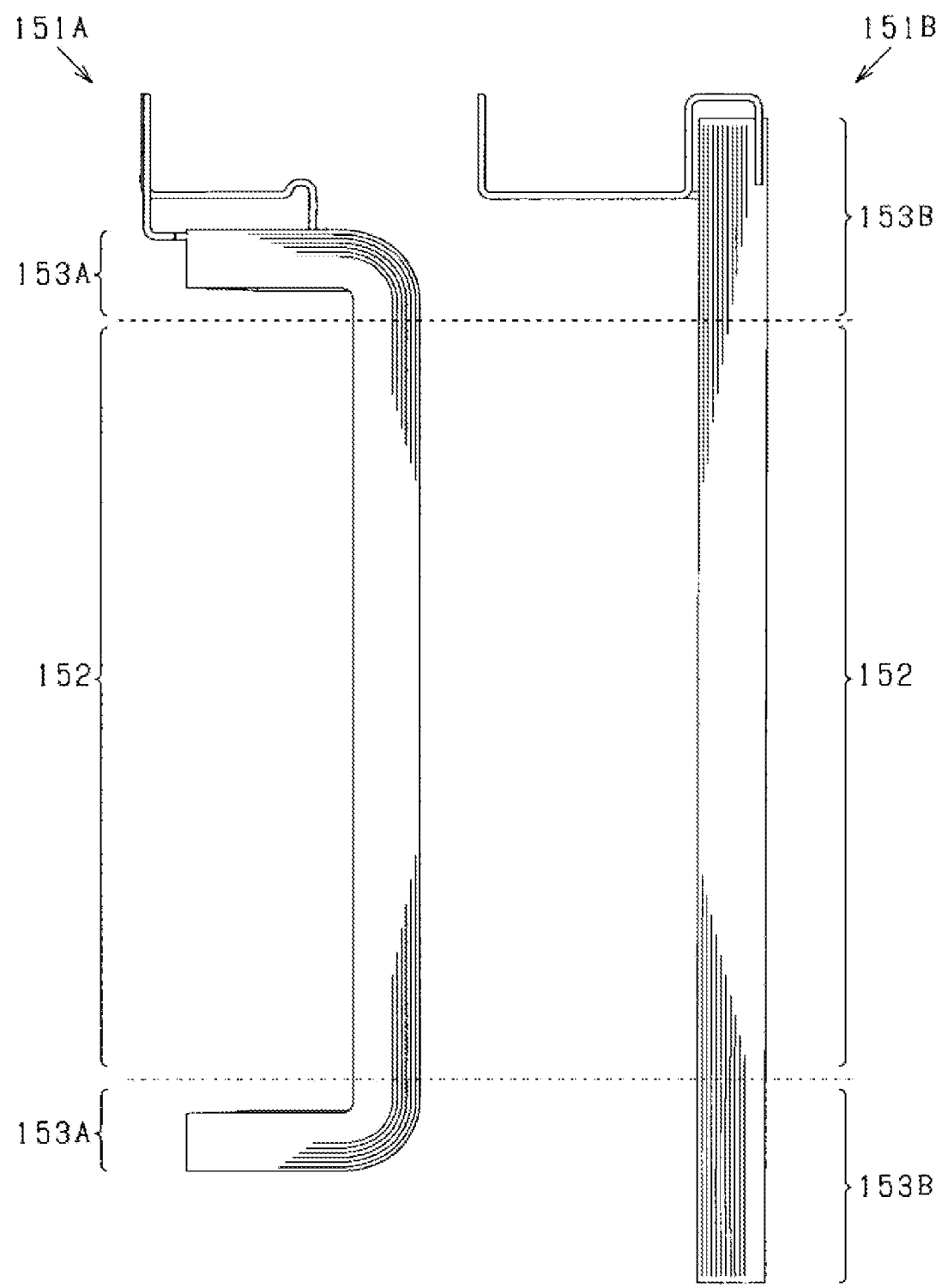
FIG. 18 is a side view illustrating a first winding segment and a second winding segment arranged side by side for comparison.

FIG. 17 is a side view illustrating the first coil module 150A and the second coil module 150B arranged side by side for comparison. FIG. 18 is a side view illustrating the first winding segment 151A and the second winding segment 151B arranged side by side for comparison. As illustrated in these drawings, the coil modules 150A and 150B and the winding segments 151A and 151B have different lengths in the axial direction and different end shapes on both sides in the axial direction. The first winding segment 151A has a substantially C shape in a side view, and the second winding segment 151B has a substantially I shape in a side view. The first winding segment 151A is mounted with insulating covers 161 and 162 as "first insulating covers" on both sides in the axial direction, and the second winding segment 151B is mounted with insulating covers 163 and 164 as "second insulating covers" on both sides in the axial direction.

Next, the configurations of the coil modules 150A and 150B will be described in detail.

Figure 20:
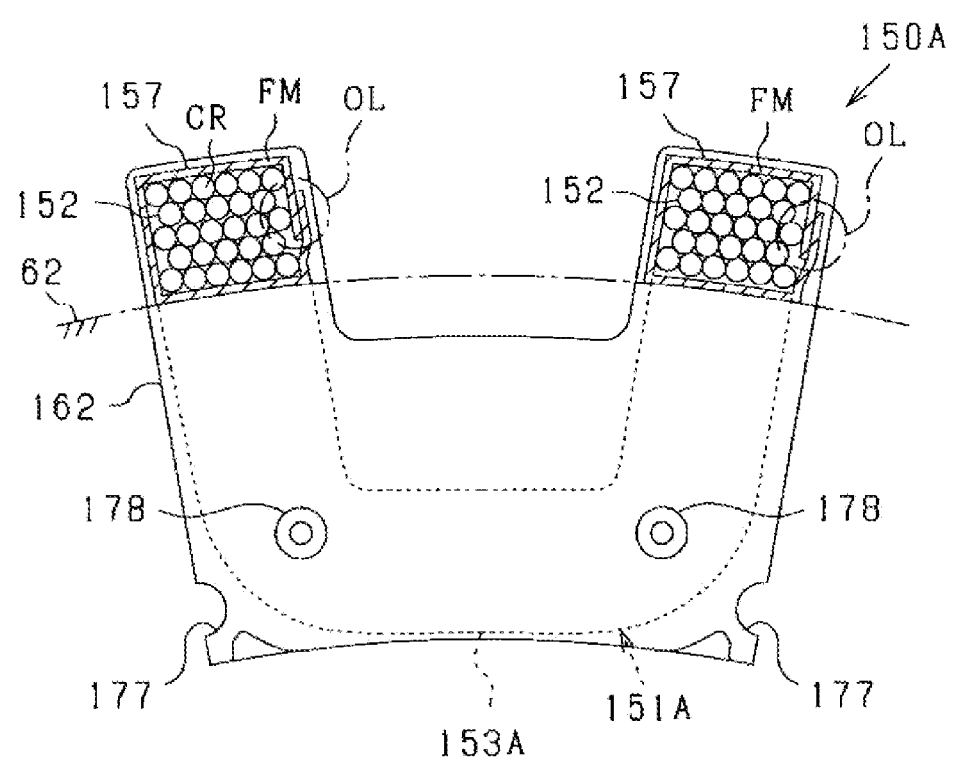
FIG. 20 is a sectional view taken along line 20-20 in (a) of FIG. 19.

Of the coil modules 150A and 150B, first, the first coil module 150A will now be described. (a) of FIG. 19 is a perspective view illustrating a configuration of the first coil module 150A. (b) of FIG. 19 is an exploded perspective view illustrating components of the first coil module 150A. FIG. 20 is a sectional view taken along line 20-20 in (a) of FIG. 19.

As illustrated in (a) and (b) in FIG. 19, the first coil module 150A includes the first winding segment 151A and the insulating covers 161 and 162. The first winding segment 151A is formed by multiply winding a conductive wire member CR. The insulating covers 161 and 162 are respectively attached to one end side and the other end side of the first winding segment 151A in the axial direction. The insulating covers 161 and 162 are each formed of an insulating material such as synthetic resin.

The first winding segment 151A includes a pair of intermediate conductor portions 152 and a pair of link portions 153A. The pair of intermediate conductor portions 152 are provided to be in parallel to each other and have a linear shape. The pair of link portions 153A respectively connect the pair of intermediate conductor portions 152 at both ends in the axial direction. The first winding segment 151A is formed in an annular shape by the pair of intermediate conductor portions 152 and the pair of link portions 153A. The pair of intermediate conductor portions 152 are separated at a predetermined coil pitch. The intermediate conductor portions 152 of the winding segments 151 of the other phases can be disposed between the pair of intermediate conductor portions 152 in the circumferential direction. In the present embodiment, the pair of intermediate conductor portions 152 are separated at two coil pitches. One intermediate conductor portion 152 for each of the winding segments 151 of the other two phases is disposed between the pair of intermediate conductor portions 152.

The pair of link portions 153A have the shape identical to each other on both sides in the axial direction, and are provided as portions corresponding to the coil ends CE (see FIG. 11). Each of the link portions 153A is provided so as to be bent in a direction orthogonal to the intermediate conductor portion 152, that is, in a direction orthogonal to the axial direction.

As illustrated in FIG. 18, the first winding segment 151A has the link portion 153A on both sides in the axial direction, and the second winding segment 151B has a link portion 153B on both sides in the axial direction. The link portions 153A and 153B of the respective winding segments 151A and 151B have different shapes. In order to clarify the distinction, the link portion 153A of the first winding segment 151A is also referred to as a "first link portion 153A", and the link portion 153B of the second winding segment 151B is also referred to as a "second link portion 153B".

In each of the winding segments 151A and 151B, the intermediate conductor portion 152 is provided as a coil side conductor portion arranged one by one in the circumferential direction at the coil side CS. Each of the link portions 153A and 153B is provided as a coil end conductor portion connecting the intermediate conductor portions 152 of the same phase at two positions different in the circumferential direction at the coil end CE.

As illustrated in FIG. 20, the first winding segment 151A is formed by multiply winding the conductive wire member CR such that the transverse section of a bunch of conductive wire members is quadrangular. FIG. 20 illustrates a transverse section of the intermediate conductor portion 152. In the intermediate conductor portion 152, the conductive wire member CR is multiply wound so as to be arranged in the circumferential direction and the radial direction. In other words, the conductive wire member CR is arranged in a plurality of rows in the circumferential direction and arranged in a plurality of rows in the radial direction in the intermediate conductor portion 152. With this arrangement, the first winding segment 151A is formed such that the transverse section of a bunch of conductive wire members has a substantially rectangular shape. At the extending end of the first link portion 153A, the conductive wire member CR is multiply wound so as to be arranged in the axial direction and the radial direction by being bent in the radial direction. In the present embodiment, the conductive wire member CR is concentrically wound to form the first winding segment 151A. However, any winding method of the conductive wire member CR may be employed. The conductive wire member CR may be multiply wound in a form of alpha winding instead of concentric winding.

In the first winding segment 151A, an end of the conductive wire member CR is drawn out from one first link portion 153A (the first link portion 153A on the upper side of (b) of FIG. 19) among the first link portions 153A on both sides in the axial direction. These ends serve as winding ends 154 and 155. The winding ends 154 and 155 are portions that respectively start and end winding of the conductive wire member CR. One of the winding ends 154 and 155 is connected to a current (input/output) I/O terminal, and the other is connected to a neutral point.

In the first winding segment 151A, each intermediate conductor portion 152 is covered with a sheet-like insulating jacket 157. (a) of FIG. 19 illustrates the first coil module 150A in which the intermediate conductor portion 152 is covered with the insulating jacket 157 and is on the inner side of the insulating jacket 157. However, for convenience, such a portion is referred to as an intermediate conductor portion 152 (the same applies to (a) of FIG. 22 to be described later).

The insulating jacket 157 employs a film member FM having at least a length of a range of the intermediate conductor portion 152 to be covered with and insulated in the axial direction as a dimension in the axial direction. The insulating jacket 157 is provided by winding the film member FM around the intermediate conductor portion 152. The film member FM is made of, for example, a polyethylene naphthalate (PEN) film. More specifically, the film member FM includes a film base material and an adhesion layer provided on one of both surfaces of the film base material and having foamability. The film member FM is wound around the intermediate conductor portion 152 while being adhered by an adhesion layer. A non-foamable adhesive can also be used as the adhesion layer.

As illustrated in FIG. 20, the conductive wire member CR is arranged in the circumferential direction and the radial direction, whereby the intermediate conductor portion 152 has a substantially rectangular transverse section. The film member FM covers around the intermediate conductor portion 152 with the ends of the film member FM in the circumferential direction overlapping each other, whereby the insulating jacket 157 is provided. The film member FM is a rectangular sheet whose longitudinal dimension is greater than the length of the intermediate conductor portion 152 in the axial direction and whose lateral dimension is greater than a single wrap-around length of the intermediate conductor portion 152. The film member FM is wound around the intermediate conductor portion 152 while being creased to fit to a sectional shape of the intermediate conductor portion 152. When the film member FM is wound around the intermediate conductor portion 152, a gap between the conductive wire member CR of the intermediate conductor portion 152 and the film base material can be filled with foam generated from the adhesion layer. In an overlapping portion OL of the film member FM, the ends of the film member FM in the circumferential direction are joined to each other by an adhesion layer.

In the intermediate conductor portion 152, the insulating jacket 157 is provided so as to cover all of the two side surfaces in the circumferential direction and the two side surfaces in the radial direction. In this case, the insulating jacket 157 surrounding the intermediate conductor portion 152 includes the overlapping portion OL where the film member FM overlaps. The overlapping portion OL is provided at a portion facing the intermediate conductor portion 152 in the winding segment 151 of the other phase, that is, one of two side surfaces of the intermediate conductor portion 152 in the circumferential direction. In the present embodiment, the overlapping portions OL are respectively provided on the same side in the circumferential direction in the pair of intermediate conductor portions 152.

In the first winding segment 151A, the insulating jacket 157 is provided in a range from the intermediate conductor portion 152 to a portion covered with the insulating covers 161 and 162 in the first link portion 153A on both sides in the axial direction (i.e., a portion on the inner side of the insulating covers 161 and 162). With reference to FIG. 17, a range of AX1 in the first coil module 150A is a portion not covered with the insulating covers 161 or 162, and the insulating jacket 157 is provided in a range vertically expanded from the range AX1.

Next, a configuration of the insulating covers 161 and 162 will be described.

The insulating cover 161 is mounted to the first link portion 153A on one side of the first winding segment 151A in the axial direction. The insulating cover 162 is mounted to the first link portion 153A on the other side of the first winding segment 151A in the axial direction. Among them, the configuration of the insulating cover 161 is illustrated in (a) and (b) of FIG. 21. (a) and (b) of FIG. 21 are perspective views of the insulating cover 161 as viewed from two different directions.

As illustrated in (a) and (b) of FIG. 21, the insulating cover 161 includes a pair of side surface portions 171 serving as side surfaces in the circumferential direction, the outer surface portion 172 on the outer side in the axial direction, an inner surface portion 173 on the inner side in the axial direction, and a front surface portion 174 on the inner side in the radial direction. Each of these portions 171 to 174 is formed in a plate shape, and is three-dimensionally joined to each other such that only the outer side in the radial direction is open. Each of the pair of side surface portions 171 is provided in a direction extending toward the axial center of the core assembly CA with the core assembly CA being assembled. Therefore, in a state where the plurality of first coil modules 150A are disposed side by side in the circumferential direction, the side surface portions 171 of the insulating cover 161 face each other while being in contact with or close to each other in the adjacent first coil modules 150A. As a result, the first coil modules 150A adjacent to each other in the circumferential direction can be disposed in a suitable annular shape while being insulated from each other.

In the insulating cover 161, the outer surface portion 172 includes an opening 175a for drawing out the winding end 154 of the first winding segment 151A, and the front surface portion 174 includes an opening 175b for drawing out the winding end 155 of the first winding segment 151A. In this case, one winding end 154 is drawn out in the axial direction from the outer surface portion 172, whereas the other winding end 155 is drawn out in the radial direction from the front surface portion 174.

In the insulating cover 161, the pair of side surface portions 171 each include semicircular recesses 177 extending in the axial direction at both ends of the front surface portion 174 in the circumferential direction, that is, positions where the side surface portions 171 and the front surface portion 174 intersect. The outer surface portion 172 includes a pair of protrusions 178 extending in the axial direction at positions symmetrical on both sides in the circumferential direction with the center line of the insulating cover 161 in the circumferential direction as a reference.

The supplementary description of the recess 177 of the insulating cover 161 will be provided. As illustrated in FIG. 20, the first link portion 153A of the first winding segment 151A has a curved shape that protrudes inward in the radial direction, that is, toward the core assembly CA, among inward and outward in the radial direction. In such a configuration, a gap that becomes wider toward the extending end side of the first link portion 153A is formed between the first link portions 153A adjacent to each other in the circumferential direction. In the present embodiment, by utilizing the gap between the first link portions 153A arranged in the circumferential direction, the recess 177 is provided at a position on the outer side of the curved portion of the first link portion 153A at the side surface portion 171 of the insulating cover 161.

A temperature detector (thermistor) may be provided in the first winding segment 151A. In such a configuration, an opening for drawing out a signal line extending from the temperature detector is preferably provided in the insulating cover 161. In this case, the temperature detector can be suitably accommodated in the insulating cover 161.

Although not described in detail with reference to the drawings, the insulating cover 162 on the other side in the axial direction has a configuration substantially the same as or similar to the insulating cover 161. Similarly to the insulating cover 161, the insulating cover 162 includes the pair of side surface portions 171, the outer surface portion 172 on the outer side in the axial direction, the inner surface portion 173 on the inner side in the axial direction, and the front surface portion 174 on the inner side in the radial direction. In the insulating cover 162, the pair of side surface portions 171 each include the semicircular recesses 177 at both ends of the front surface portion 174 in the circumferential direction, and the outer surface portion 172 includes the pair of protrusions 178. A difference from the insulating cover 161 is that the insulating cover 162 does not include an opening for drawing out the winding ends 154 and 155 of the first winding segment 151A.

In the insulating covers 161 and 162, the height dimensions thereof in the axial direction (i.e., the width dimension in the axial direction of the pair of side surface portions 171 and the front surface portion 174) differ from each other. Specifically, as illustrated in FIG. 17, W11>W12 is satisfied, where W11 represents a height dimension of the insulating cover 161 in the axial direction, and W12 represents a height dimension of the insulating cover 162 in the axial direction. The reasons for the above are as follows. The multiply wound conductive wire member CR requires the winding stage of the conductive wire member CR to be shifted to the subsequent stage (lane-changed) in a direction orthogonal to the winding direction (turning direction). Accordingly, the winding width is considered to be increased due to the shift thereof. To supplement, the insulating cover 161 among the insulating cover 161 and 162 is a portion covering the first link portion 153A on the side including the winding start and the winding end of the conductive wire member CR. Since the first link portion 153A includes the winding start and the winding end of the conductive wire member CR, the winding margin (overlapping margin) of the conductive wire member CR at the first link portion 153A becomes larger than that at the other portions, resulting in the potentially large winding width. Taking these factors into consideration, the height dimension W11 of the insulating cover 161 in the axial direction is greater than the height dimension W12 of the insulating cover 162 in the axial direction. The above configuration can eliminate the inconvenience that the number of turns of the conductive wire member CR is limited by the insulating covers 161 and 162, unlike the case where the respective height dimensions W11 and W12 of the insulating covers 161 and 162 have the dimension identical to each other.

Next, the second coil module 150B will be described.

Figure 23:
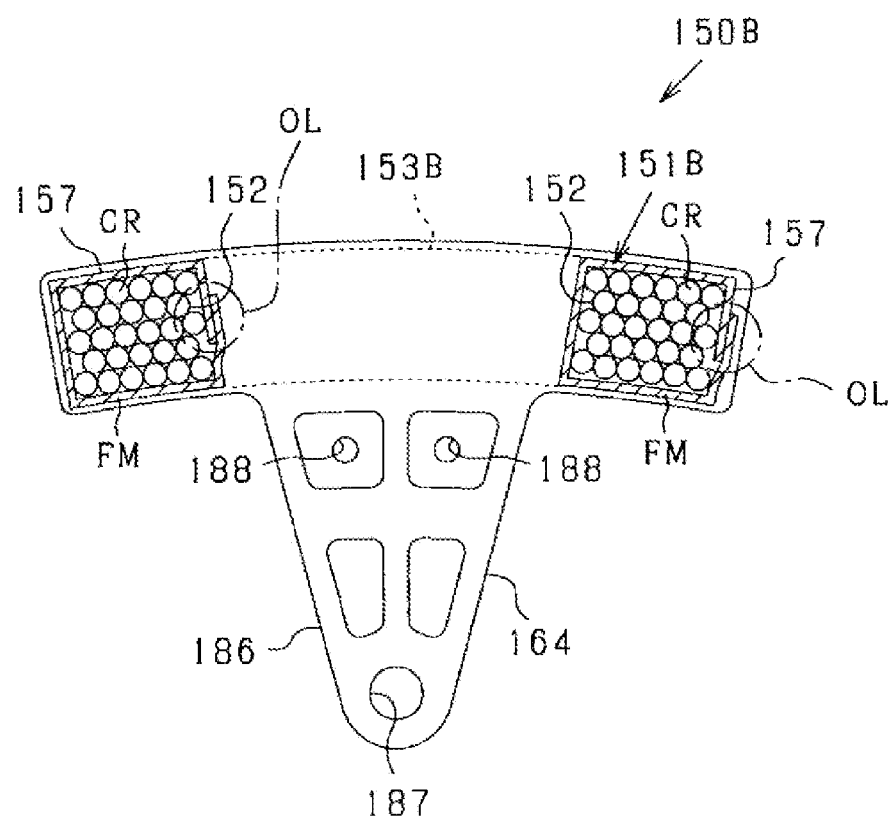
FIG. 23 is a sectional view taken along line 23-23 in (a) of FIG. 22.

(a) of FIG. 22 is a perspective view illustrating a configuration of the second coil module 150B, and (b) of FIG. 22 is an exploded perspective view illustrating components of the second coil module 150B. FIG. 23 is a sectional view taken along line 23-23 in (a) of FIG. 22.

As illustrated in (a) and (b) in FIG. 22, the second coil module 150B includes the second winding segment 151B and the insulating covers 163 and 164. Similarly to the first winding segment 151A, the second winding segment 151B is formed by multiply winding the conductive wire member CR. The insulating covers 163 and 164 are respectively attached to one end side and the other end side of the second winding segment 151B in the axial direction. The insulating covers 163 and 164 are each formed of an insulating material such as synthetic resin.

The second winding segment 151B includes a pair of intermediate conductor portions 152 and a pair of second link portions 153B. The pair of intermediate conductor portions 152 are provided to be in parallel to each other and have a linear shape. The pair of second link portions 153B connect the pair of intermediate conductor portions 152 at both ends in the axial direction. The second winding segment 151B is formed in an annular shape by the pair of intermediate conductor portions 152 and the pair of second link portions 153B. In the second winding segment 151B, the pair of intermediate conductor portions 152 have the same configuration as the intermediate conductor portions 152 of the first winding segment 151A. On the other hand, the pair of second link portions 153B is different in configuration from the first link portions 153A of the first winding segment 151A. The second link portions 153B of the second winding segment 151B are provided so as to linearly extend in the axial direction from the intermediate conductor portion 152 without being bent in the radial direction. FIG. 18 clearly illustrates the difference between the winding segments 151A and 151B in comparison.

In the second winding segment 151B, an end of the conductive wire member CR is drawn out from one second link portion 153B (the second link portion 153B on the upper side of (b) of FIG. 22) among the second link portions 153B on both sides in the axial direction. These ends serve as the winding ends 154 and 155. Also in the second winding segment 151B, similarly to the first winding segment 151A, one of the winding ends 154 and 155 is connected to the current I/O terminal, and the other is connected to a neutral point.

In the second winding segment 151B, similarly to the first winding segment 151A, each intermediate conductor portion 152 is covered with a sheet-like insulating jacket 157. The insulating jacket 157 employs the film member FM having at least a length of a range of the intermediate conductor portion 152 to be covered with and insulated in the axial direction as a dimension in the axial direction. The insulating jacket 157 is provided by winding the film member FM around the intermediate conductor portion 152.

The configuration related to the insulating jacket 157 is substantially the same or similar to each other in the winding segments 151A and 151B. That is, as illustrated in FIG. 23, the film member FM covers around the intermediate conductor portion 152 with the ends of the film member FM in the circumferential direction overlapping each other. In the intermediate conductor portion 152, the insulating jacket 157 is provided so as to cover all of the two side surfaces in the circumferential direction and the two side surfaces in the radial direction. In this case, the insulating jacket 157 surrounding the intermediate conductor portion 152 includes the overlapping portion OL where the film member FM overlaps. The overlapping portion OL is provided at a portion facing the intermediate conductor portion 152 in the winding segment 151 of the other phase, that is, one of two side surfaces of the intermediate conductor portion 152 in the circumferential direction. In the present embodiment, the overlapping portions OL are respectively provided on the same side in the circumferential direction in the pair of intermediate conductor portions 152.

In the second winding segment 151B, the insulating jacket 157 is provided in a range from the intermediate conductor portion 152 to a portion covered with the insulating covers 163 and 164 in the second link portion 153B on both sides in the axial direction (i.e., a portion on the inner side of the insulating covers 163 and 164). With reference to FIG. 17, a range of AX2 in the second coil module 150B is a portion not covered with the insulating covers 163 and 164, and the insulating jacket 157 is provided in a range vertically expanded from the range AX2.

In each of the winding segments 151A and 151B, the insulating jacket 157 is provided in a range including part of the link portions 153A and 153B. In other words, in each of the winding segments 151A and 151B, the insulating jacket 157 is provided in the intermediate conductor portion 152 and a portion of the link portions 153A and 153B continuously extending linearly from the intermediate conductor portion 152. However, since the lengths of the winding segments 151A and 151B in the axial direction differ from each other, the ranges of the insulating jacket 157 in the axial direction also differ from each other.

Next, a configuration of the insulating covers 163 and 164 will be described.

The insulating cover 163 is mounted to the second link portion 153B on one side of the second winding segment 151B in the axial direction. The insulating cover 164 is mounted to the second link portion 153B on the other side of the second winding segment 151B in the axial direction.

Among them, the configuration of the insulating cover 163 is illustrated in (a) and (b) of FIG. 24. (a) and (b) of FIG. 24 are perspective views of the insulating cover 163 as viewed from two different directions.

As illustrated in (a) and (b) of FIG. 24, the insulating cover 163 includes a pair of side surface portions 181 serving as side surfaces in the circumferential direction, an outer surface portion 182 on the outer side in the axial direction, a front surface portion 183 on the inner side in the radial direction, and a rear surface portion 184 on the outer side in the radial direction. Each of these portions 181 to 184 is formed in a plate shape, and is three-dimensionally joined to each other such that only the inner side in the axial direction is open. Each of the pair of side surface portions 181 is provided in a direction extending toward the axial center of the core assembly CA with the core assembly CA being assembled. Therefore, in a state where the plurality of second coil modules 150B are disposed side by side in the circumferential direction, the side surface portions 181 of the insulating cover 163 face each other while being in contact with or close to each other in the adjacent second coil modules 150B. As a result, the second coil modules 150B adjacent to each other in the circumferential direction can be disposed in a suitable annular shape while being insulated from each other.

In the insulating cover 163, the front surface portion 183 includes an opening 185a for drawing out the winding end 154 of the second winding segment 151B, and the outer surface portion 182 includes an opening 185b for drawing out the winding end 155 of the second winding segment 151B.

The front surface portion 183 of the insulating cover 163 includes a protrusion 186 protruding inward in the radial direction. The protrusion 186 is provided at a central position between one end and the other end in the circumferential direction of the insulating cover 163 so as to protrude inward in the radial direction from the second link portion 153B. The protrusion 186 has a tapered shape that tapers toward the inner side in the radial direction in plan view. A through-hole 187 extending in the axial direction is provided at an extending end thereof. The protrusion 186 can employ any configurations as long as the protrusion 186 protrudes inward in the radial direction from the second link portion 153B and has the through-hole 187 at the central position between one end and the other end of the insulating cover 163 in the circumferential direction. However, assuming a state of overlapping with the insulating cover 161 on the inner side in the axial direction, the protrusion 186 is desirably formed to have a small width in the circumferential direction so as to avoid interference with the winding ends 154 and 155.

The protrusion 186 is thinned in the axial direction in a stepwise manner at the extending end on the inner side in the radial direction. The through-hole 187 is provided at a low step portion 186a thus thinned. The low step portion 186a corresponds to a portion where the height from the end surface of the inner cylinder member 81 in the axial direction is smaller than the height of the second link portion 153B in a state where the second coil module 150B is assembled to the core assembly CA.

As illustrated in FIG. 23, the protrusion 186 includes a through-hole 188 passing therethrough in the axial direction. Accordingly, in a state where the insulating covers 161 and 163 overlap each other in the axial direction, a space between the insulating covers 161 and 163 can be filled with the adhesive through the through-hole 188.

Although not described in detail with reference to the drawings, the insulating cover 164 on the other side in the axial direction has a configuration substantially the same as or similar to the insulating cover 163. Similarly to the insulating cover 163, the insulating cover 164 includes the pair of side surface portions 181, the outer surface portion 182 on the outer side in the axial direction, the front surface portion 183 on the inner side in the radial direction, and the rear surface portion 184 on the outer side in the radial direction. The insulating cover 164 further includes the through-hole 187 provided at the extending end of the protrusion 186. A difference from the insulating cover 163 is that the insulating cover 164 does not include an opening for drawing out the winding ends 154 and 155 of the second winding segment 151B.

In the insulating covers 163 and 164, the width dimensions of the pair of side surface portions 181 in the radial direction differ from each other. Specifically, as illustrated in FIG. 17, W21>W22 is satisfied, where W21 represents a width dimension of the side surface portion 181 in the insulating cover 163 in the radial direction, and W22 represents a width dimension of the side surface portion 181 in the insulating cover 164 in the radial direction. In other words, the insulating cover 163 among the insulating cover 163 and 164 is a portion covering the second link portion 153B on the side including the winding start and the winding end of the conductive wire member CR. Since the second link portion 153B includes the winding start and the winding end of the conductive wire member CR, the winding margin (overlapping margin) of the conductive wire member CR at the second link portion 153B becomes larger than that at the other portions, resulting in the potentially large winding width. Taking this factor into consideration, the width dimension W21 of the insulating cover 163 in the radial direction is greater than the width dimension W22 of the insulating cover 164 in the radial direction. The above configuration can eliminate the inconvenience that the number of turns of the conductive wire member CR is limited by the insulating covers 163 and 164, unlike the case where the respective width dimensions W21 and W22 of the insulating covers 163 and 164 have the dimension identical to each other.

Figure 25:
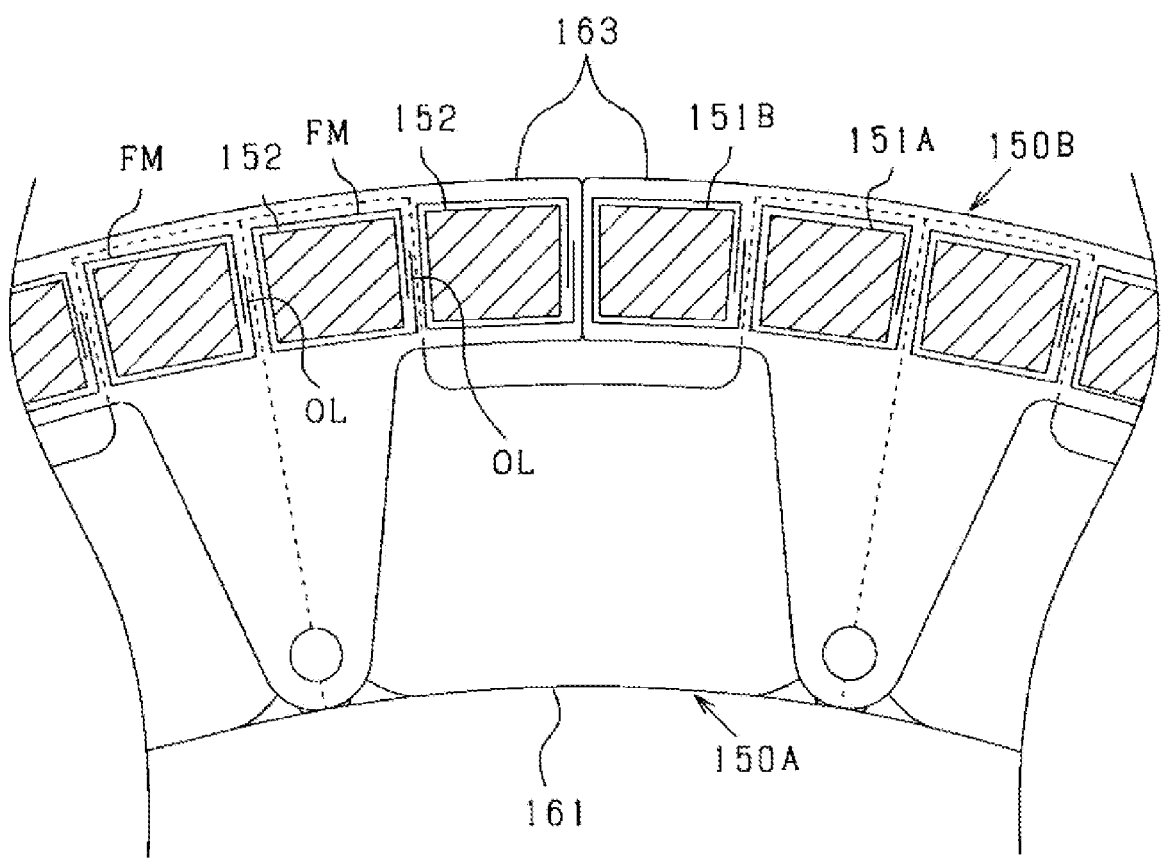
FIG. 25 is a view illustrating an overlapping position of the film member in a state where the coil modules are arranged in a circumferential direction.

FIG. 25 is a view illustrating an overlapping position of the film member FM in a state where the coil modules 150A and 150B are arranged in the circumferential direction. As described above, in each of the coil modules 150A and 150B, the periphery of the intermediate conductor portion 152 is covered with the film member FM so as to overlap with each other at the portion of the winding segment 151 of the other phase facing the intermediate conductor portion 152, that is, at the side surface of the intermediate conductor portion 152 in the circumferential direction (see FIGS. 20 and 23). In a state where the coil modules 150A and 150B are disposed in the circumferential direction, the overlapping portions OL of the film members FM are disposed on the same side among both sides in the circumferential direction (the right side in the circumferential direction in the drawing). With this arrangement, in the intermediate conductor portions 152 of the winding segments 151A and 151B of different phases adjacent to each other in the circumferential direction, the overlapping portions OL of the film members FM do not overlap with each other in the circumferential direction. In this case, a maximum of three film members FM overlap with each other between the intermediate conductor portions 152 arranged in the circumferential direction.

Next, a configuration related to assembly of the coil modules 150A and 150B to the core assembly CA will be described.

The coil modules 150A and 150B have different lengths in axial direction and different shapes of the link portions 153A and 153B of the winding segments 151A and 151B. The coil modules 150A and 150B are attached to the core assembly CA while the first link portion 153A of the first coil module 150A is disposed on the inner side in the axial direction and the second link portion 153B of the second coil module 150B is disposed on the outer side in the axial direction. As for the insulating covers 161 to 164, each of the insulating covers 161 to 164 is fixed to the core assembly CA while the insulating covers 161 and 163 are overlapped in the axial direction on one end side of the respective coil modules 150A and 150B in the axial direction and the insulating covers 162 and 164 are overlapped in the axial direction on the other end side of the respective coil modules 150A and 150B in the axial direction.

Figure 26:
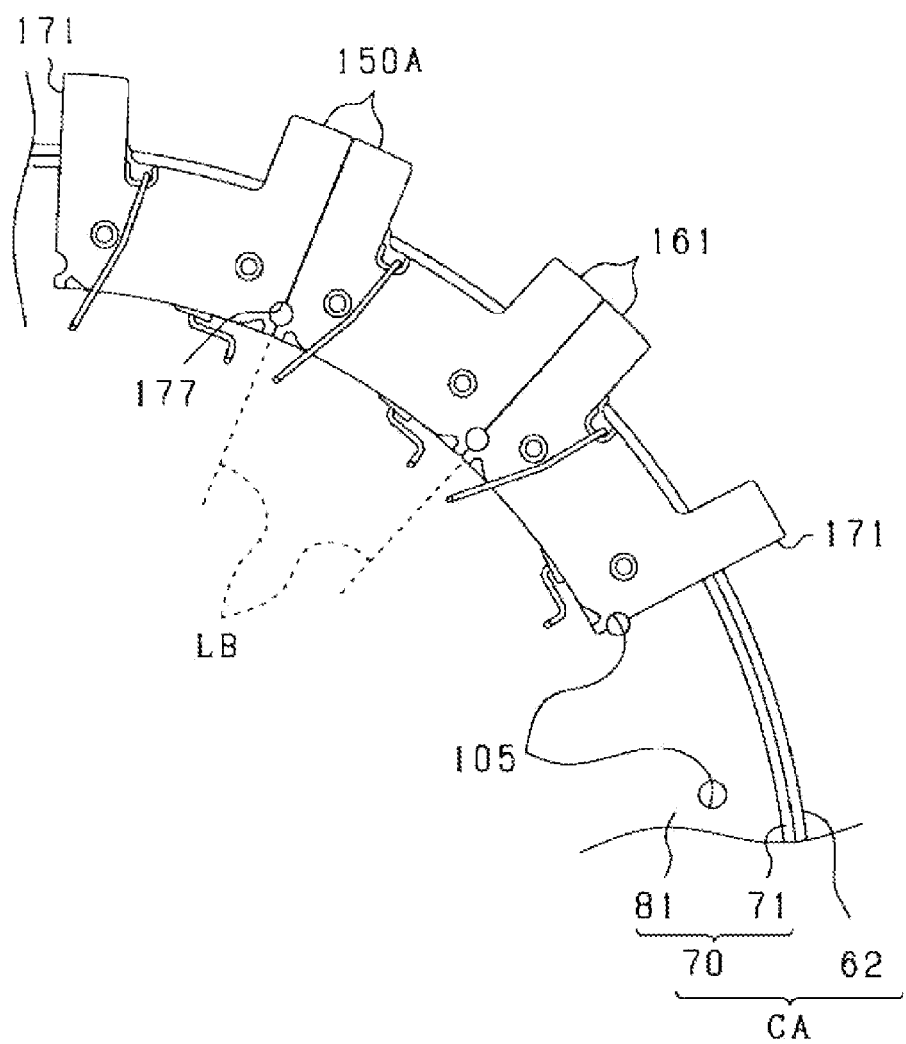
FIG. 26 is a plan view illustrating a state where the first coil module is assembled to the core assembly.
Figure 27:
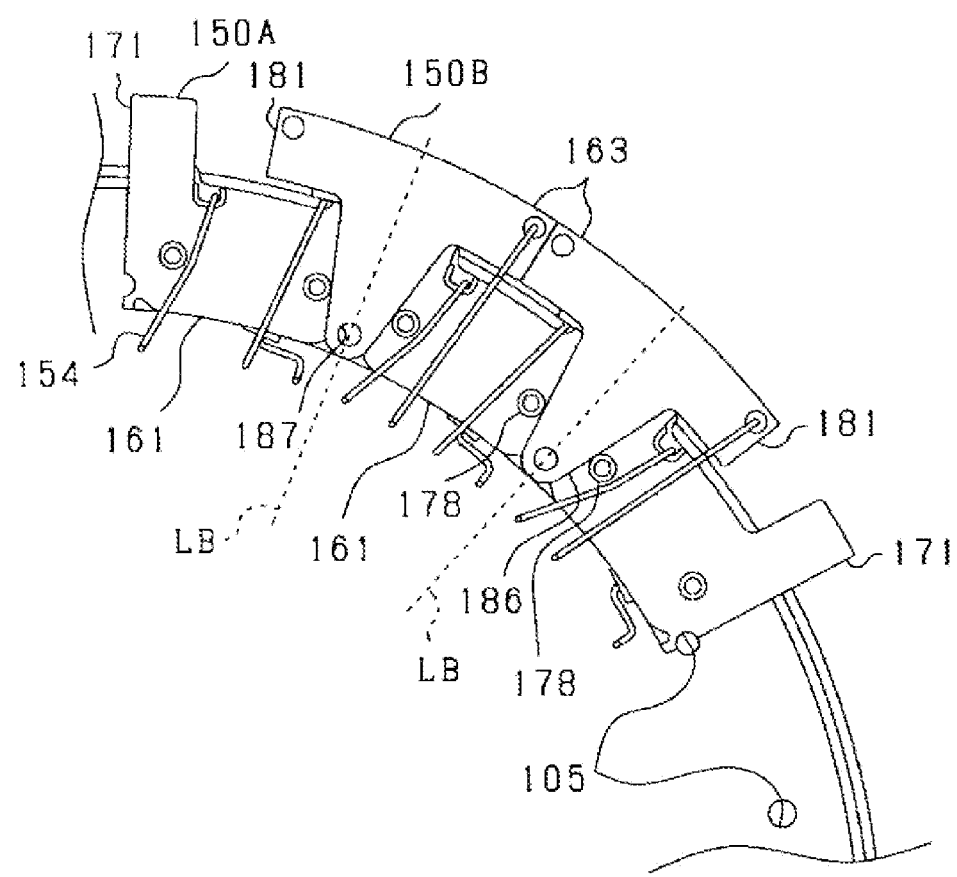
FIG. 27 is a plan view illustrating a state where the first coil module and the second coil module are assembled to the core assembly.
Figure 28:
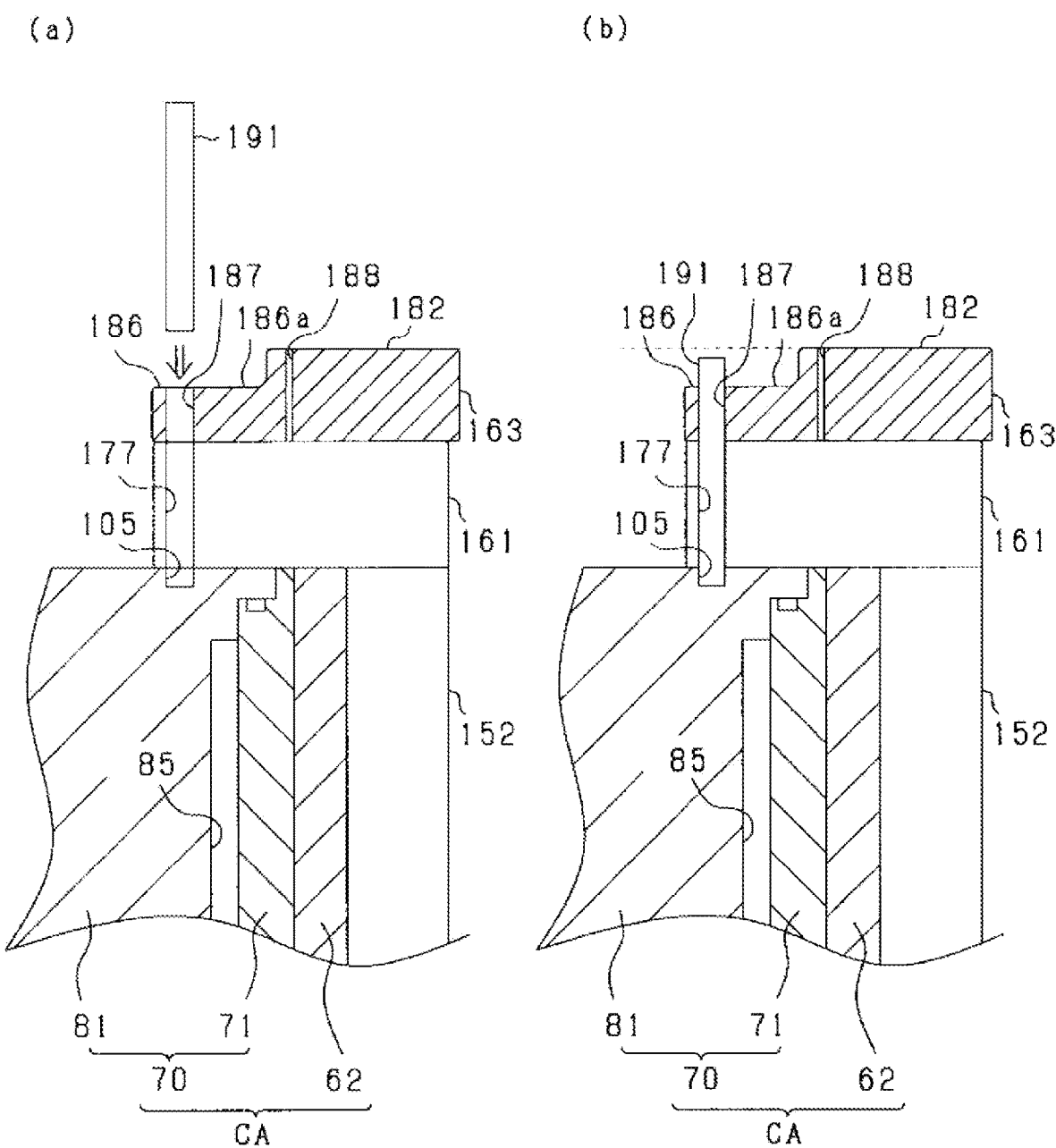
FIG. 28 is a longitudinal sectional view illustrating a fixed state by using a fastening pin.

FIG. 26 is a plan view illustrating a state where the plurality of insulating covers 161 are arranged in the circumferential direction while the first coil module 150A is assembled to the core assembly CA. FIG. 27 is a plan view illustrating a state where the plurality of insulating covers 161 and 163 are arranged in the circumferential direction while the first coil module 150A and the second coil module 150B are assemble to the core assembly CA. (a) of FIG. 28 is a longitudinal sectional view illustrating a state before fixation with a fastening pin 191 while the coil modules 150A and 150B are assemble to the core assembly CA. (b) of FIG. 28 is a longitudinal sectional view illustrating a state after fixation with the fastening pin 191 while the coil modules 150A and 150B are assemble to the core assembly CA.

As illustrated in FIG. 26, in a state where the plurality of first coil modules 150A are assembled to the core assembly CA, the plurality of insulating covers 161 are disposed with the side surface portions 171 being in contact with or close to each other. Each of the insulating covers 161 is disposed such that a boundary line LB at which the side surface portions 171 face each other lays over the recess 105 on the end surface of the inner cylinder member 81 in the axial direction. In this case, when the side surface portions 171 of the insulating covers 161 adjacent to each other in the circumferential direction are brought into contact with or close to each other, a through-hole portion extending in the axial direction is formed by each of the recesses 177 of the insulating covers 161. The positions of the through-hole portion and the recess 105 then match each other.

As illustrated in FIG. 27, the second coil module 150B is further assembled to the integrated object of the core assembly CA and the first coil module 150A. This assembly involves disposing the plurality of insulating covers 163 with the side surface portions 181 being in contact with or close to each other. In this state, the link portions 153A and 153B are disposed so as to cross each other on a circle in which the intermediate conductor portions 152 are arranged in the circumferential direction. Each insulating cover 163 is disposed such that the protrusion 186 overlaps the insulating cover 161 in the axial direction and the through-hole 187 of the protrusion 186 is connected in the axial direction to the through-hole portion formed by each recess 177 of the insulating cover 161.

At this time, the protrusion 186 of the insulating cover 163 is guided to a predetermined position by the pair of protrusions 178 provided on the insulating cover 161. In this way, the position of the through-hole 187 on the insulating cover 163 side matches the position of the through-hole portion and the recess 105 of the inner cylinder member 81 on the insulating cover 161 side. More specifically, in a state where the coil modules 150A and 150B are assembled to the core assembly CA, the recess 177 of the insulating cover 161 is positioned on the back side of the insulating cover 163. Thus, the through-hole 187 of the protrusion 186 may be difficult to be aligned with the recess 177 of the insulating cover 161. In this respect, the protrusion 186 of the insulating cover 163 is guided by the pair of protrusions 178 of the insulating cover 161, so that the alignment of the insulating cover 163 with respect to the insulating cover 161 is facilitated.

As illustrated in (a) and (b) of FIG. 28, fixing with the fastening pin 191 as a fastening member is then performed while the insulating cover 161 and the protrusion 186 of the insulating cover 163 are engaged with the fastening pin 191 at their overlapping portion. More specifically, the fastening pin 191 is inserted into the recesses 105 and 177 and the through-hole 187 while the recess 105 of the inner cylinder member 81, the recess 177 of the insulating cover 161, and the through-hole 187 of the insulating cover 163 are aligned. Accordingly, the insulating covers 161 and 163 are integrally fixed to the inner cylinder member 81. According to this configuration, the coil modules 150A and 150B adjacent to each other in the circumferential direction are fixed to the core assembly CA by the common fastening pin 191 at the coil end CE. The fastening pin 191 desirably includes a material having good thermal conductivity, and is, for example, a metal pin.

As illustrated in (b) of FIG. 28, the fastening pin 191 is assembled to the low step portion 186a of the protrusion 186 of the insulating cover 163. In this state, the upper end of the fastening pin 191 protrudes above the low step portion 186a, but does not protrude upward from the upper surface (outer surface portion 182) of the insulating cover 163. In this case, the length of the fastening pin 191 is greater than the height dimension in the axial direction of the overlapping portion between the insulating cover 161 and the protrusion 186 (low step portion 186a) of the insulating cover 163 and has a margin protruding upward. Thus, conceivably, when the fastening pin 191 is inserted into the recesses 105 and 177 and the through-hole 187 (that is, when the fastening pin 191 is fixed), such an insertion (fixing) work can be easily performed. In addition, the upper end of the fastening pin 191 does not protrude upward from the upper surface (outer surface portion 182) of the insulating cover 163. This configuration can eliminate an inconvenience that the axial length of the stator 60 becomes large due to the protrusion of the fastening pin 191.

After fixing the insulating covers 161 and 163 by the fastening pin 191, the adhesive is filled through the through-hole 188 provided in the insulating cover 163. In this way, the insulating covers 161 and 163 overlapping in the axial direction are securely joined to each other. In (a) and (b) of FIG. 28, for convenience, the through-hole 188 is illustrated in a range from the upper surface to the lower surface of the insulating cover 163. In practice, however, the through-hole 188 is provided in a thin plate portion formed by lightening or the like.

As illustrated in (b) of FIG. 28, the position of each of the insulating covers 161 and 163 fixed with the fastening pin 191 is the end surface of the stator holder 70 in the axial direction further on the inner side than the stator core 62 in the radial direction (on the left side in the drawing), and the fastening pin 191 is fixed to the stator holder 70. That is, the first link portion 153A is fixed to the end surface of the stator holder 70 in the axial direction. In this case, since the stator holder 70 includes the coolant path 85, the heat generated at the first winding segment 151A is directly transferred from the first link portion 153A to the portion at or near the coolant path 85 of the stator holder 70. The fastening pin 191 is inserted into the recess 105 of the stator holder 70, and heat transfer to the stator holder 70 side is promoted through the fastening pin 191. With this configuration, improvement of cooling performance of the stator winding 61 is achieved.

In the present embodiment, 18 of the insulating covers 161 and 18 of the insulating covers 163 are disposed to overlap each other on the inner side and the outer side in the axial direction at the coil end CE. Recesses 105 are provided at 18 locations that is the same as the number of the insulating covers 161 and the number of the insulating covers 163 on the end surface of the stator holder 70 in the axial direction. The recesses 105 at the 18 locations are fixed with the fastening pins 191.

Although not illustrated, the same applies to the insulating covers 162 and 164 on the opposite side in the axial direction. In other words, first, when the side surface portions 171 of the insulating covers 162 adjacent to each other in the circumferential direction are brought into contact with or close to each other upon assembly of the first coil module 150A, a through-hole portion extending in the axial direction is formed by each of the recesses 177 of the insulating covers 162. The positions of the through-hole portion and the recess 106 at the end surface of the outer cylinder member 71 in the axial direction then match each other. Thereafter, due to the assembly of the second coil module 150B, the position of the through-hole 187 on the insulating cover 164 side matches the positions of the through-hole portion on the insulating cover 163 side and the recess 106 of the outer cylinder member 71. Subsequently, the fastening pin 191 is inserted into the recesses 106 and 177 and the through-hole 187, whereby the insulating covers 162 and 164 is integrally fixed to the outer cylinder member 71.

When the coil modules 150A and 150B are assembled to the core assembly CA, all the first coil modules 150A are assembled first to the outer peripheral side of the core assembly CA, and then all the second coil modules 150B are assembled and fixed with the fastening pins 191. Alternatively, the two first coil modules 150A and the one second coil module 150B may be first fixed to the core assembly CA with one fastening pin 191, and thereafter, the assembly of the first coil module 150A, the assembly of the second coil module 150B, and fixing with the fastening pin 191 may be repeatedly performed in this order.

Next, the bus bar module 200 will be described.

Figure 29:
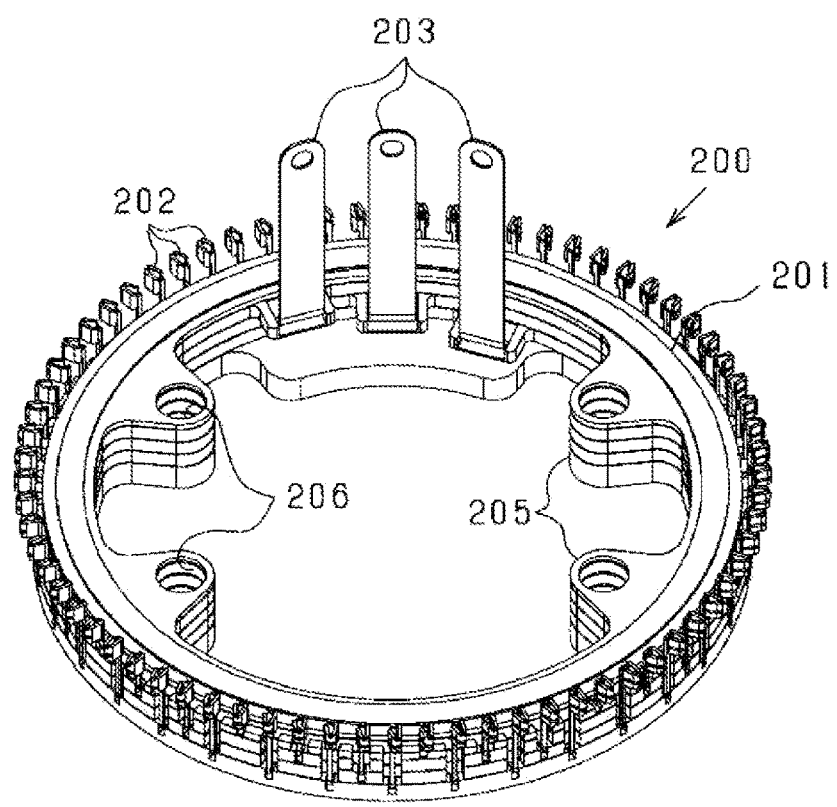
FIG. 29 is a perspective view of a bus bar module.
Figure 30:
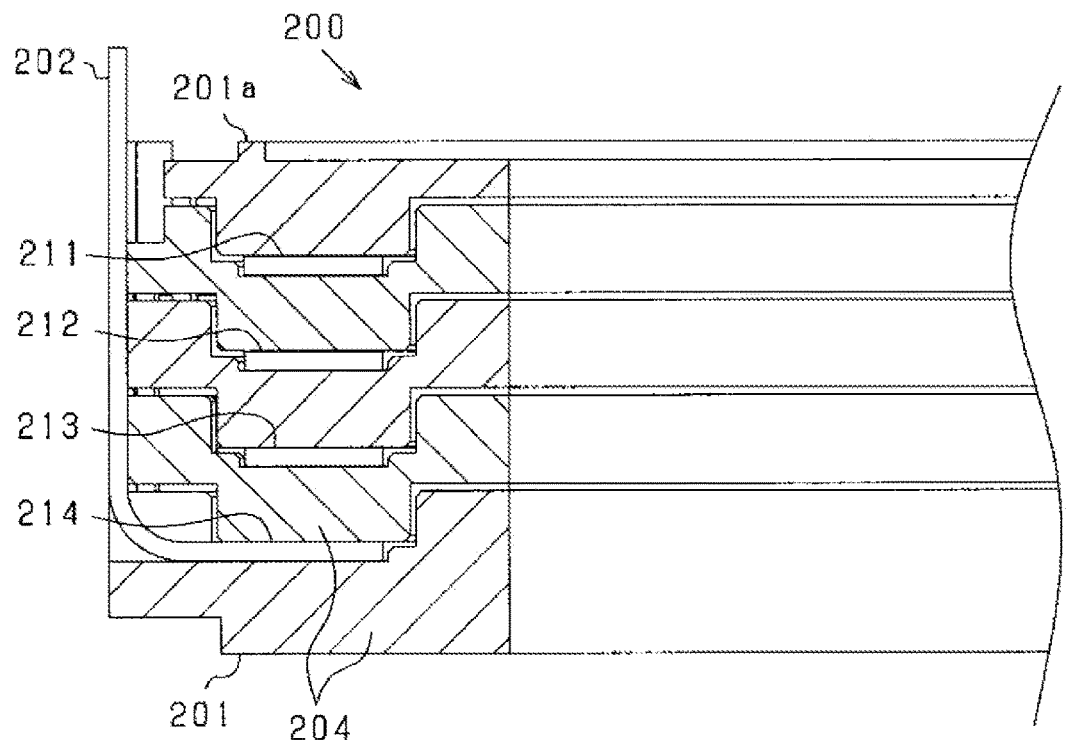
FIG. 30 is a sectional view illustrating part of a longitudinal section of the bus bar module.

The bus bar module 200 is a winding connection member that is electrically connected to the winding segment 151 of each coil module 150 in the stator winding 61, connects one end of the winding segment 151 of each phase in parallel for each phase, and connects the other ends of the winding segments 151 at a neutral point. FIG. 29 is a perspective view of the bus bar module 200. FIG. 30 is a sectional view illustrating part of a longitudinal section of the bus bar module 200.

The bus bar module 200 includes an annular ring 201 having an annular shape, a plurality of connection terminals 202 extending from the annular ring 201, and three I/O terminals 203 provided for each phase winding. The annular ring 201 is formed in an annular shape by using, for example, an insulating member such as resin.

As illustrated in FIG. 30, the annular ring 201 has a substantially annular plate shape and includes stacked plates 204 stacked in multiple layers (five layers in the present embodiment) in the axial direction. Four bus bars 211 to 214 are provided while being sandwiched between each adjacent two of the stacked plates 204. Each of the bus bars 211 to 214 has an annular shape, and includes a U-phase bus bar 211, a V-phase bus bar 212, a W-phase bus bar 213, and a neutral-point bus bar 214. These bus bars 211 to 214 are disposed side by side in the axial direction with plate surfaces facing each other in the annular ring 201. Each stacked plate 204 and each of the bus bars 211 to 214 are joined to each other by using an adhesive. An adhesive sheet is desirably used as the adhesive. However, a liquid or semi-liquid adhesive may be applied. The connection terminal 202 is connected to each of the bus bars 211 to 214 so as to protrude outward in the radial direction from the annular ring 201.

A protrusion 201a annularly extending in an annular shape is provided on the upper surface of the annular ring 201, that is, the upper surface of the stacked plate 204 on the outermost layer side of the stacked plates 204 provided in the form of five layers.

The bus bar module 200 only needs to be provided in a state where the bus bars 211 to 214 are embedded in the annular ring 201. The bus bars 211 to 214 disposed at predetermined intervals may be integrally insert-molded. The arrangement of the bus bars 211 to 214 is not limited to the configuration in which all the bus bars are arranged in the axial direction and all the plate surfaces face the same direction. For example, the bus bars 211 to 214 may be arranged in the radial direction, may be arranged in two rows in the axial direction and in two rows in the radial direction, and may include different extending directions.

In FIG. 29, the connection terminals 202 are arranged in the circumferential direction of the annular ring 201 and extend in the axial direction on the outer side in the radial direction. The connection terminals 202 include a connection terminal connected to the U-phase bus bar 211, a connection terminal connected to the V-phase bus bar 212, a connection terminal connected to the W-phase bus bar 213, and a connection terminal connected to the neutral-point bus bar 214. The connection terminals 202 are provided as many as the winding ends 154 and 155 of the respective winding segments 151 in the coil module 150. One winding end 154 or one winding end 155 of each winding segment 151 is connected to the corresponding connection terminal 202. With this configuration, the bus bar module 200 is connected to each of the U-phase winding segment 151, the V-phase winding segment 151, and the W-phase winding segment 151.

The I/O terminal 203 is made of, for example, a bus bar member, and is provided in a direction extending in the axial direction. The I/O terminal 203 includes a U-phase I/O terminal 203U, a V-phase I/O terminal 203V, and a W-phase I/O terminal 203W. These I/O terminals 203 are connected to the respective bus bars 211 to 213 for each phase in the annular ring 201. Through the I/O terminals 203, power is input from an inverter (not illustrated) and output to the phase winding of each phase of the stator winding 61.

A current sensor that detects the phase current of each phase may be integrally provided in the bus bar module 200. In this case, preferably, a current detection terminal is provided in the bus bar module 200 and a detection result of the current sensor is output to a controller (not illustrated) through the current detection terminal.

The annular ring 201 has a plurality of protrusions 205 protruding toward the inner peripheral side as fixed portions with respect to the stator holder 70. A through-hole 206 extending in the axial direction is formed in the protrusion 205.

Figure 31:
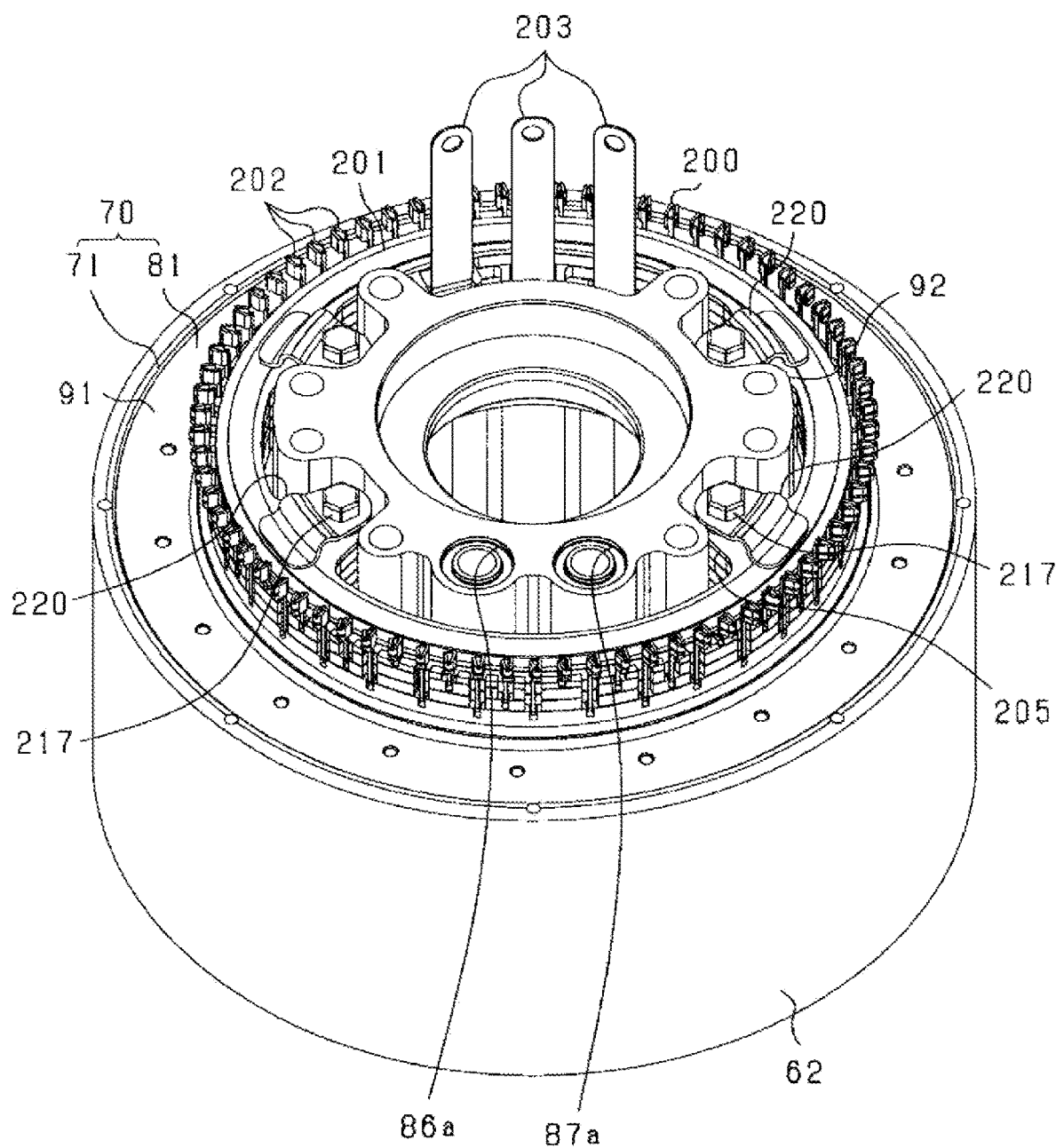
FIG. 31 is a perspective view illustrating a state where the bus bar module is assembled to a stator holder.
Figure 32:
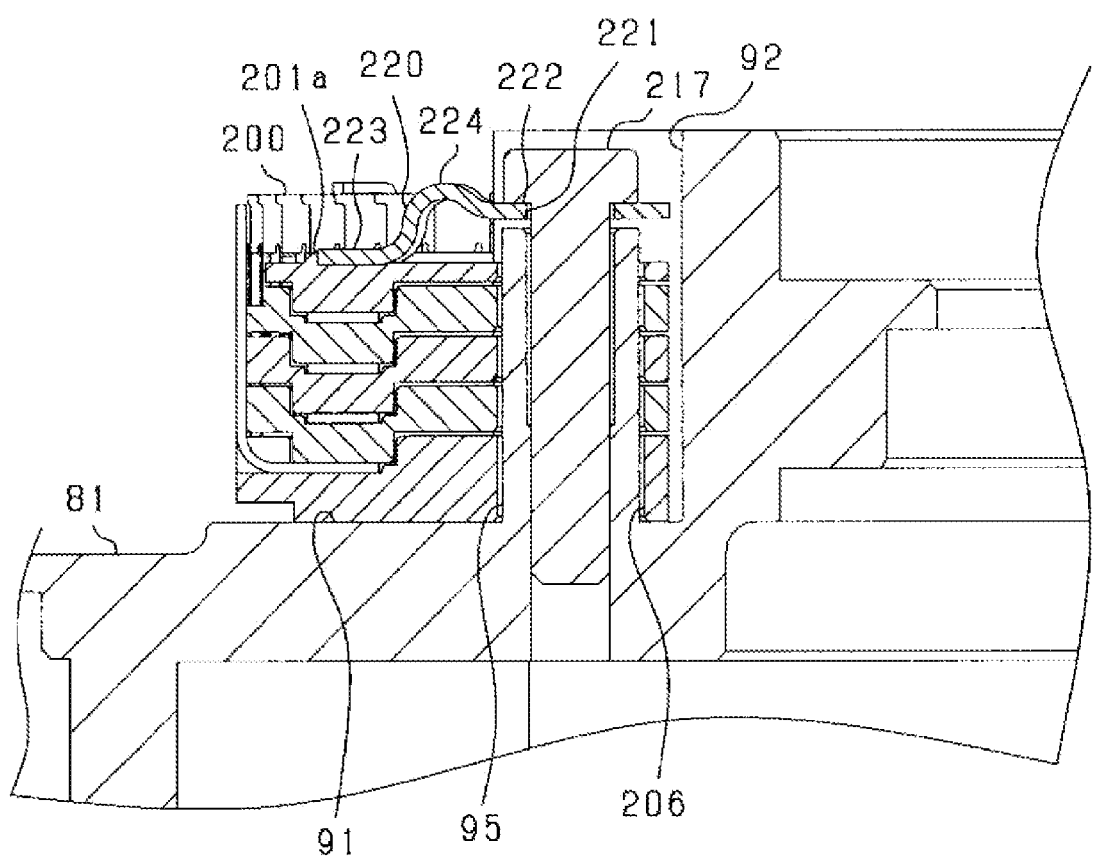
FIG. 32 is a longitudinal sectional view of a stationary portion in which the bus bar module is fixed.

FIG. 31 is a perspective view illustrating a state where the bus bar module 200 is assembled to the stator holder 70, and FIG. 32 is a longitudinal sectional view of the stationary portion in which the bus bar module 200 is fixed. For information about the configuration of the stator holder 70 before the bus bar module 200 is assembled thereto, please refer to FIG. 12.

In FIG. 31, the bus bar module 200 is provided on the end plate portion 91 so as to surround the boss 92 of the inner cylinder member 81. The bus bar module 200 is fixed to the stator holder 70 (inner cylinder member 81) by using a fastener 217 such as a bolt while the bus bar module 200 is positioned through assembling the inner cylinder member 81 to the rod 95 (see FIG. 12).

More specifically, as illustrated in FIG. 32, the end plate portion 91 of the inner cylinder member 81 includes the rod 95 extending in the axial direction. The bus bar module 200 is fixed to the rod 95 by using the fasteners 217 while the rods 95 are inserted through the through-holes 206 respectively provided in the plurality of protrusions 205. In the present embodiment, the bus bar module 200 is fixed using the retainer plate 220 made of a metal material such as iron. The retainer plate 220 includes a mating fastener portion 222, a press portion 223, and a bent portion 224. The mating fastener portion 222 has an insertion hole 221 through which the fastener 217 is inserted. The press portion 223 presses the upper surface of the annular ring 201 of the bus bar module 200. The bent portion 224 is provided between the mating fastener portion 222 and the press portion 223.

When the retainer plate 220 is mounted, the fastener 217 is screwed to the rod 95 of the inner cylinder member 81 while the fastener 217 is inserted through the insertion hole 221 of the retainer plate 220. The press portion 223 of the retainer plate 220 is in contact with the upper surface of the annular ring 201 of the bus bar module 200. In this case, as the fastener 217 is screwed into the rod 95, the retainer plate 220 is pushed downward as viewed in the drawing, and accordingly, the annular ring 201 is pressed downward by the press portion 223. The downward pressure as viewed in the drawing, generated by the screwing of the fastener 217, is transmitted to the press portion 223 through the bent portion 224. Thus, pressing by the press portion 223 is performed while accompanying the elastic pressure at the bent portion 224.

As described above, the annular protrusion 201a is provided on the upper surface of the annular ring 201, and the extending end of the retainer plate 220 on the press portion 223 side can be brought into contact with the protrusion 201a. This configuration can prevent the downward pressure of the retainer plate 220 as viewed in the drawing from being released outward in the radial direction. That is, the pressure generated by the screwing of the fastener 217 is appropriately transmitted to the press portion 223 side.

As illustrated in FIG. 31, when the bus bar module 200 is assembled with respect to the stator holder 70, the I/O terminal 203 is provided at a position 180° opposite to the inlet opening 86a and the outlet opening 87a communicating with the coolant path 85 in the circumferential direction. However, the I/O terminal 203 and the openings 86a and 87a may be collectively provided at the same position (that is, positions close to each other).

Next, a lead member 230 that electrically connects the I/O terminal 203 of the bus bar module 200 to an external device outside the rotary electric machine 10 will be described.

As illustrated in FIG. 1, in the rotary electric machine 10, the I/O terminal 203 of the bus bar module 200 is provided so as to protrude outward from the housing cover 242, and is connected to the lead member 230 on the outer side of the housing cover 242. The lead member 230 relays connection between the I/O terminal 203 for each phase extending from the bus bar module 200 and a power line for each phase extending from an external device such as an inverter.

Figure 33:
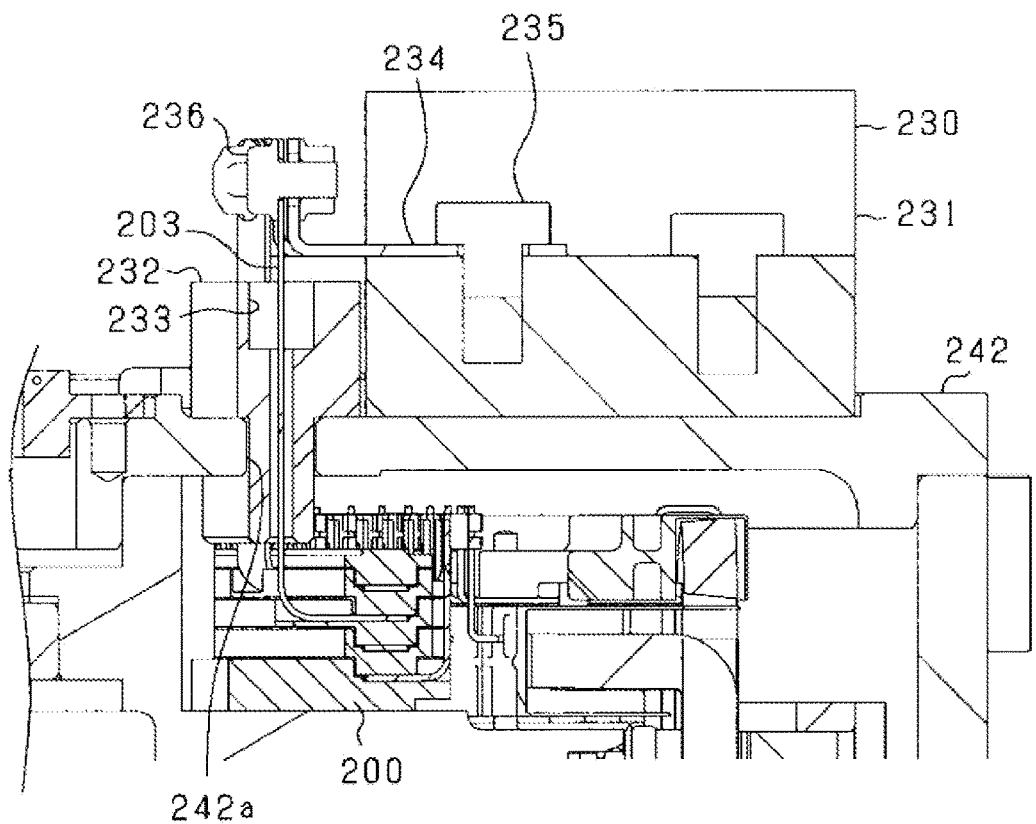
FIG. 33 is a longitudinal sectional view illustrating a state where a lead member is attached to the housing cover.
Figure 34:
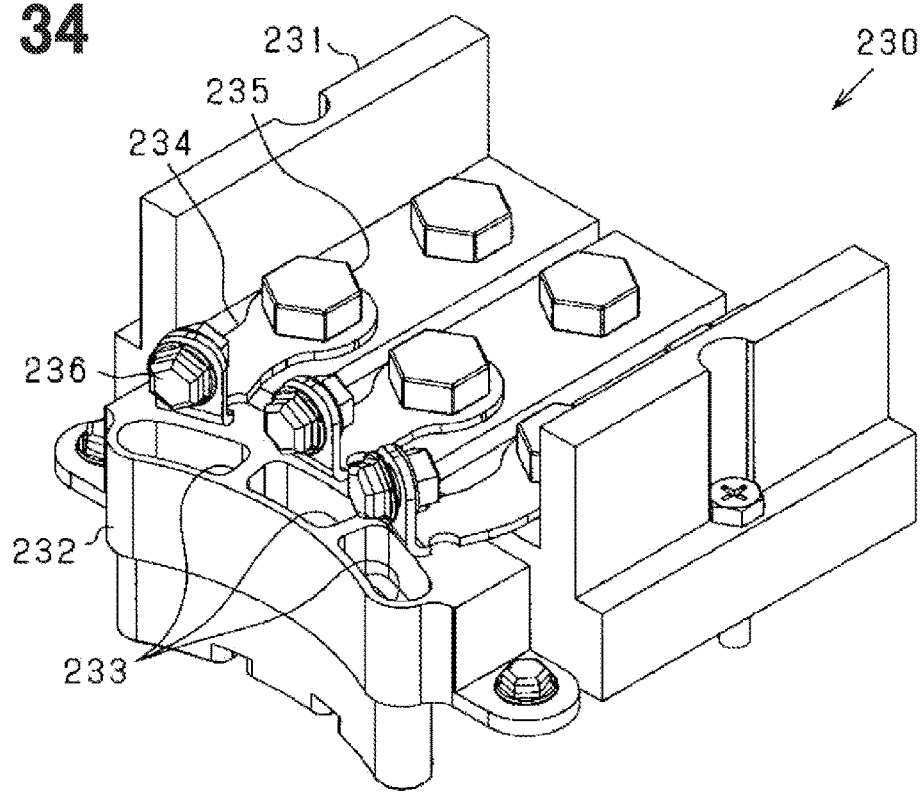
FIG. 34 is a perspective view of the lead member.

FIG. 33 is a longitudinal sectional view illustrating a state where the lead member 230 is attached to the housing cover 242. FIG. 34 is a perspective view of the lead member 230. As illustrated in FIG. 33, a through-hole 242a is formed at the housing cover 242, and the I/O terminal 203 can be drawn out through the through-hole 242a.

The lead member 230 includes a base 231 fixed to the housing cover 242 and a terminal plug 232 inserted into the through-hole 242a of the housing cover 242. The terminal plug 232 has three insertion holes 233. The I/O terminals 203 of the respective phases are inserted through the respective insertion hole 233 on a one-to-one basis. In each of the three insertion holes 233, the section of the opening has an elongated shape. The three insertion holes 233 are formed such that their longitudinal directions are substantially aligned with each other.

The base 231 is attached with three lead bus bars 234 provided for each phase. The lead bus bar 234 is bent and formed in a substantially L shape and is fixed to the base 231 by a fastener 235 such as a bolt. The lead bus bar 234 is further fixed to an extending end of the I/O terminal 203 inserted through the insertion hole 233 of the terminal plug 232 by using a fastener 236 such as a bolt and a nut.

Although not illustrated, a power line for each phase extending from an external device can be connected to the lead member 230. Thus, power can be input to and output from the I/O terminal 203 for each phase.

Figure 35:
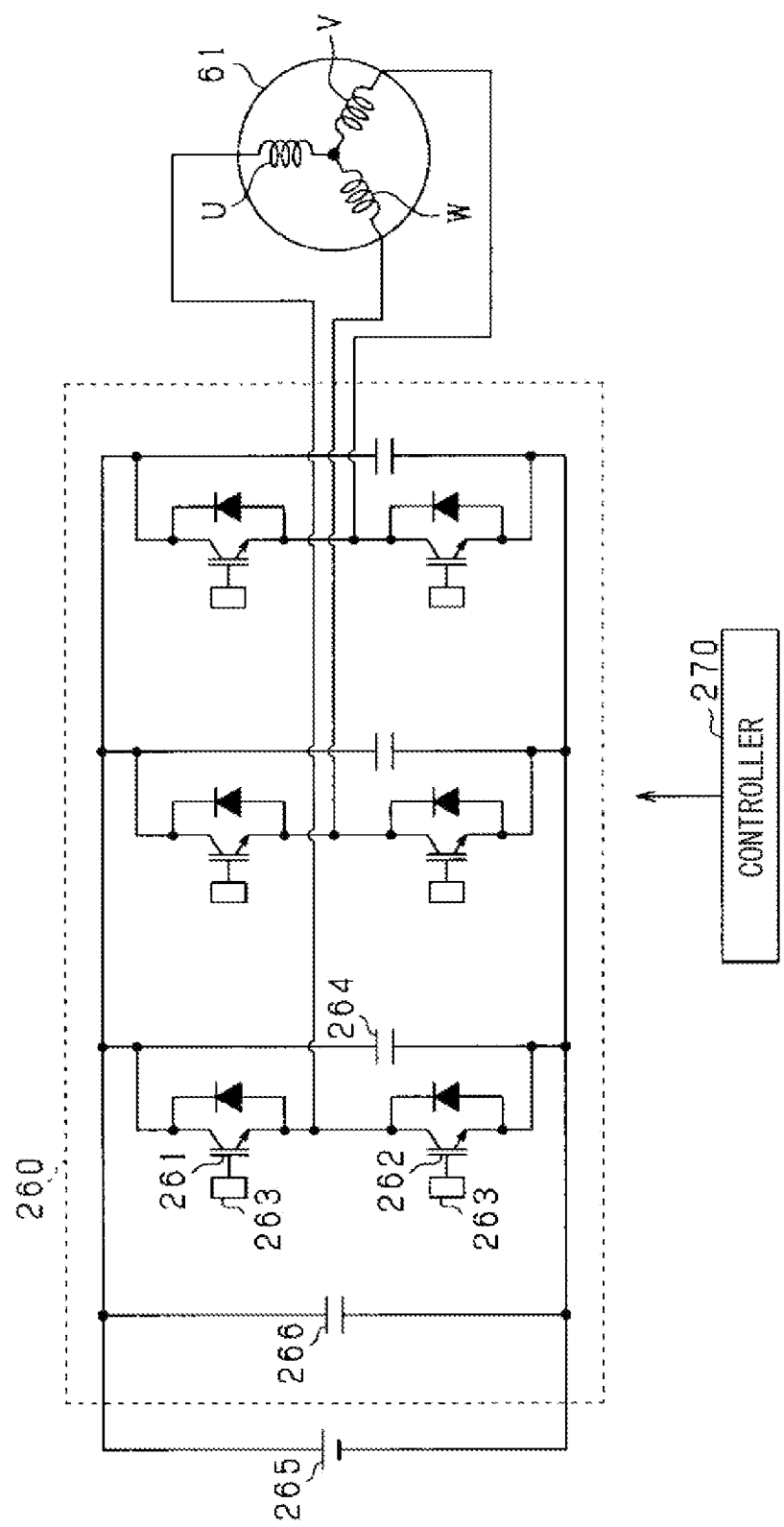
FIG. 35 is an electrical circuit diagram illustrating a control system of the rotary electric machine.
Figure 36:
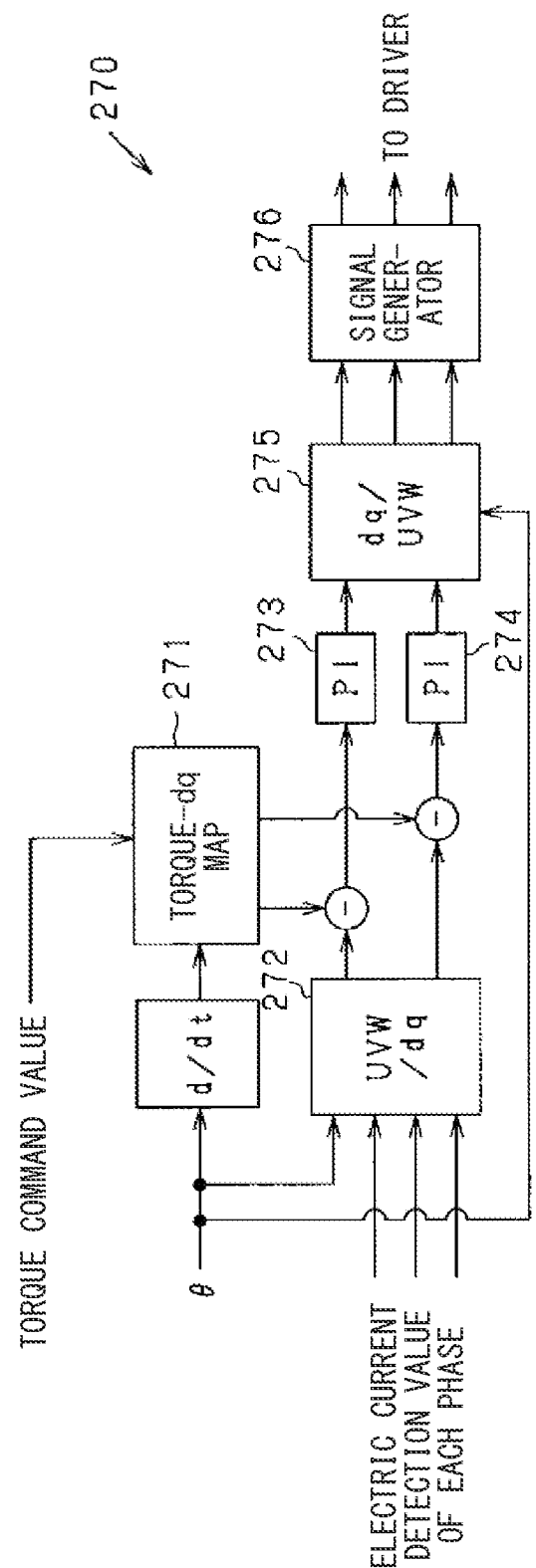
FIG. 36 is a functional block diagram illustrating a current feedback control operation by a controller.

Next, a configuration of a control system that controls the rotary electric machine 10 will be described. FIG. 35 is an electrical circuit diagram of a control system of the rotary electric machine 10, and FIG. 36 is a functional block diagram illustrating control operation by a controller 270.

As illustrated in FIG. 35, the stator winding 61 includes a U-phase winding, a V-phase winding, and a W-phase winding, and an inverter 260 corresponding to a power converter is connected to the stator winding 61. The inverter 260 is configured by a bridge circuit having upper and lower arms whose numbers are respectively identical to the number of phases. The inverter 260 includes a series-connected part including an upper arm switch 261 and a lower arm switch 262 for each phase. Each of these switches 261 and 262 is turned on and off by a driver circuit 263 to control energization of the phase windings of each phase. Each of the switches 261 and 262 includes a semiconductor switch such as a metal-oxide-semiconductor field-effect transistor (MOSFET) or an insulated-gate bipolar transistor (IGBT). A capacitor 264 for charge supply that supplies charges required at the time of switching to the switches 261 and 262 is connected to the upper and lower arms of each phase in parallel to the series-connected part of the switches 261 and 262.

One ends of the U-phase winding, the V-phase winding, and the W-phase winding are respectively connected to intermediate connection points between the switches 261 and 262 of the upper and lower arms. The phase windings are connected in a form of the star connection (Y-connection), and the other ends of the phase windings are connected to one another at the neutral point.

The controller 270 includes a microcomputer including a central processing unit (CPU) and various memories. The controller 270 performs energization control by turning on and off each of the switches 261 and 262 on the basis of various detection information and a request for a motor mode or a generator mode of the rotary electric machine 10. The detection information of the rotary electric machine 10 includes, for example, an angular position (electrical angle) of the rotor 20 detected by an angle detector such as a resolver, a power supply voltage (voltage inputted to the inverter) detected by a voltage sensor, and an exciting current for each phase winding detected by a current sensor. The controller 270 performs on/off control of each of the switches 261 and 262 by, for example, pulse width modulation (PWM) control at a predetermined switching frequency (carrier frequency) or rectangular wave control. The controller 270 may be a built-in controller incorporated into the rotary electric machine 10 or may be an external controller provided outside the rotary electric machine 10.

Since the rotary electric machine 10 according to the present embodiment has a slot-less structure (tooth-less structure), the inductance of the stator 60 is reduced and the electrical time constant is small. Under a condition where the electrical time constant is small, the switching frequency (carrier frequency) is desirably increased to increase the switching speed. In this respect, the capacitor 264 for charge supply is connected in parallel to the series-connected part of the switches 261 and 262 of each phase, thereby reducing the wiring inductance. Therefore, an appropriate countermeasure against surge can be taken even in a configuration in which the switching speed is increased.

The high-potential side terminal of the inverter 260 is connected to the positive electrode terminal of a direct current (DC) power supply 265, and the low-potential side terminal is connected to the negative electrode terminal (ground) of the DC power supply 265. The DC power supply 265 includes, for example, an assembled battery in which a plurality of unit cells are connected in series. In addition, a smoothing capacitor 266 is connected in parallel to the DC power supply 265 to the high-potential side terminal and the low-potential side terminal of the inverter 260.

FIG. 36 is a block diagram illustrating a current feedback control operation for controlling the phase currents of U-, V-, and W-phases.

In FIG. 36, a current command determiner 271 uses a torque-dq map to determine a current command value for the d-axis and a current command value for the q-axis. This command determination is based on: a motor-mode torque command value or a generator-mode torque command value for the rotary electric machine 10; and an electrical angular velocity ω obtained by differentiating an electrical angle θ with respect to time. When the rotary electric machine 10 is used as, for example, a power source for an automotive application, the generator-mode torque command value is a regenerative torque command value.

A d-q converter 272 converts a current value (three phase currents) detected by a current sensor provided for each phase into a d-axis current and a q-axis current. The d-axis current and the q-axis current are components of a two-dimensional rotating Cartesian coordinate system having a direction of an axis of a magnetic field, or field direction, as a d-axis.

The d-axis current feedback control device 273 calculates a d-axis command voltage as a manipulated variable for bringing the d-axis current into agreement with the current command value for the d-axis in a feedback mode. The q-axis current feedback control device 274 calculates a q-axis command voltage as a manipulated variable for bringing the q-axis current into agreement with the current command value for the q-axis in a feedback mode. In each of the feedback control devices 273 and 274, the command voltage is calculated using proportional integral (PI) feedback techniques on the basis of the deviation of the d-axis current and the q-axis current with respect to the current command value.

The three-phase converter 275 converts the d-axis and q-axis command voltages into U-phase, V-phase, and W-phase command voltages. Each of the units 271 to 275 described above is a feedback control device that performs feedback control of the fundamental wave current according to the d-q transformation theory. The command voltages of the U-phase, the V-phase, and the W-phase are feedback control values.

An operation signal generator 276 generates an operation signal of the inverter 260 on the basis of a three-phase command voltage by using a well-known triangle wave carrier comparison. Specifically, the operation signal generator 276 generates switch operation signals (duty signals) for the upper and lower arms in each phase by PWM control. The PWM control is based on magnitude comparison between a signal obtained by normalizing command voltages of three phases with a power supply voltage and a carrier signal such as a triangle wave signal. The switch operation signal generated by the operation signal generator 276 is output to the driver circuit 263 of the inverter 260. The driver circuit 263 turns on and off the switches 261 and 262 of the respective phases.

Next, torque feedback control operation will be described. This operation is mainly used for the purpose of increasing the output power and reducing the loss of the rotary electric machine 10 under an operating condition where the output voltage of the inverter 260 increases. Examples of a situation under such an operating condition include a high rotation operation region and a high output operation region. The controller 270 selects and executes either the torque feedback control operation or the current feedback control operation based on the operating condition of the rotary electric machine 10.

Figure 37:
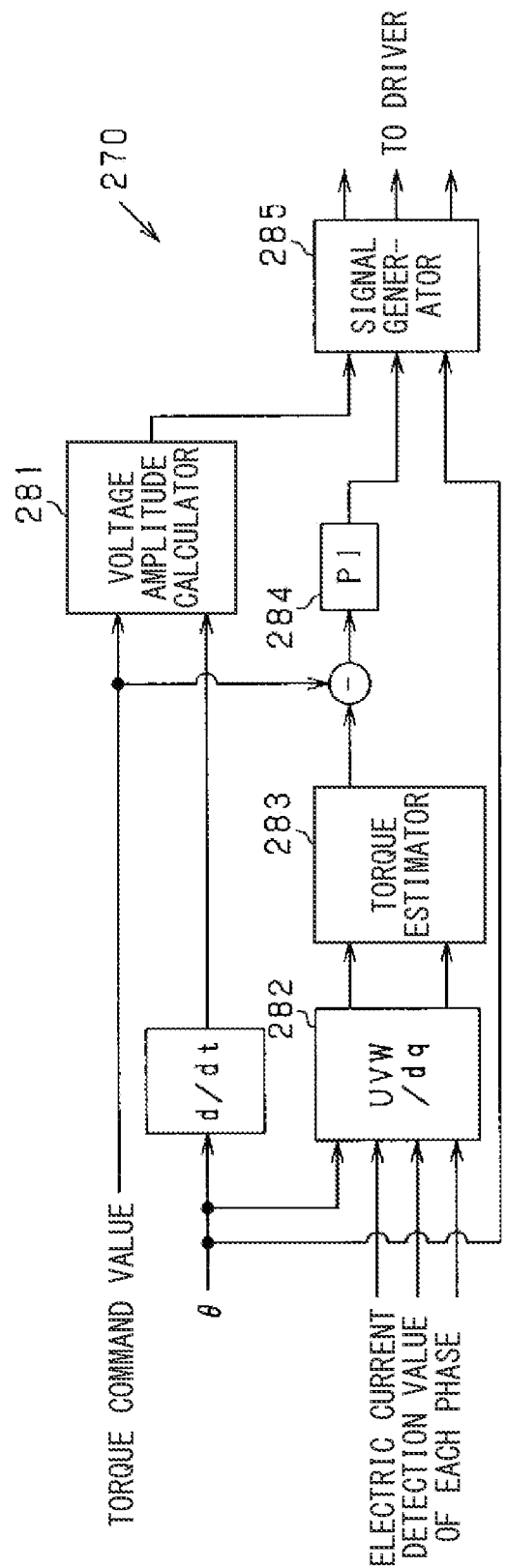
FIG. 37 is a functional block diagram illustrating a torque feedback control operation by the controller.

FIG. 37 is a block diagram illustrating a torque feedback control operation corresponding to the U-, V-, and W-phases.

A voltage amplitude calculator 281 calculates a voltage amplitude command that is a command value of the magnitude of the voltage vector. The calculation is based on the motor-mode torque command value or the generator-mode torque command value for the rotary electric machine 10 and the electrical angular velocity ω obtained by differentiating the electrical angle θ with respect to time.

Similarly to the d-q converter 272, a d-q converter 282 converts a current value detected by a current sensor provided for each phase into a d-axis current and a q-axis current. A torque estimator 283 calculates estimated torque values corresponding to the U-, V-, and W-phases based on the d-axis current and the q-axis current. The torque estimator 283 is only required to calculate the voltage amplitude command on the basis of map information in which the d-axis current, the q-axis current, and the voltage amplitude command are associated with each other.

A torque feedback control device 284 calculates a voltage phase command as a manipulated variable for bringing the estimated torque value into agreement with the motor-mode torque command value or the generator-mode torque command value in a feedback mode. The voltage phase command is a command value of a phase of a voltage vector. The torque feedback control device 284 calculates the voltage phase command using the PI feedback techniques on the basis of the deviation of the estimated torque value with respect to the motor-mode torque command value or the generator-mode torque command value.

An operation signal generator 285 generates an operation signal of the inverter 260 based on the voltage amplitude command, the voltage phase command, and the electrical angle θ. Specifically, the operation signal generator 285 calculates a three-phase command voltages on the basis of the voltage amplitude command, the voltage phase command, and the electrical angle θ. The operation signal generator 285 then generates switch operation signals for the upper and lower arms in each phase by PWM control. The PWM control is based on magnitude comparison between a signal obtained by normalizing three-phase command voltages thus calculated with a power supply voltage, and a carrier signal such as a triangle wave signal. The switch operation signal generated by the operation signal generator 285 is output to the driver circuit 263 of the inverter 260. The driver circuit 263 turns on and off the switches 261 and 262 of the respective phases.

The operation signal generator 285 may alternatively generate the switch operation signal on the basis of: the pulse pattern information that is map information associating the voltage amplitude command, the voltage phase command, the electrical angle θ, and the switch operation signal with one another; the voltage amplitude command; the voltage phase command; and the electrical angle θ.

Modification

Hereinafter, modifications of the above-described first embodiment will be described.

Figure 38:
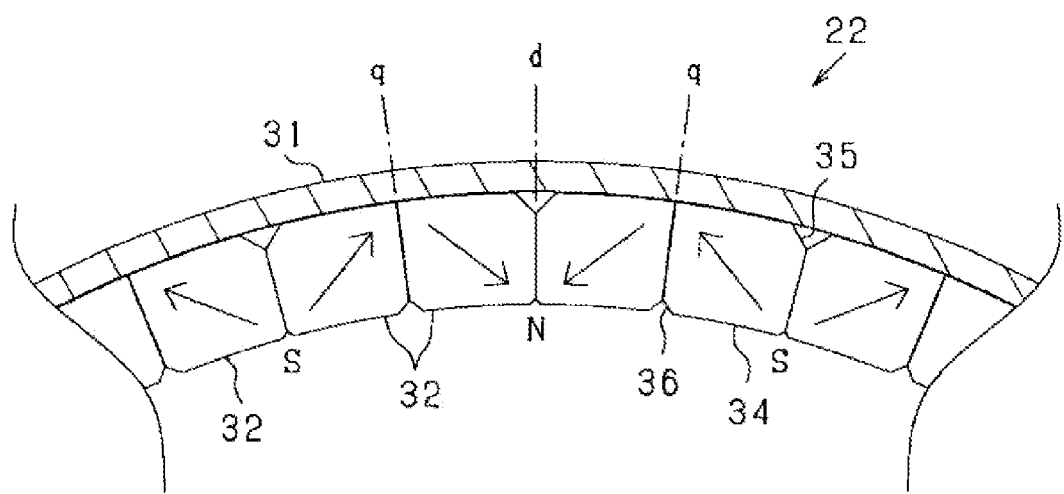
FIG. 38 is a partial transverse sectional view illustrating a sectional structure of the magnet unit in a modification.

The configuration of the magnet 32 in the magnet unit 22 may be changed as follows. In the magnet unit 22 illustrated in FIG. 38, the direction of the easy axis of magnetization is oblique to the radial direction in the magnet 32, and a linear magnetic path is formed along the direction of the easy axis of magnetization. That is, the magnet 32 is linearly oriented as follows. Between a magnetic flux acting surface 34a on the stator 60 side (inner side in the radial direction) and a magnetic flux acting surface 34b on the opposite side to the stator (outer side in the radial direction), the direction of the easy axis of magnetization is oblique to the d-axis. At the same time, the easy axis of magnetization approaches the d-axis on the stator 60 side and separates from the d-axis on the opposite side to the stator in the circumferential direction. Also in this configuration, the length of the magnetic path of the magnet 32 can be made greater than the thickness dimension in the radial direction, and thus the permeance can be improved.

A Halbach array magnet can be used in the magnet unit 22.

In each winding segment 151, the direction of bending of the link portion 153 may be either inward or outward in the radial direction. A relationship between the direction of bending and the core assembly CA may be such that the first link portion 153A is bent toward the core assembly CA, or the first link portion 153A is bent toward the opposite side of the core assembly CA. In addition, the second link portion 153B may be bent either inward or outward in the radial direction as long as the second link portion 153B crosses over part of the first link portion 153A in the circumferential direction, on the outer side of the first link portion 153A in the axial direction.

The winding segments 151 may not include the two types of winding segments 151 (the first winding segment 151A and the second winding segment 151B), but may include one type of winding segment 151. Specifically, the winding segment 151 is preferably formed to have a substantially L shape or a substantially Z shape in a side view. When the winding segment 151 is formed in a substantially L shape in a side view, the link portion 153 is bent either inward or outward in the radial direction on one end side in the axial direction, and the link portion 153 is provided without being bent in the radial direction on the other end side in the axial direction. When the winding segment 151 is formed in a substantially Z shape in a side view, the link portion 153 is bent in directions opposite to each other in the radial direction on one end side in the axial direction and the other end side in the axial direction. In any case, the coil module 150 is preferably fixed to the core assembly CA by the insulating cover covering the link portion 153 as described above.

In the configuration described above, all the winding segments 151 are connected in parallel for each phase winding in the stator winding 61, but this may be changed. For example, all the winding segments 151 for each phase winding may be divided into a plurality of parallel connection groups, and the plurality of parallel connection groups may be connected in series. Specifically, all n winding segments 151 in each phase winding may be divided into two sets of parallel connection groups each including n/2 winding segments 151, three sets of parallel connection groups each including n/3 winding segments 151, or the like, and then those divided parallel connection groups may be connected in series. Alternatively, all of the plurality of winding segments 151 may be connected in series for each phase winding in the stator winding 61.

The stator winding 61 in the rotary electric machine 10 may include two-phase windings (U-phase winding and V-phase winding). In this case, with regard to the winding segment 151 for example, the pair of intermediate conductor portions 152 are separated at one coil pitch. One intermediate conductor portion 152 for the winding segment 151 of another phase is disposed between the pair of intermediate conductor portions 152.

The rotary electric machine 10 can be embodied as an inner rotor type surface permanent magnetic rotary electric machine instead of the outer rotor type surface permanent magnetic rotary electric machine. (a) and (b) of FIG. 39 is a view illustrating a configuration of a stator unit 300 when employing an inner rotor structure. Of FIG. 39, (a) of FIG. 39 is a perspective view illustrating a state where coil modules 310A and 310B are assembled to the core assembly CA, and (b) of FIG. 39 is a perspective view illustrating the winding segments 311A and 311B included in the coil modules 310A and 310B. In this example, the stator holder 70 is assembled to the outer side of the stator core 62 in the radial direction to form the core assembly CA. In addition, a plurality of the coil modules 310A and 310B are assembled to the inner side of the stator core 62 in the radial direction.

The winding segment 311A has a configuration substantially the same as or similar to that of the first winding segment 151A described above. The winding segment 311A includes a pair of intermediate conductor portions 312 and a link portion 313A formed to be bent to the core assembly CA side on both sides in the axial direction (outer side in the radial direction). The winding segment 311B has a configuration substantially the same as or similar to that of the second winding segment 151B described above. The winding segment 311B includes the pair of intermediate conductor portions 312 and a link portion 313B provided so as to cross over the link portion 313A in the circumferential direction on the outer side in the axial direction, on both sides in the axial direction. An insulating cover 315 is mounted to the link portion 313A of the winding segment 311A, and an insulating cover 316 is mounted to the link portion 313B of the winding segment 311B.

The insulating cover 315 includes semicircular recesses 317 extending in the axial direction at side surface portions on both sides in the circumferential direction. The insulating cover 316 includes a protrusion 318 protruding outward in the radial direction from the link portion 313B. A through-hole 319 extending in the axial direction is provided at an extending end of the protrusion 318.

Figure 40:
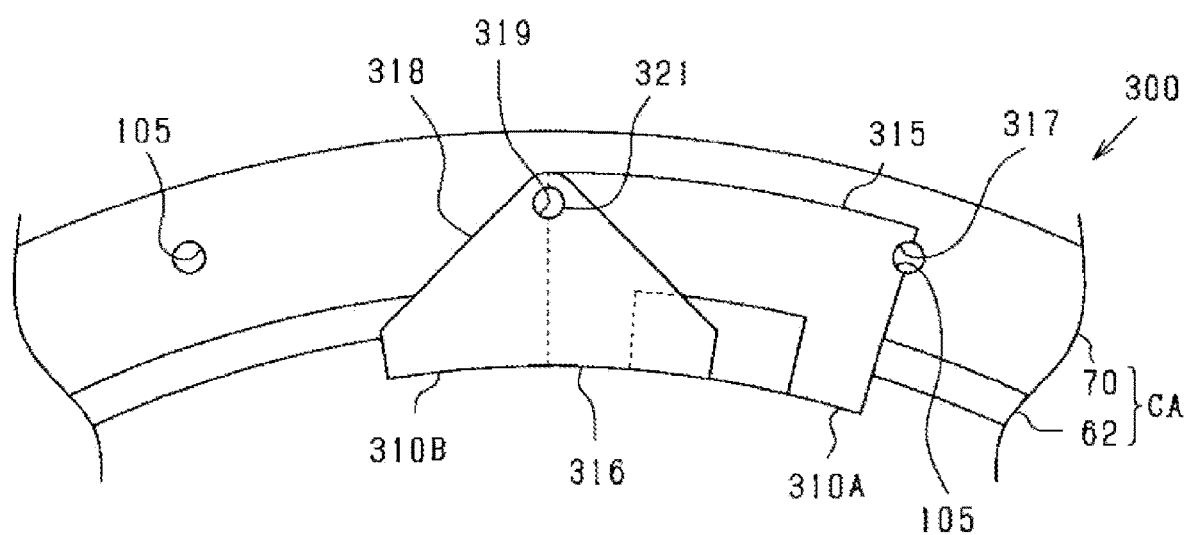
FIG. 40 is a plan view illustrating a state where the coil modules are assembled to the core assembly.

FIG. 40 is a plan view illustrating a state where the coil modules 310A and 310B are assembled to the core assembly CA. In FIG. 40, a plurality of recesses 105 are formed at equal intervals in the circumferential direction at the end surface of the stator holder 70 in the axial direction. The stator holder 70 has a cooling structure utilizing liquid coolant or air. As an air cooling structure, for example, a plurality of heat dissipation fins are preferably formed on the outer peripheral surface.

In FIG. 40, the insulating covers 315 and 316 are disposed to overlap each other in the axial direction. In addition, the recess 317 and the through-hole 319 are connected in the axial direction. The recess 317 is provided at the side surface portion of the insulating cover 315. The through-hole 319 is provided at the central position between one end and the other end in the circumferential direction of the insulating cover 316, in the protrusion 318 of the insulating cover 316. These parts are fixed with fastening pins 321.

In FIG. 40, the fixed position of each of the insulating covers 315 and 316 by the fastening pin 321 is the end surface of the stator holder 70 in the axial direction further on the outer side than the stator core 62 in the radial direction, and the stator holder 70 is fixed with the fastening pin 321. In this case, since the stator holder 70 includes the cooling structure, the heat generated in the winding segments 311A and 311B is easily transferred to the stator holder 70. With this configuration, the cooling performance of the stator winding 61 can be improved.

The stator 60 used in the rotary electric machine 10 may have a protrusion (e.g., tooth) extending from the back yoke. Also in this case, the coil module 150 and the like are only required to be assembled to the back yoke of the stator core.

The rotary electric machine is not limited to a star connection, and may be a Δ connection.

As the rotary electric machine 10, instead of a revolving-field type rotary electric machine in which a field element is a rotor and an armature is a stator, a revolving armature type rotary electric machine in which an armature is a rotor and a field element is a stator can also be adopted.

Second Embodiment

Figure 41:
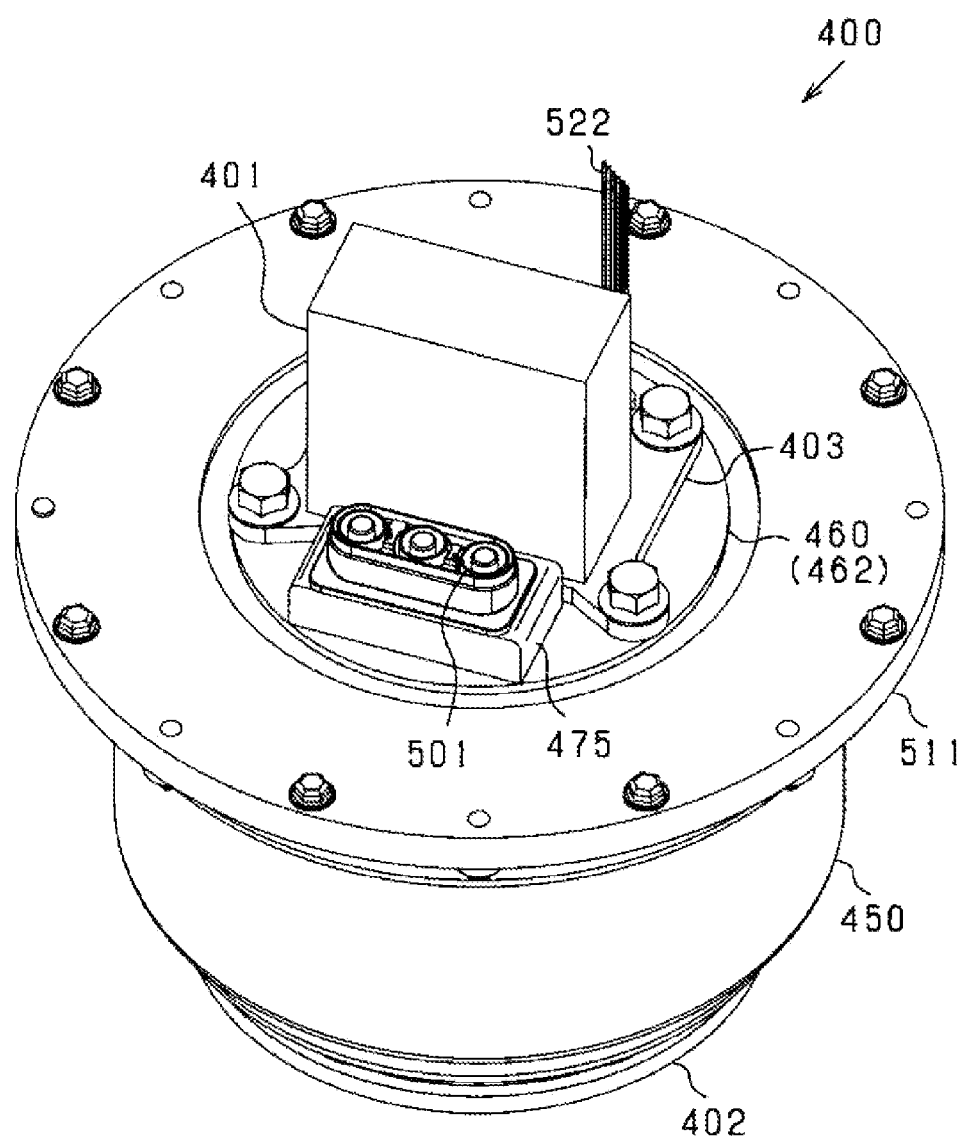
FIG. 41 is a perspective view illustrating an entire rotary electric machine according to a second embodiment.
Figure 42:
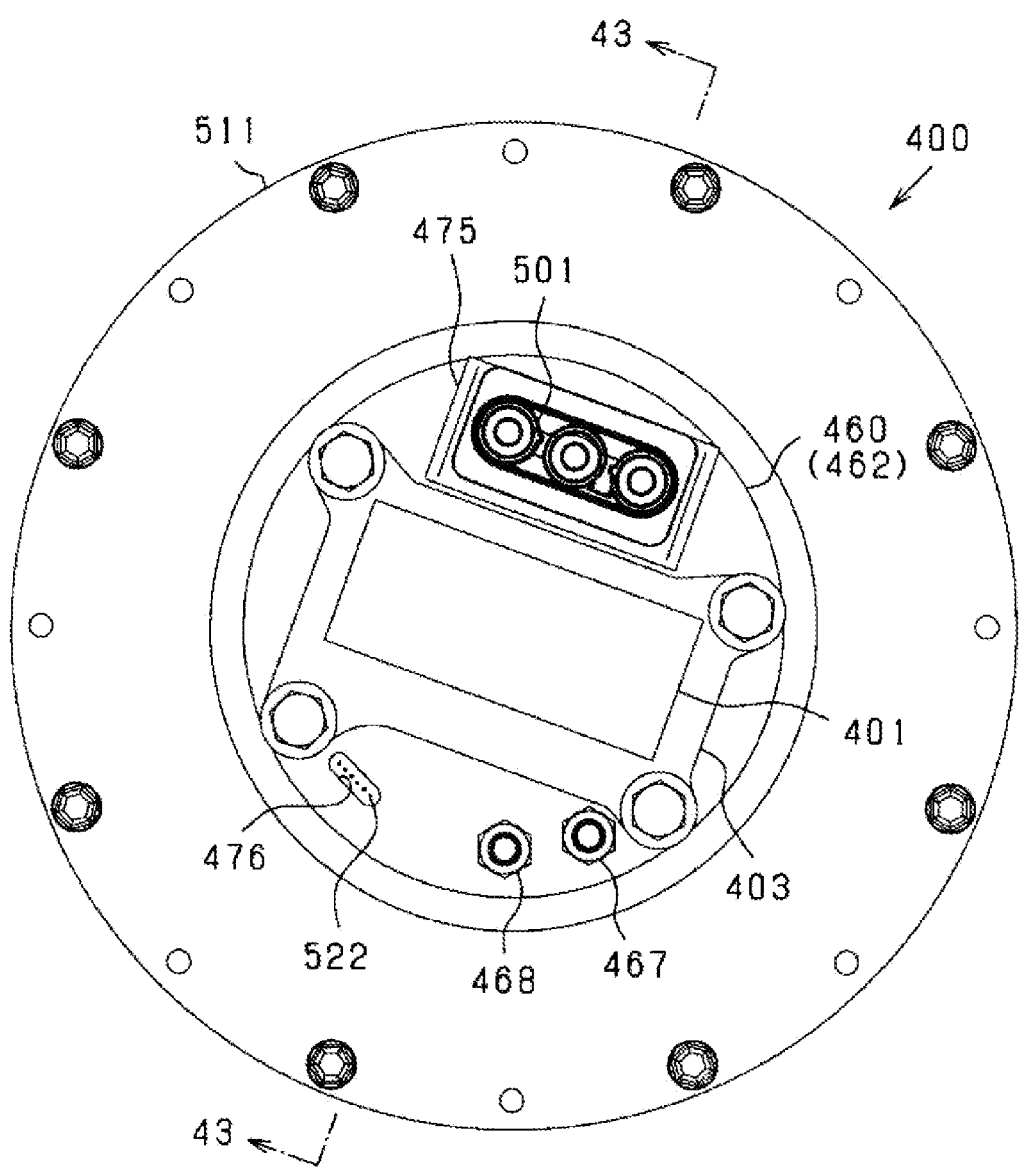
FIG. 42 is a plan view of the rotary electric machine.
Figure 43:
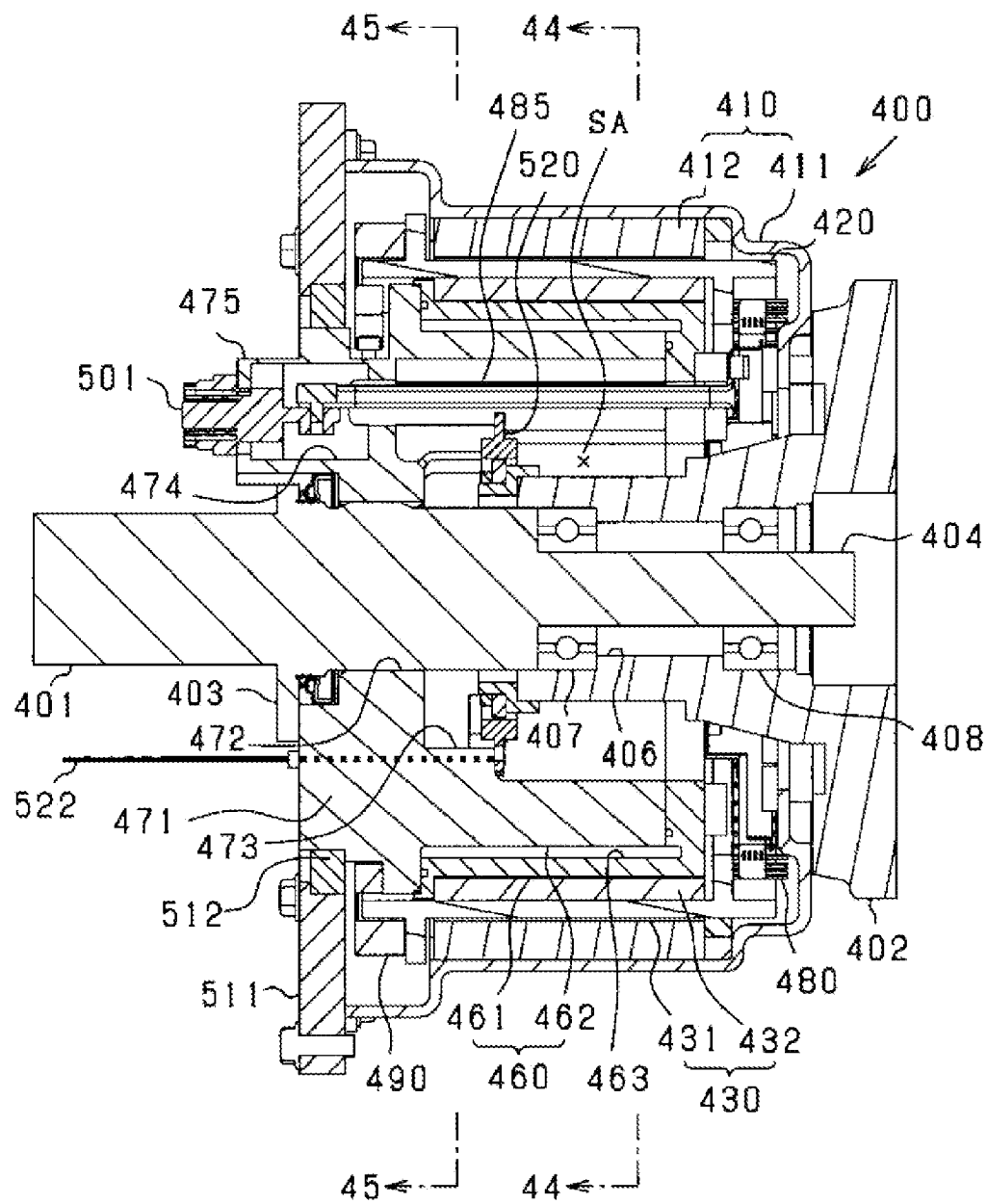
FIG. 43 is a longitudinal sectional view of the rotary electric machine.
Figure 44:
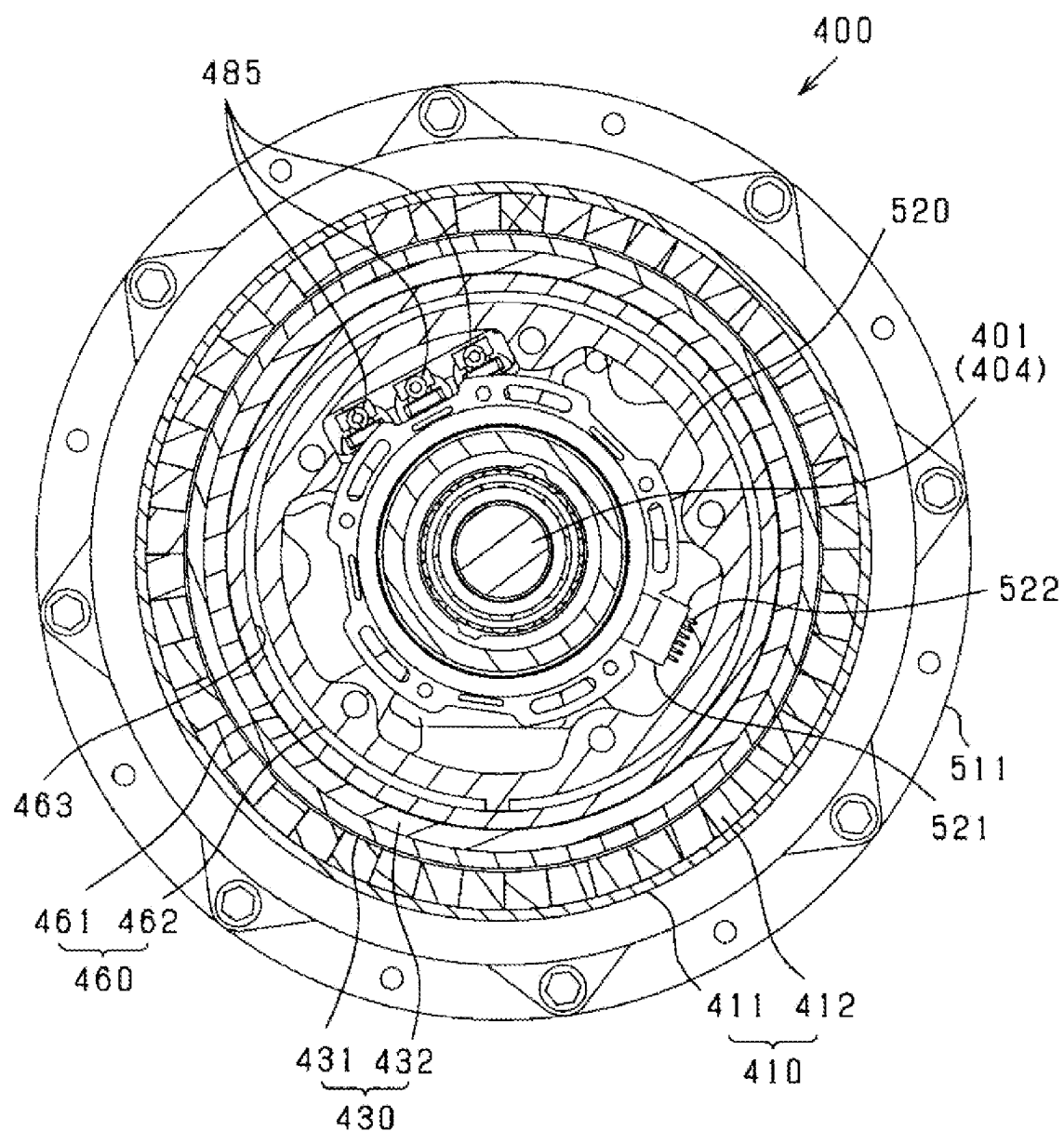
FIG. 44 is a transverse sectional view of the rotary electric machine.
Figure 45:
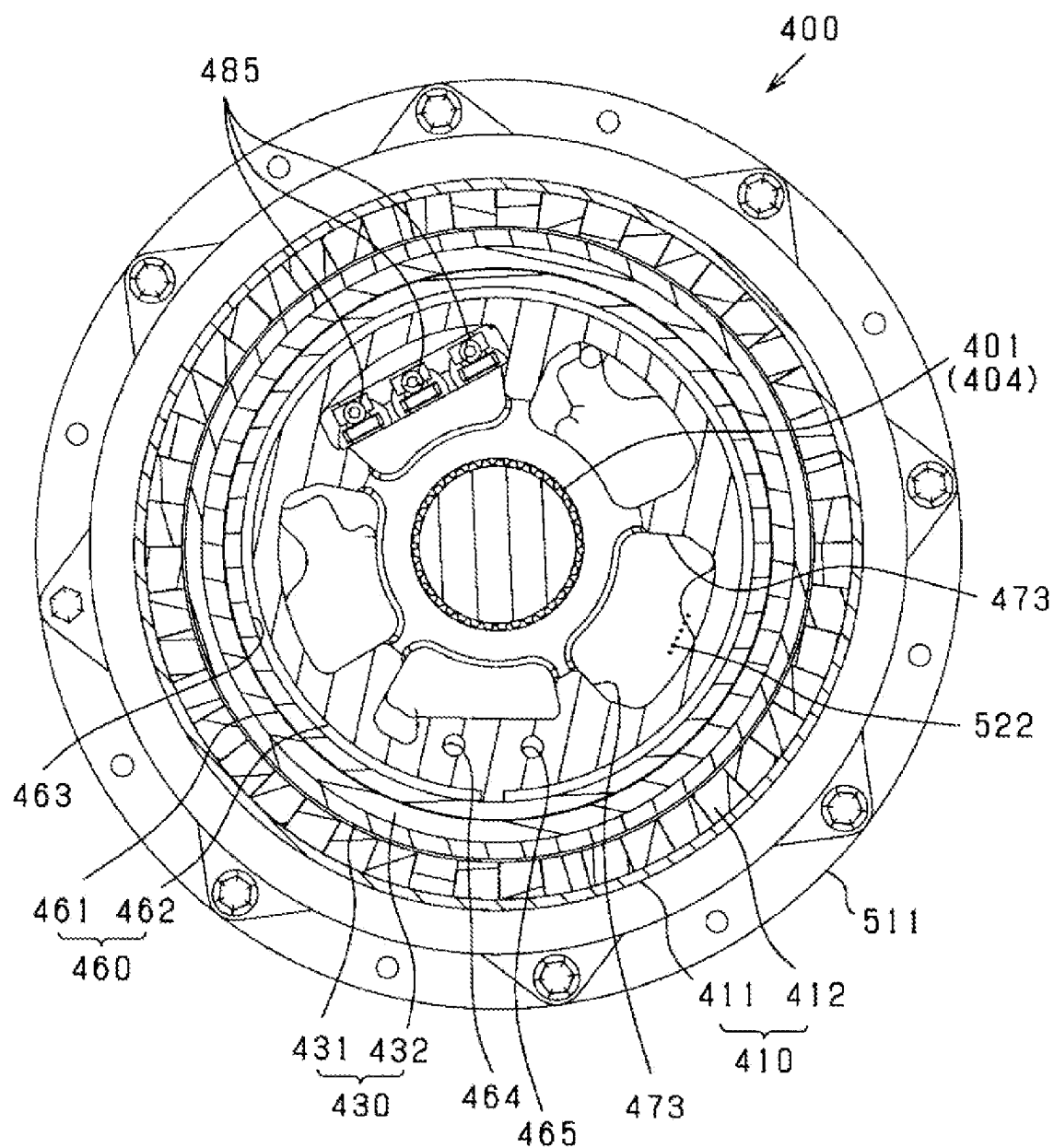
FIG. 45 is a transverse sectional view of the rotary electric machine.
Figure 46:
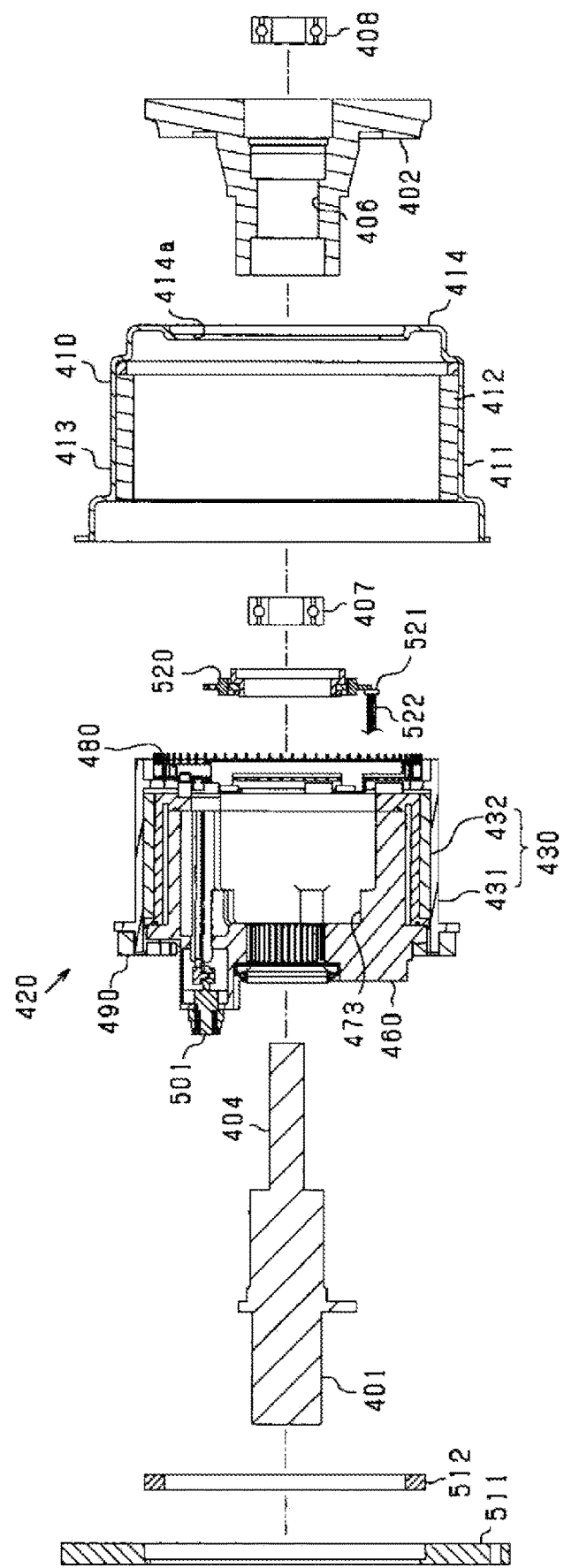
FIG. 46 is an exploded sectional view of the rotary electric machine.

Next, a rotary electric machine 400 according to a second embodiment will be described. The rotary electric machine 400 according to the present embodiment is used as an in-wheel motor of a vehicle. A schema of the rotary electric machine 400 is illustrated in FIGS. 41 to 46. FIG. 41 is a perspective view illustrating the entire rotary electric machine 400. FIG. 42 is a plan view of the rotary electric machine 400. FIG. 43 is a longitudinal sectional view of the rotary electric machine 400 (a sectional view taken along line 43-43 in FIG. 42). FIG. 44 is a transverse sectional view of the rotary electric machine 400 (a sectional view taken along line 44-44 in FIG. 43). FIG. 45 is a transverse sectional view of the rotary electric machine 400 (a sectional view taken along line 45-45 in FIG. 43). FIG. 46 is an exploded sectional view illustrating components of the rotary electric machine 400 in an exploded manner.

The rotary electric machine 400 is an outer rotor type surface permanent magnetic rotary electric machine. In the broad classification, the rotary electric machine 400 includes a rotary electric machine body including a rotor 410 and a stator unit 420 including a stator 430. The rotary electric machine 400 has a configuration in which a spindle 401 fixed to a vehicle body (not illustrated) and a hub 402 fixed to a wheel (not illustrated) are integrated with the rotary electric machine body. The spindle 401 and the hub 402 are required to have high strength, and are made of, for example, a steel material.

The spindle 401 includes a flange 403 and a stationary shaft 404. The flange 403 extends in a direction orthogonal to the axial direction. The stationary shaft 404 has a columnar shape, extends toward the center of the rotary electric machine from the flange 403, and is inserted through a hollow portion of the stator unit 420. The stationary shaft 404 preferably includes a large diameter portion and a small diameter portion as illustrated in the drawing. The hub 402 includes an insertion hole 406 through which the stationary shaft 404 is inserted. The hub 402 is rotatably supported by the pair of bearings 407 and 408 while the stationary shaft 404 is inserted through the insertion hole 406 of the hub 402. The hub 402 is rotatably supported by the bearings 407 and 408 at two positions in the axial direction. The bearings 407 and 408 are, for example, radial ball bearings and each have an outer race, an inner race, and a plurality of balls disposed therebetween. The bearings 407 and 408 may be roller bearing (needle roller bearing, tapered roller bearing) using rollers as rolling elements instead of balls.

In the rotary electric machine 400, a direction in which the axis serving as the rotation center extends (left-right direction in FIG. 43) is defined as the axial direction. The rotary electric machine 400 is attached to the vehicle such that the axial direction is directed along the horizontal direction or the substantially horizontal direction. When the wheels have a camber angle, the axial direction of the rotary electric machine 400 is preferably directed along the substantially horizontal direction while inclination corresponding to the camber angle is applied.

In the rotary electric machine 400, the rotor 410 and the stator 430 are disposed to face each other in the radial direction with an air gap interposed therebetween. The stator unit 420 is fixed to the spindle 401, and the rotor 410 is fixed to the hub 402. Therefore, the hub 402 and the rotor 410 are rotatable with respect to the spindle 401 and the stator unit 420.

As illustrated in FIG. 46, the rotor 410 includes a substantially cylindrical rotor carrier 411 and an annular magnet unit 412 fixed to the rotor carrier 411. The rotor carrier 411 includes a cylindrical portion 413 having a cylindrical shape and an end plate portion 414 provided on one end side in the axial direction of the cylindrical portion 413. The magnet unit 412 is fixed to the inner side of the cylindrical portion 413 in the radial direction to have an annular shape. The other end side in the axial direction of the rotor carrier 411 is open. The rotor carrier 411 functions as a magnet retainer. A through-hole 414a is formed in the central portion of the end plate portion 414. The hub 402 is fixed to the end plate portion 414 by using a fixing tool such as a bolt while the hub 402 is inserted through the through-hole 414a (see FIG. 43).

The magnet unit 412 includes a plurality of permanent magnets disposed such that the polarities are alternately changed along the circumferential direction of the rotor 410. The magnet unit 412 corresponds to a "magnet unit". With this configuration, the magnet unit 412 has a plurality of magnetic poles in the circumferential direction. The magnet unit 412 has, for example, the configuration described as the magnet unit 22 according to the first embodiment in FIGS. 6 and 7. For the permanent magnet, a sintered neodymium magnet having an intrinsic coercive force of 400 [kA/m] or more and the remanent flux density Br of 1.0 [T] or more is used.

Similarly to the magnet unit 22 in FIG. 7, the magnet unit 412 has a plurality of polar anisotropic permanent magnets. In these magnets, the directions of the easy axis of magnetization differ between the d-axis side (portion closer to the d-axis) and the q-axis side (portion closer to the q-axis). The direction of the easy axis of magnetization on the d-axis side is parallel to the d-axis, whereas the direction of the easy axis of magnetization on the q-axis side is orthogonal to the q-axis. In this case, an arc-shaped magnetic path is formed along the direction of the easy axis of magnetization. In short, each magnet is oriented such that the direction of the easy axis of magnetization is parallel to the d-axis serving as the center of the magnetic pole on the d-axis side as compared with that on the side of q-axis serving as the boundary of the magnetic pole.

Note that each magnet of the magnet unit 412 is preferably fixed to each other by adhesion or the like in the circumferential direction, and a fixing member such as a yarn is preferably attached, thereby being integrated each other at the outer peripheral portion. An annular end plate member is preferably attached to an end of each magnet in the axial direction.

Figure 59:
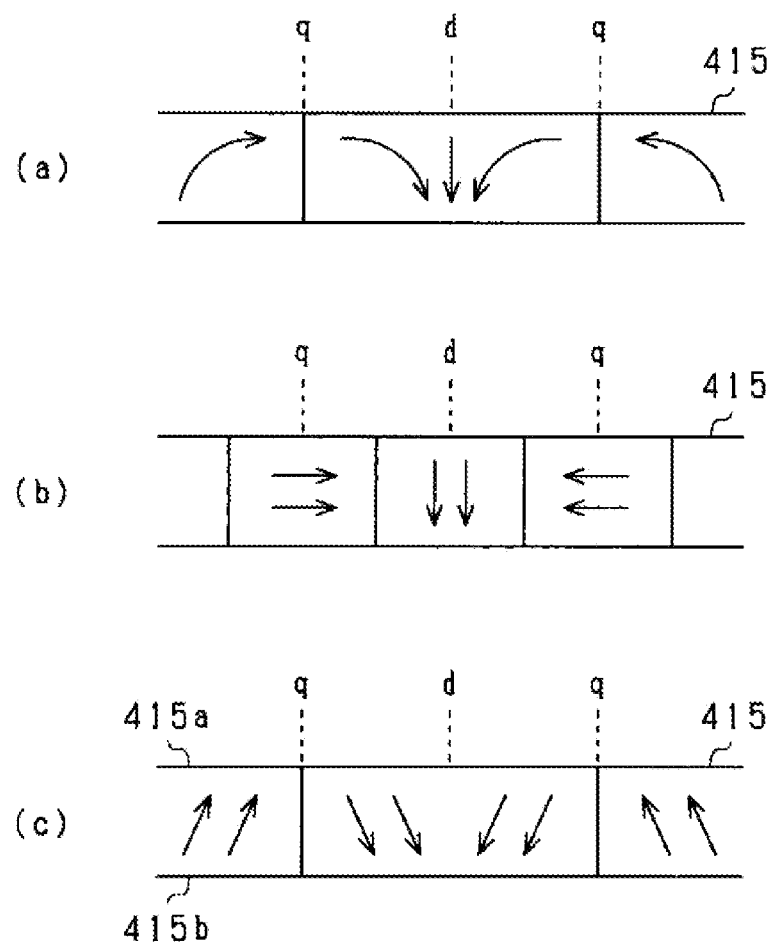
FIG. 59 is a view illustrating directions of magnetic paths of each magnet.

FIG. 59 illustrates directions of magnetic paths (directions of lines of magnetic force) of magnets 415 in the magnet unit 412. FIG. 59 illustrated the magnets 415 arranged in the circumferential direction in the magnet unit 412 in a planarly developed manner. As illustrated in (a) of FIG. 59, the magnet 415 is oriented such that the direction of the easy axis of magnetization is parallel to the d-axis serving as the center of the magnetic pole on a side of the d-axis as compared with that on a side of the q-axis serving as the boundary of the magnetic pole. Accordingly, the magnetic path passing through the magnet 415 and having an arc shape or a shape close to an arc is formed. Alternatively, as illustrated in (b) of FIG. 59, the magnets 415 may be arranged in a so-called Halbach array. In this case, the easy axis of magnetization of the magnet 415 disposed on the d-axis is directed to the radial direction (parallel to the d-axis), and the easy axis of magnetization of the magnet 415 disposed on the q-axis is directed to the circumferential direction (orthogonal to the q-axis).

Alternatively, as illustrated in (c) of FIG. 59, each magnet 415 may has the direction of the easy axis of magnetization as follows: the direction is inclined with respect to a pair of acting surfaces 415a and 415b facing each other and serving as the inflow and outflow surfaces of the magnetic flux; and the direction is inclined with respect to the d-axis so as to approach the d-axis on the stator winding side (lower side in the drawing). In this case, the magnet 415 has a magnetic path having a length greater than the magnet thickness dimension between the pair of acting surfaces 415a and 415b, and is oriented such that the easy axis of magnetization is along the magnetic path. In other words, the magnet 415 has the easy axis of magnetization biased to the d-axis side from the normal direction when viewed from a line representing a circumferential direction of the two magnet surfaces.

Figure 47:
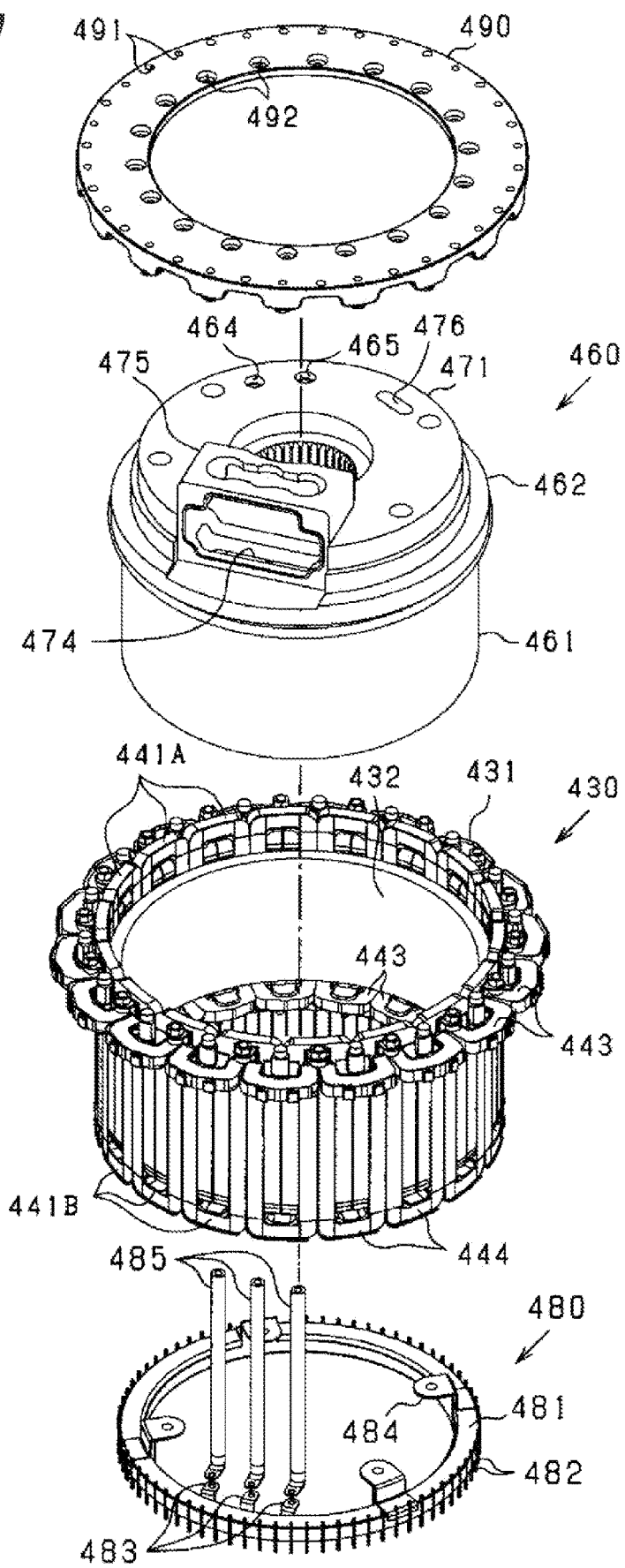
FIG. 47 is an exploded perspective view of the stator unit.

Next, a configuration of the stator unit 420 will be described. FIG. 47 is an exploded perspective view of the stator unit 420. The stator unit 420 includes the annular tubular stator 430, a stator holder 460 that holds the stator 430, a wiring module 480 attached to one end side in the axial direction, and a coil end cover 490 attached to the other end side in the axial direction of the stator 430.

Figure 48:
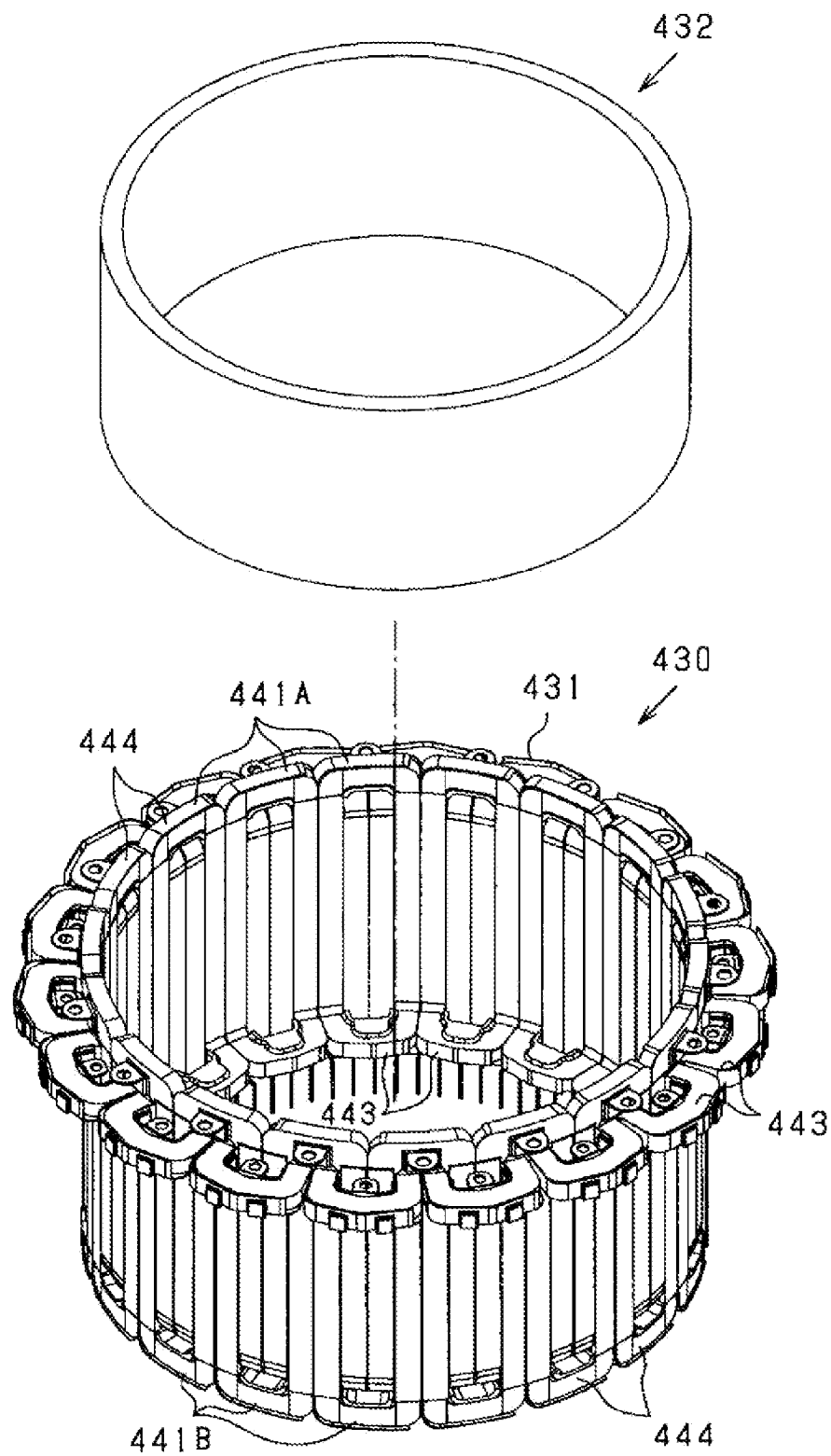
FIG. 48 is an exploded perspective view of a stator.
Figure 49:
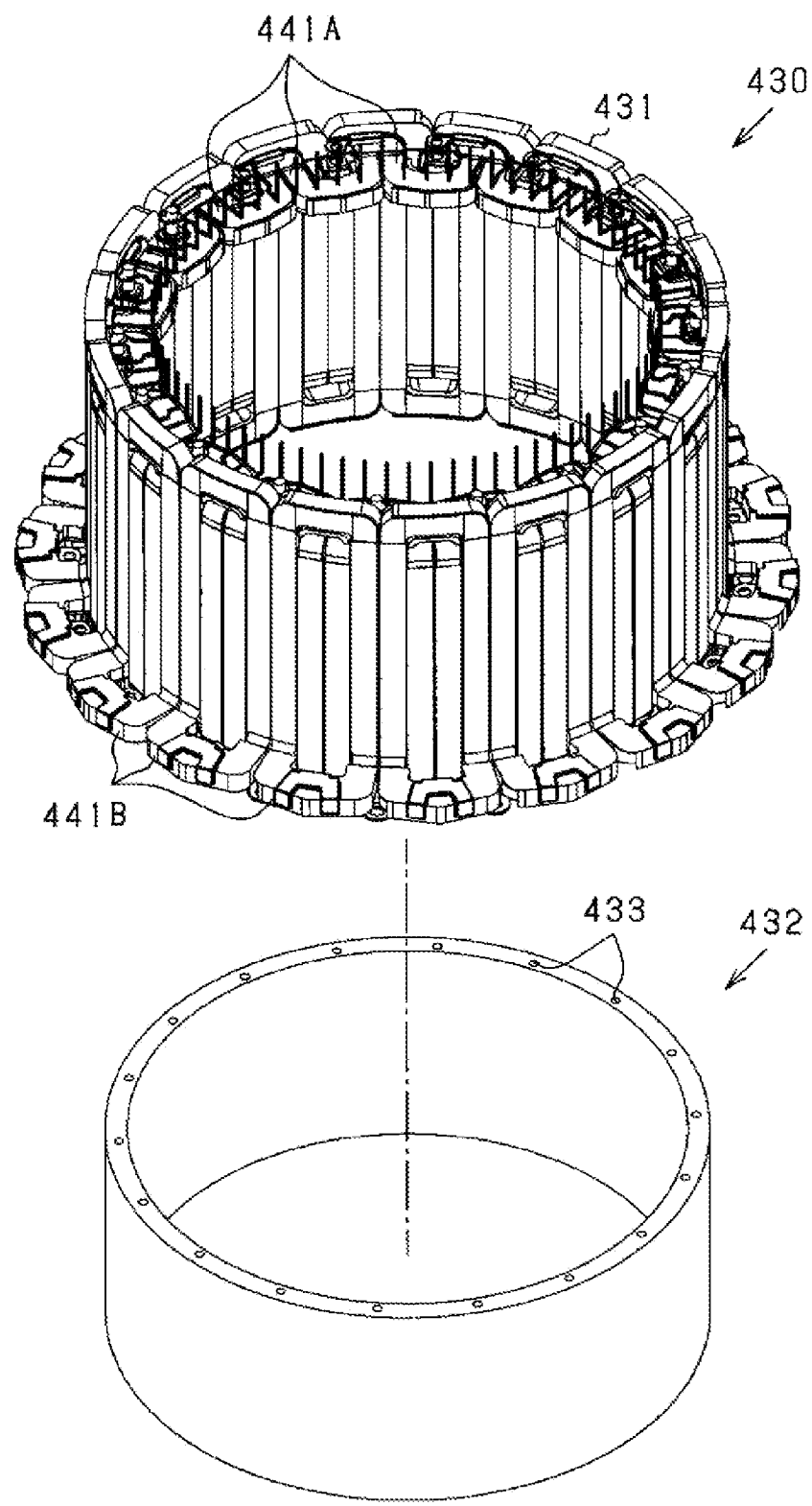
FIG. 49 is an exploded perspective view of the stator.
Figure 50:
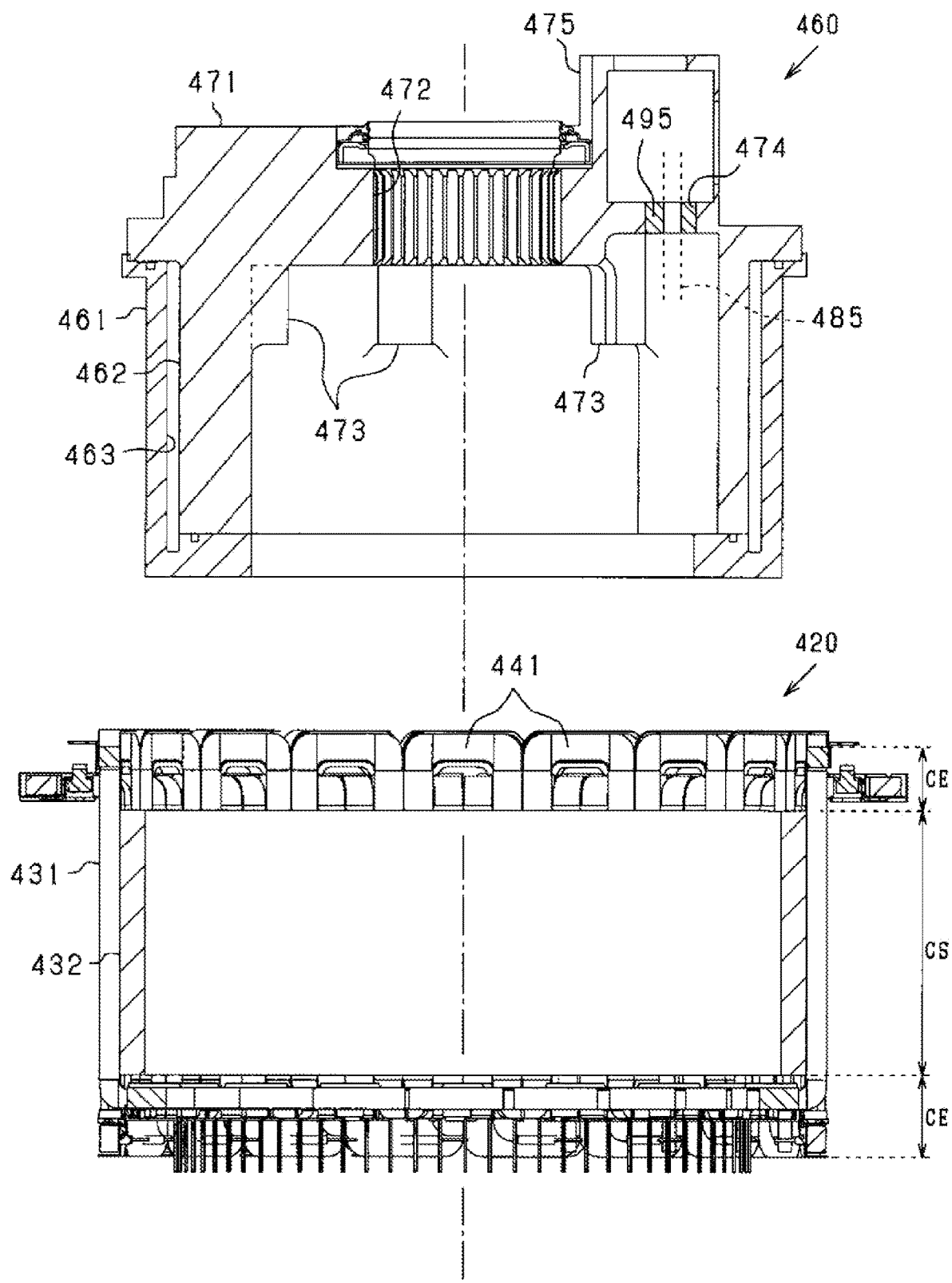
FIG. 50 is an exploded sectional view of the stator unit.

First, the stator 430 will now be described. FIGS. 48 and 49 are exploded perspective views of the stator 430, and FIG. 50 is an exploded sectional view of the stator unit 420. FIGS. 48 and 49 are exploded perspective views of the stator 430 viewed from different directions in the axial direction.

The stator 430 includes a stator winding 431 and a stator core 432. In the stator 430, the stator winding 431 has three-phase windings, and the phase winding of each phase includes a plurality of winding segments 441. The winding segments 441 are provided in accordance with the number of poles of the rotary electric machine 400, and the plurality of winding segments 441 are connected in parallel or in series for each phase. In the present embodiment, the number of magnetic poles is set to 24, but the number thereof can be freely set.

As illustrated in FIG. 50, the stator 430 includes, in the axial direction, a portion corresponding to the coil side CS facing the stator core 432 in the radial direction, and a portion corresponding to a coil end CE that is the outer side of the coil side CS in the axial direction. The coil side CS is also a portion facing the magnet unit 412 of the rotor 410 in the radial direction. The winding segments 441 are assembled to the outer side of the stator core 432 in the radial direction. In this case, the winding segments 441 are assembled in a state where both end portions thereof in the axial direction protrude outward from the stator core 432 in the axial direction (that is, to the coil end CE side).

Each of the winding segments 441 is provided such that one of both ends in the axial direction is bent in the radial direction and the other is not bent in the radial direction. In the winding segments 441 that is half the number of all the winding segments 441, one end side in the axial direction (lower side in FIG. 48) is a bent side, and is bent inward in the radial direction on the bent side. In the winding segments 441 that is remaining half of all the winding segments 441, the other end side in the axial direction (upper side in FIG. 48) is a bent side, and is bent outward in the radial direction on the bent side. In the following description, among the winding segments 441, the winding segment 441 having the portion bent inward in the radial direction is also referred to as a "winding segment 441A", and the winding segment 441 having the portion bent outward in the radial direction is also referred to as a "winding segment 441B".

Figure 51:
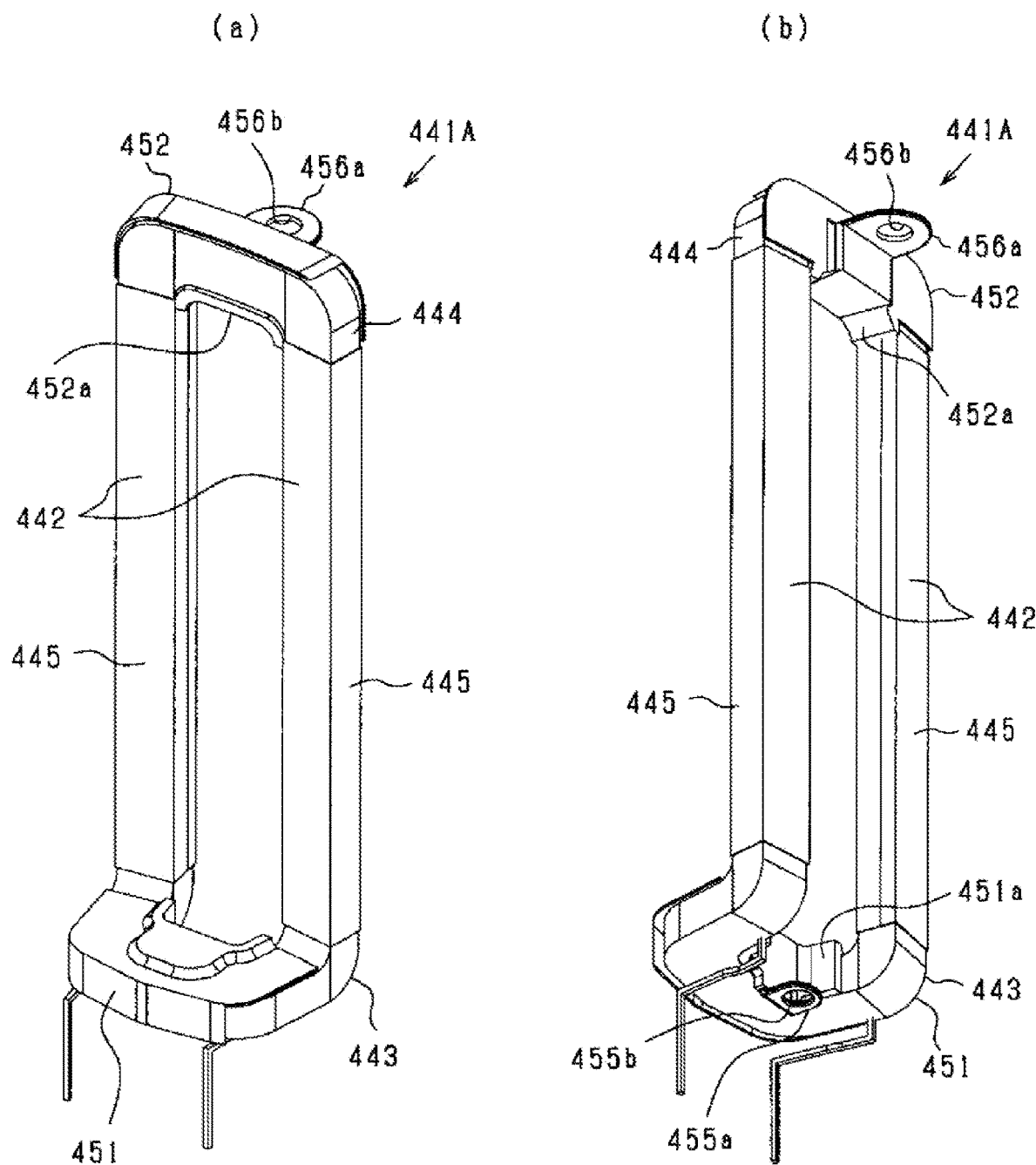
FIG. 51 is a perspective view illustrating a configuration of the winding segment.
Figure 52:
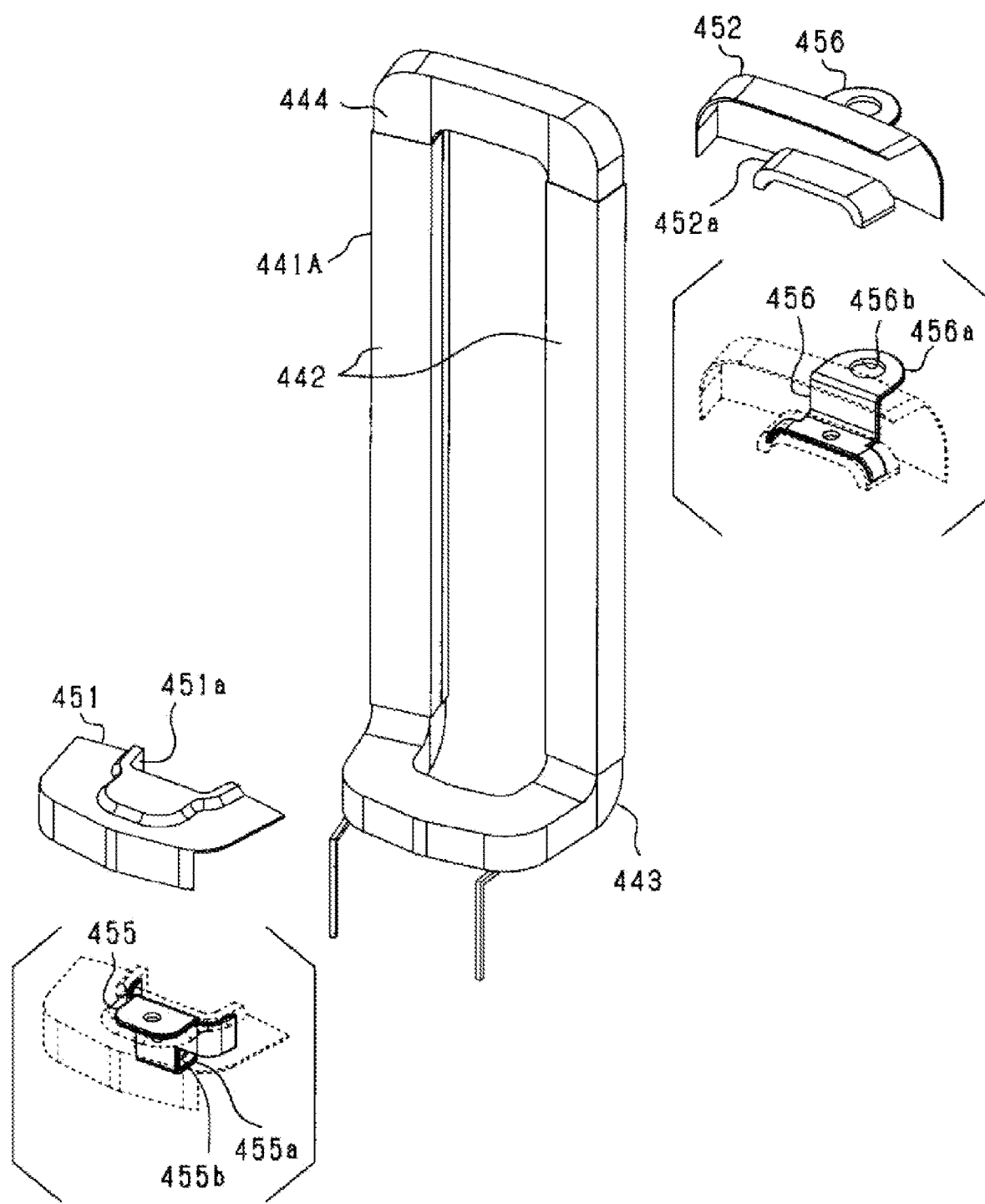
FIG. 52 is an exploded perspective view illustrating the insulating cover in the winding segment.
Figure 53:
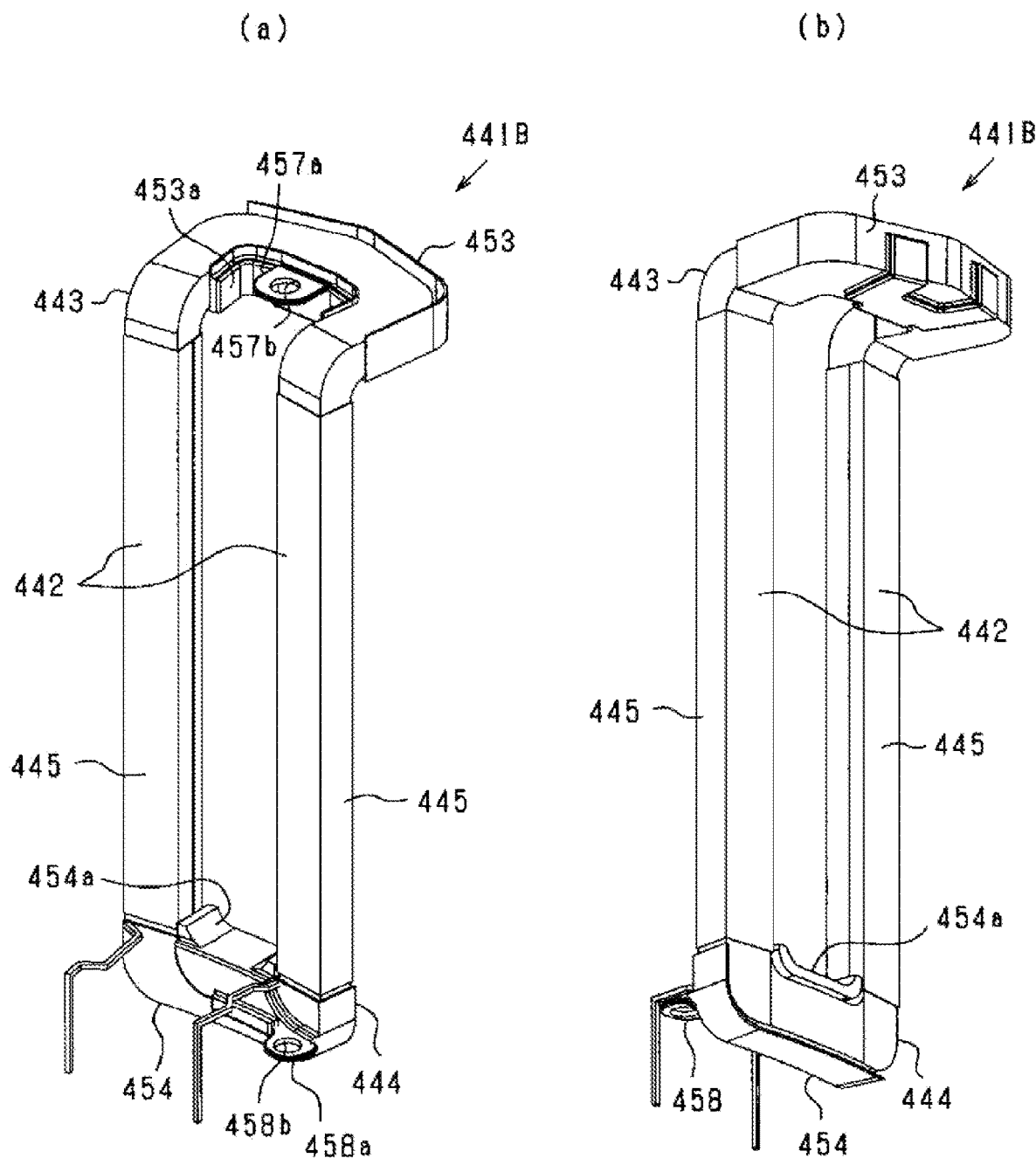
FIG. 53 is a perspective view illustrating a configuration of the winding segment.
Figure 54:
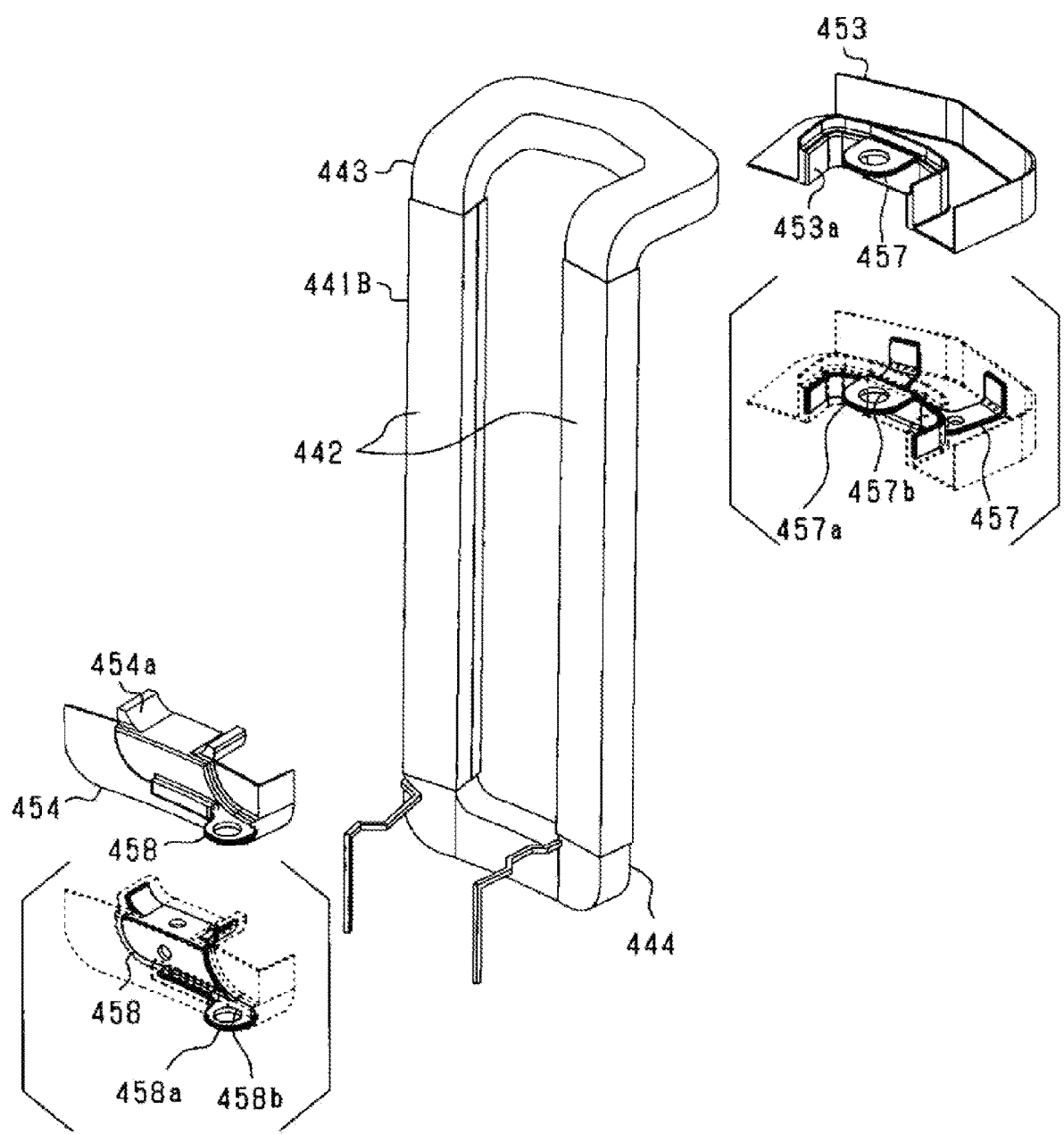
FIG. 54 is an exploded perspective view illustrating the insulating cover in the winding segment.

The configurations of the winding segments 441A and 441B will be described in detail. (a) and (b) of FIG. 51 are perspective views illustrating the configuration of the winding segment 441A. FIG. 52 is an exploded perspective view illustrating insulating covers 451 and 452 respectively attached to link portions 443 and 444 in the winding segment 441A in an exploded manner. (a) and (b) of FIG. 53 are perspective views illustrating the configuration of the winding segment 441B. FIG. 54 is an exploded perspective view illustrating insulating covers 453 and 454 respectively attached to the link portions 443 and 444 in the winding segment 441B in an exploded manner. (a) and (b) of FIG. 51 are perspective views of the winding segment 441A as viewed from the inner side and the outer side in the radial direction, respectively. Similarly, (a) and (b) of FIG. 53 are similarly perspective views of the winding segment 441B as viewed from the inner side and the outer side in the radial direction, respectively.

The winding segments 441A and 441B are each formed by multiply winding the conductive wire member. The winding segments 441A and 441B each include a pair of intermediate conductor portions 442 and a pair of the link portions 443 and 444. The pair of intermediate conductor portions 442 are provided to be in parallel to each other and have a linear shape. The pair of link portions 443 and 444 connect the pair of intermediate conductor portions 442 at both ends in the axial direction. The winding segments 441A and 441B are formed in an annular shape by the pair of intermediate conductor portions 442 and the pair of link portions 443 and 444. The pair of intermediate conductor portions 442 are separated at a predetermined coil pitch. The intermediate conductor portions 442 of the winding segments 441 of the other phases can be disposed between the pair of intermediate conductor portions 442 in the circumferential direction. In the present embodiment, the pair of intermediate conductor portions 442 are separated at two coil pitches. One intermediate conductor portion 442 for each of the winding segments 441 of the other two phases is disposed between the pair of intermediate conductor portions 442.

In the winding segments 441A and 441B, each intermediate conductor portion 442 is covered with a sheet-like insulating jacket 445. The configuration of the insulating jacket 445 is same as or similar to that of the insulating jacket 157 of the winding segment 151 according to the first embodiment described above. Specifically, the insulating jacket 445 employs a film member having at least a length of a range of the intermediate conductor portion 442 to be covered with and insulated in the axial direction as an axial dimension. The insulating jacket 445 is provided by winding the film member around the intermediate conductor portion 442. The insulating jacket 445 is provided around the intermediate conductor portion 442 with the ends of the film member in the circumferential direction overlapping each other.

Each of the link portions 443 and 444 on both sides in the axial direction is provided as a portion corresponding to the coil end CE (see FIG. 50). One of the link portions 443 and 444 is bent in the radial direction, and the other of the link portions 443 and 444 is not bent in the radial direction. Thus, the winding segments 441A and 441B each have a substantially L shape when viewed from the side.

In the winding segments 441A and 441B, the bending directions of the link portion 443 in the radial direction are different. In the winding segment 441A, the link portion 443 is bent inward in the radial direction. In the winding segment 441B, the link portion 443 is bent outward in the radial direction. In this case, assuming that the winding segments 441A and 441B are disposed side by side in the circumferential direction, the shapes in plan view (planar shapes in the radial direction) of the link portion 443 in the winding segments 441A and 441B are preferably different from each other. Furthermore, the width in the circumferential direction is preferably smaller toward the extending end at the link portion 443 of the winding segment 441A, and the width in the circumferential direction is preferably wider toward the extending end at the link portion 443 of the winding segment 441B.

In each of the winding segments 441A and 441B, the intermediate conductor portion 442 is provided as a coil side conductor portion arranged one by one in the circumferential direction at the coil side CS. Each of the link portions 443 and 444 is provided as a coil end conductor portion connecting the intermediate conductor portions 442 of the same phase at two positions different in the circumferential direction at the coil end CE.

Similarly to the winding segment 151 described above, the winding segments 441A and 441B are each formed by multiply winding a conductive wire member such that the transverse section of a bunch of conductive wire members is quadrangular. The conductive wire member is arranged in a plurality of rows in the circumferential direction and arranged in a plurality of rows in the radial direction, so that the intermediate conductor portion 442 is formed to have a substantially rectangular transverse section (see FIG. 20).

In the winding segments 441A and 441B, since the conductive wire member is multiply wound, thinning of the current flow path is achieved. Therefore, when the magnetic field including the harmonic magnetic field interlinks with the conductor (intermediate conductor portion 442), the effect of suppressing overcurrent of the conductor against the eddy current can be increased, and the eddy-current loss can be reduced. The conductive wire member preferably includes an assembly obtained by twisting a plurality of wires. With this configuration, a portion in which the directions of magnetic field applied are opposite to each other is generated in each wire, cancelling the back electromotive force caused by the interlinked magnetic field. As a result, the effect of reducing the eddy current flowing through the conductor can be enhanced.

Here, each wire preferably includes at least carbon nanotube fibers. The electrical resistance of the carbon nanotube can be expected to be about ⅕ or less of that of the copper wire. Each wire preferably includes a fiber including boron-containing microfibers in which at least part of carbon of the carbon nanotube fiber is substituted with boron. In this case, the effect of suppressing eddy current can be further enhanced, and the eddy-current loss can be further reduced.

Next, the insulating covers 451 to 454 attached to each of the winding segments 441A and 441B will be described. The insulating covers 451 to 454 are an insulating member provided to ensure insulation between the winding segments 441 at each of the link portions 443 and 444. The insulating covers 451 to 454 are each formed of an insulating material such as synthetic resin.

As illustrated in (a) and (b) of FIG. 51 and FIG. 52, in the winding segment 441A, the insulating cover 451 is attached to the link portion 443 on one end side in the axial direction, and the insulating cover 452 is attached to the link portion 444 on the other end side in the axial direction. A bracket 455 made of, for example, a metal plate is embedded in the insulating cover 451. The bracket 455 has a protrusion 455a protruding outward in the radial direction from the extending end of the link portion 443, and a through-hole 455b passing through the protrusion 455a in the axial direction (vertical direction in the drawing) is provided at the protrusion 455a. A bracket 456 made of, for example, a metal plate is embedded in the insulating cover 452. The bracket 456 has a protrusion 456a protruding outward in the radial direction from the extending end of the link portion 444, and a through-hole 456b passing through the protrusion 456a in the axial direction (vertical direction in the drawing) is provided in the protrusion 456a.

The insulating covers 451 and 452 respectively have engagement portions 451a and 452a that respectively engage with the inner side of the curved portion at the extending end of the link portions 443 and 444. Part of the brackets 455 and 456 is preferably integrated with the engagement portions 451a and 452a as a base material. The brackets 455 and 456 may be fixed to the outer surface of the insulating covers 451 and 452 by adhesion or the like in addition to being embedded in the insulating covers 451 and 452.

As illustrated in (a) and (b) of FIG. 53 and FIG. 54, in the winding segment 441B, the insulating cover 453 is attached to the link portion 443 on one end side in the axial direction, and the insulating cover 454 is attached to the link portion 444 on the other end side in the axial direction. A bracket 457 made of, for example, a metal plate is embedded in the insulating cover 453. The bracket 457 has a protrusion 457a protruding outward in the radial direction from the extending end of the link portion 443, and a through-hole 457b passing through the protrusion 457a in the axial direction (vertical direction in the drawing) is provided at the protrusion 457a. A bracket 458 made of, for example, a metal plate is embedded in the insulating cover 454. The bracket 458 has a protrusion 458a protruding outward in the radial direction from the extending end of the link portion 444, and a through-hole 458b passing through the protrusion 458a in the axial direction (vertical direction in the drawing) is provided at the protrusion 458a.

The insulating covers 453 and 454 respectively have engagement portions 453a and 454a that respectively engage with the inner side of the curved portion at the extending ends of the link portions 443 and 444. Part of the brackets 457 and 458 is preferably integrated with the engagement portions 453a and 454a as a base material. The brackets 457 and 458 may be fixed to the outer surface of the insulating covers 453 and 454 by adhesion or the like in addition to being embedded in the insulating covers 453 and 454.

Figure 55:
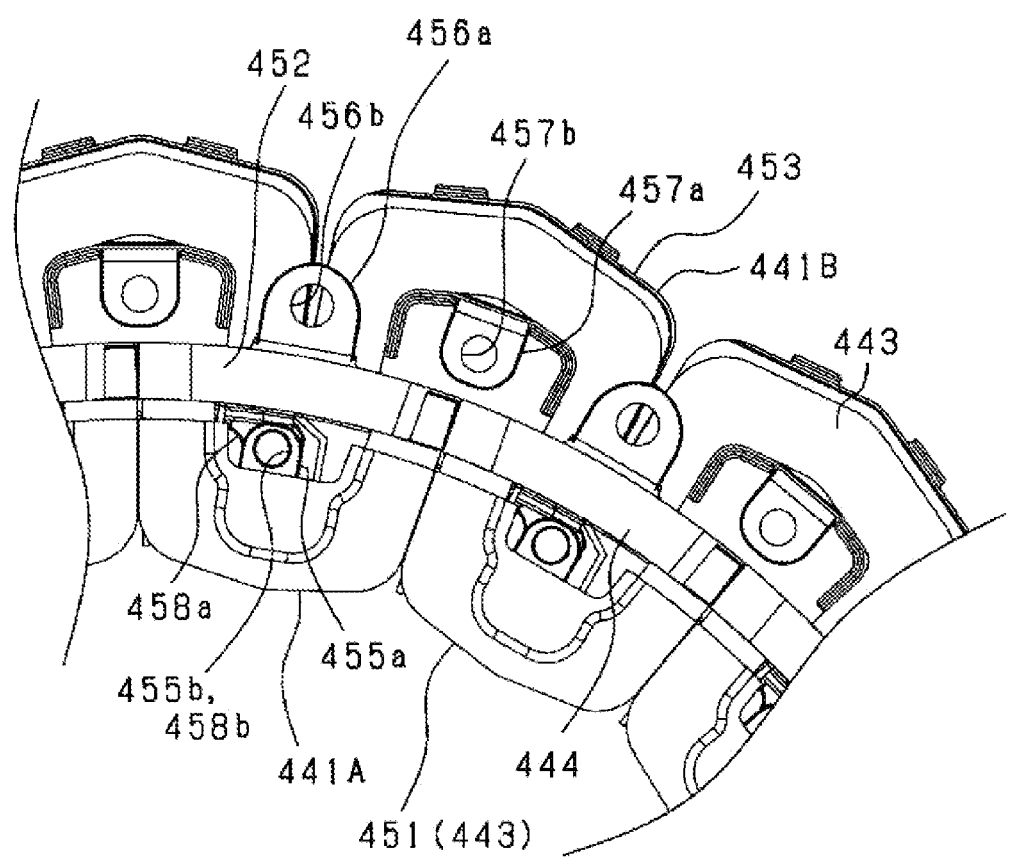
FIG. 55 is a plan view illustrating a state where the winding segments are disposed side by side in the circumferential direction.

FIG. 55 is a plan view illustrating a state where the winding segments 441A and 441B are disposed side by side in the circumferential direction. FIG. 55 is a plan view of the stator winding 431 illustrated in FIG. 48 as viewed from one side in the axial direction (upper side of the drawing).

In FIG. 55, the link portion 443 of the winding segment 441A extends inward in the radial direction, and the link portion 443 of the winding segment 441B extends outward in the radial direction. Further on the inner side of each of the winding segments 441A and 441B in the radial direction than the intermediate conductor portion 442, on one end side in the axial direction of the stator winding 431 (the back side of the paper surface of FIG. 55), the protrusion 455a of the bracket 455 provided on the insulating cover 451 of the winding segment 441A and the protrusion 458a of the bracket 458 provided on the insulating cover 454 of the winding segment 441B overlap each other in the axial direction. Furthermore, the positions of the through-holes 455b and 458b of the protrusions 455a and 458a match each other in plan view.

On the other hand, further on the outer side of each of the winding segments 441A and 441B in the radial direction than the intermediate conductor portion 442, on the other end side in the axial direction of the stator winding 431 (the front side of the paper surface of FIG. 55), the protrusion 456a of the bracket 456 provided on the insulating cover 452 of the winding segment 441A and the protrusion 457a of the bracket 457 provided on the insulating cover 453 of the winding segment 441B are alternately arranged at equal intervals in the circumferential direction. In this case, the through-holes 456b and 457b of the protrusions 456a and 457a have the same distance from the planar center of the stator 430 in the radial direction and are disposed at equal intervals in the circumferential direction.

As illustrated in FIGS. 48 and 49, the stator winding 431 is formed in an annular shape by the winding segments 441A and 441B, and the stator core 432 is assembled to the inner side thereof in the radial direction. The stator core 432 is formed as a core sheet stacked body in which core sheets made of a magnetic steel sheet, which is a magnetic member, are stacked in the axial direction. The stator core 432 has a cylindrical shape having a predetermined thickness in the radial direction. The inner peripheral surface and the outer peripheral surface of the stator core 432 has a curved surface shape without protrusions and recesses. The stator core 432 functions as a back yoke. The stator core 432 is formed by stacking a plurality of core sheets in the axial direction. The core sheet is punched into, for example, an annular plate shape.

However, a stator core having a helical core structure may be used as the stator core 432. In the stator core 432 having a helical core structure, a strip-shaped core sheet having a predetermined width is used. This core sheet is wound to have an annular shape and is stacked in the axial direction to form the stator core 432 having a cylindrical shape as a whole.

The assembly of the stator winding 431 with respect to the stator core 432 may be performed by individually assembling the winding segments 441A and 441B with respect to the stator core 432, or may be performed by forming the annular stator winding 431 with the winding segments 441A and 441B and then assembling the stator winding 431 with respect to the stator core 432.

As illustrated in FIG. 49, a plurality of recesses 433 are formed at predetermined intervals in the circumferential direction on the end surface on one end side in the axial direction of the stator core 432. In a state where the stator winding 431 and the stator core 432 are integrated, the respective through-holes 455b and 458b of the brackets 455 and 458 in the insulating covers 451 and 454 and the recess 433 on the end surface of the stator core 432 in the axial direction are aligned further on the inner side of each of the winding segments 441A and 441B in the radial direction than the intermediate conductor portion 442. The winding segments 441A and 441B are fixed to the stator core 432 by assembling a joining member made of, for example, a metal fastening pin to the through-holes 455b and 458b and the recess 433.

Here, in the winding segments 441A and 441B, the pair of intermediate conductor portions 442 is provided apart from each other at the interval of full pitch winding. One intermediate conductor portion 442 for each of the winding segments of the other two phases is disposed between the pair of intermediate conductor portions 442. The link portion 443 of one of winding segments is bent in the radial direction between the winding segments in which the link portions 443 and 444 overlap each other in the circumferential direction, thereby avoiding mutual interference (see FIGS. 48 and 49). On the inner side of the curved portion extending in the radial direction in the link portion 443 bent in the radial direction, the winding segments 441A and 441B are fixed by the protrusions 455a and 457a of the bracket 455 and 457 (see FIG. 55). The protrusions 455a and 457a of the brackets 455 and 457 each correspond to a "fixing portion".

On one end side of the stator winding 431 in the axial direction, the winding segment 441A is fixed to the stator core 432 by the protrusion 455a of the bracket 455 on the inner side of the intermediate conductor portion 442 in the radial direction. On the other hand, on the other end side of the stator winding 431 in the axial direction, the winding segment 441B is fixed to the coil end cover 490 by the protrusion 457a of the bracket 457 on the outer side of the intermediate conductor portion 442 in the radial direction (see FIG. 47). The coil end cover 490 is fixed to the stator core 432 via the stator holder 460, and corresponds to part of an integrated object, which is integrated with the stator core 432.

Figure 56:
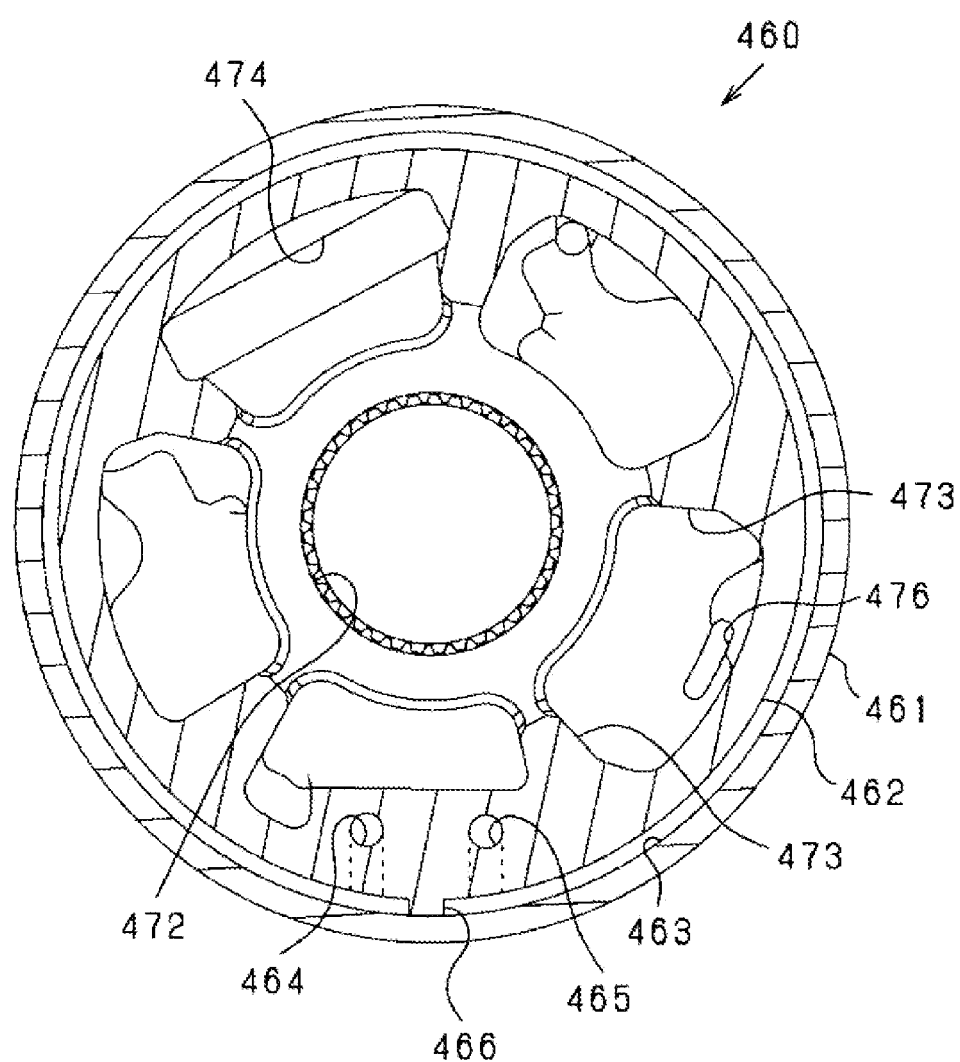
FIG. 56 is a transverse sectional view of the stator holder.

Next, a configuration of the stator holder 460 will be described. Here, the configuration of the stator holder 460 will be described with reference to FIGS. 50 and 56. FIG. 56 is a transverse sectional view of the stator holder 460 (a transverse sectional view at the same position as FIG. 45).

As illustrated in FIGS. 50 and 56, the stator holder 460 includes an outer cylinder member 461 and an inner cylinder member 462, both of which have a cylindrical shape. The outer cylinder member 461 is disposed on the outer side in the radial direction and the inner cylinder member 462 is disposed on the inner side in the radial direction, and they are integrally assembled to form the stator holder 460. Each of these members 461 and 462 includes, for example, metal such as aluminum or cast iron, or carbon fiber reinforced plastic (CFRP).

An inner diameter dimension of the cylindrical part of the outer cylinder member 461 is greater than an outer diameter dimension of the cylindrical part of the inner cylinder member 462. Therefore, in a state where the inner cylinder member 462 is assembled to the inner side of the outer cylinder member 461 in the radial direction, an annular gap is formed between these members 461 and 462. The gap space serves as a coolant path 463 through which a coolant such as cooling water flows. The coolant path 463 is provided in an annular shape in the circumferential direction of the stator holder 460. The inner cylinder member 462 includes an inlet path 464 serving as an inlet of the coolant and an outlet path 465 serving as an outlet of the coolant. A partition 466 is provided between the inlet path 464 and the outlet path 465 in the coolant path 463. The inlet path 464 and the outlet path 465 communicate with the coolant path 463 on both sides with the partition 466 interposed therebetween, and are provided so as to extend in the axial direction. A coolant flowing in from the inlet path 464 to flow in the coolant path 463 in the circumferential direction, and then flow out from the outlet path 465.

One end of each of the inlet path 464 and the outlet path 465 is open to the end surface of the inner cylinder member 462 in the axial direction. On the end surface in the axial direction, an inlet pipe port 467 is provided in the opening of the inlet path 464, and an outlet pipe port 468 is provided in the opening of the outlet path 465 (see FIG. 42).

Although not illustrated, a circulation path for circulating the coolant is connected to the inlet pipe port 467 and the outlet pipe port 468. The circulation path includes, for example, an electric pump and a heat dissipation device such as a radiator. The coolant circulates through the circulation path and the coolant path 463 of the rotary electric machine 400 due to the driving of the pump.

The stator core 432 is assembled to the outer side of the stator holder 460 in the radial direction, more specifically, to the outer side of the outer cylinder member 461 in the radial direction. The stator core 432 is assembled with respect to the stator holder 460 (outer cylinder member 461) by, for example, adhesion. Alternatively, the stator core 432 may be fitted and fixed to the stator holder 460 with a predetermined interference by shrink-fitting or press-fitting.

The inner cylinder member 462 has a cylindrical shape and has an end plate portion 471 on one end side in the axial direction. A through-hole 472 passing through the end plate portion 471 in the axial direction is provided at the center of the end plate portion 471. A spline is formed on an inner peripheral surface of the through-hole 472. The stationary shaft 404 of the spindle 401 can be inserted through the through-hole 472 of the inner cylinder member 462. In a state where the stationary shaft 404 of the spindle 401 is inserted through the through-hole 472, the spline on the through-hole 472 side meshes with the spline on the stationary shaft 404 side.

A plurality of protrusions 473 are provided at predetermined intervals in the circumferential direction on the inner peripheral side of the inner cylinder member 462. Each of these protrusions 473 is provided so as to protrude inward in the radial direction in the hollow portion of the inner cylinder member 462, and is provided in a range from the end plate portion 471 to the intermediate position in the axial direction (see FIG. 50). The protrusion 473 functions as a reinforcing member of the inner cylinder member 462.

The end plate portion 471 of the inner cylinder member 462 includes an opening 474 passing therethrough in the axial direction at a position on the outer side of the through-hole 472 in the radial direction. The opening 474 is an insertion hole portion through which a power line 485 of each phase to be described later is inserted in the axial direction. A terminal block 475 is provided on the outer side of the opening 474 in the axial direction in the inner cylinder member 462 (see FIG. 41), and an external terminal 501 to which external wiring can be connected is attached to the terminal block 475.

The end plate portion 471 of the inner cylinder member 462 includes an insertion hole passing therethrough in the axial direction at a position that is on the outer side of the through-hole 472 in the radial direction and has at least one protrusion 473 interposed between the opening 474 and the insertion hole 476 in the circumferential direction. The insertion hole 476 is a hole portion through which a resolver signal line 522 to be described later is inserted in the axial direction.

Next, the wiring module 480 will be described. The wiring module 480 is a winding connection member electrically connected to the winding segments 441A and 441B in the stator winding 431. Through the wiring module 480, the winding segments 441 of respective phases are connected in parallel or in series for each phase and the phase windings of respective phases are connected to a neutral point. As illustrated in FIG. 43, the wiring module 480 is provided on one end side among both ends of the stator 430 in the axial direction, specifically, on the end plate portion 414 side of the rotor carrier 411.

More specifically, the stator winding 431 includes the winding segment 441A (first winding segment) and the winding segment 441B (second winding segment). In the winding segment 441A, one end side in the axial direction is bent inward in the radial direction. In the winding segment 441B, the other end side in the axial direction is bent outward in the radial direction. The winding segments 441A and 441B are disposed side by side while partially overlapping each other in the circumferential direction with the bent side of the winding segment 441A and the non-bent side of the winding segment 441B disposed on the end plate portion 414 side of the rotor carrier 411. The wiring module 480 is provided on the end plate portion 414 side of the rotor carrier 411 among both ends of the stator winding 431 in the axial direction.

As illustrated in FIG. 47, the wiring module 480 includes an annular ring 481 having an annular shape, and a plurality of connection terminals 482 provided side by side in the circumferential direction along the annular ring 481. The annular ring 481 is formed in an annular shape by using, for example, an insulating member such as resin. Wiring for each phase and wiring for a neutral point (both not illustrated) are embedded in the annular ring 481, and the connection terminal 482 is electrically connected to each wiring. The connection terminal 482 is provided for each winding segment 441 and is fixed in a direction extending in the axial direction.

In the wiring module 480, a bus bar 483 is connected to the wiring of each phase embedded in the annular ring 481 for each phase. The bus bars 483 are part of power wiring for U-phase power, V-phase power, and W-phase power, respectively, and are provided in a direction protruding inward in the radial direction.

In the stator winding 431, the link portions 444 that are not bent in the radial direction are disposed in an annular shape at the lower end in FIG. 47. The wiring module 480 is provided on the inner side of the link portion 444 in the radial direction. That is, the annular ring 481 of the wiring module 480 is formed to have a diameter smaller than that of the annular ring formed by the link portion 444 arranged in the circumferential direction. The annular ring 481 includes an attaching member 484 for attaching the wiring module 480 to the stator holder 460. The attaching member 484 includes, for example, a metal plate, and has a plurality of attaching portions at predetermined intervals in the circumferential direction.

The power line 485 that supplies power to the stator winding 431 for each phase is connected to each bus bar 483 of the wiring module 480. The power lines 485 are disposed side by side in the circumferential direction and are disposed to extend in the axial direction. Preferably, the conductor itself of the power line 485 is a rigid body such as a metal bus bar, or the conductor of the power line 485 is inserted through a tube that is a rigid body such as a synthetic resin. With this configuration, even if vibration occurs in the rotary electric machine 400, the power line 485 can be made less susceptible to the influence of the vibration. The power line 485 can also include a flexible harness. In this case, the disconnection can be prevented by absorbing the vibration in the rotary electric machine 400.

Preferably, the power line 485 further has a shield layer on the outer periphery. The shield layer can prevent a magnetic field from being generated outside the shield layer. In addition, the outer coated layer of the power line 485 is preferably a fluorine film. In this case, assuming that the temperature of the power line 485 rises, and the heat resistance can be improved.

Next, the coil end cover 490 will be described.

As illustrated in FIG. 47, the coil end cover 490 has an annular shape, and is provided at a coil end portion on one end side in the axial direction of the stator 430. In other words, the coil end cover 490 is provided at a coil end portion on a side where the link portion 443 is bent outward in the radial direction among the coil end portions at both ends in the axial direction of the stator 430. The coil end portion of the stator winding 431 is covered in the axial direction with the coil end cover 490. The coil end cover 490 defines the positioning of the winding segments 441A and 441B on one end side in the axial direction.

The coil end cover 490 includes a plurality of through-holes 491 at equal intervals in the circumferential direction. The plurality of through-holes 491 alternately correspond to the through-hole 456b of the bracket 456 in the insulating cover 452 of the winding segment 441A and the through-hole 457b of the bracket 457 in the insulating cover 453 of the winding segment 441B. In this case, while the coil end cover 490 is mounted to one end side of the stator 430 in the axial direction, the respective through-holes 491 on the coil end cover 490 side are aligned with the through-holes 456b and 457b on the insulating covers 452 and 453 side. A joining member including, for example, a metal fastening pin is assembled to each through-hole 491, whereby the coil end cover 490 is fixed to the stator 430. In such a state, one end side of each of the winding segments 441A and 441B in the axial direction is fixed by the coil end cover 490.

The coil end cover 490 includes a plurality of attachment holes 492 for attaching the coil end cover 490 to the stator holder 460. Assuming a state where the coil end cover 490 is attached to the stator winding 431, the plurality of through-holes 491 arranged in the circumferential direction are disposed further on the outer side in the radial direction than the link portion 444 extending in the axial direction without being bent in the radial direction in the stator winding 431 (i.e., the position of the intermediate conductor portion 442). The plurality of attachment holes 492 similarly arranged in the circumferential direction are disposed further on the inner side in the radial direction than the link portion 444 of the stator winding 431.

In the stator unit 420, the stator winding 431 including the plurality of winding segments 441A and 441B and the stator core 432 are integrated. At this time, on one end side in the axial direction (the lower end side in FIG. 47), the winding segments 441A and 441B are fixed to the stator core 432 using the brackets 455 and 458 of the insulating covers 451 and 454. Furthermore, the stator holder 460 is assembled to the stator 430 including the stator windings 431 and the stator core 432 from one side in the axial direction, and the coil end cover 490 is attached to the stator holder 460. At this time, a fixing tool such as a fastening pin or a screw is inserted into the attachment hole 492 of the coil end cover 490, and the coil end cover 490 is fixed to the stator holder 460. A fixing tool such as a fastening pin or a screw is inserted into the through-hole 491 of the coil end cover 490, and the coil end cover 490 is fixed to the stator winding 431 (each of the winding segments 441A and 441B).

On the opposite side of the coil end cover 490 in the axial direction, the wiring module 480 is attached to the stator holder 460 by the attaching member 484. In this state, in the hollow portion of the stator holder 460 (inner cylinder member 462), the power line 485 of each phase is provided to extend from one end side to the other end side of the stator unit 420 in the axial direction. Each of the power lines 485 is connected to the external terminal 501 provided at the end plate portion 471 of the inner cylinder member 462.

Each power line 485 is preferably clamped with respect to the inner cylinder member 462 (stator holder 460). Specifically, as illustrated in FIG. 50, a clamp member 495 made of anti-vibration rubber is provided in the opening 474 of the inner cylinder member 462, and the power line 485 provided passing through the opening 474 is clamped by the clamp member 495. In this case, each power line 485 is clamped by the inner cylinder member 462, so that the earthquake resistance of each power line 485 can be improved. In particular, the vibration resistance can be further improved by using the anti-vibration rubber as the clamp member 495. The clamping position of the power line 485 in the inner cylinder member 462 may be a position other than the opening 474.

Figure 57:
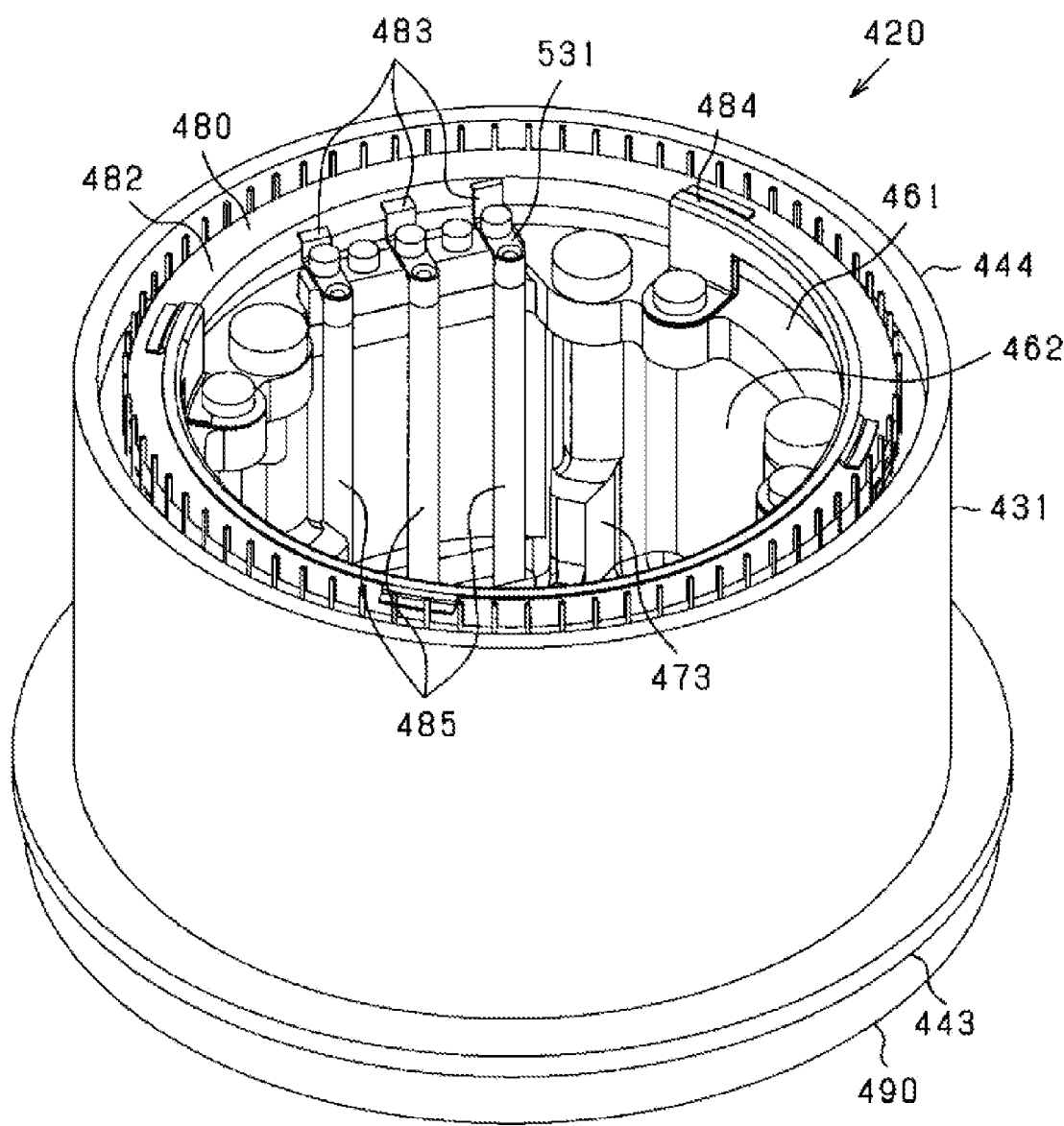
FIG. 57 is a perspective view of the stator unit as viewed from the side of a wiring module.

FIG. 57 is a perspective view of the stator unit 420 as viewed from the wiring module 480 side (i.e., the opposite side of the coil end cover 490). In FIG. 57, for convenience, specific illustration of each winding segment 441 in the stator winding 431 is omitted, and the stator winding 431 is illustrated as an integrated cylindrical body.

As illustrated in FIG. 57, in one coil end portion of the stator 430, the wiring module 480 is disposed on the inner side of the stator winding 431 in the radial direction (specifically, on the inner side in the radial direction of each link portion 444 arranged in the circumferential direction). In this case, the upper side of FIG. 57 is the hub 402 side in the axial direction of the rotary electric machine 400, that is, the wheel side. The wiring module 480 is disposed on the hub 402 side in the axial direction, that is, the wheel side. In this configuration, the wiring module 480 is disposed on the inner side of the stator winding 431 in the radial direction at the coil end portion (on the inner side of each link portion 444 in the radial direction). Accordingly, the wiring module 480 does not protrude outward in the radial direction, and the stator unit 420 can be downsized.

In the stator winding 431 according to the present embodiment, the link portion 443 is bent inward in the radial direction at the coil end portion on the hub 402 side. The link portion 443 is bent outward in the radial direction at the coil end on the opposite side of the hub. The wiring module 480 is disposed on the hub 402 side (the side where the link portion 443 is bent inward in the radial direction). In this case, assuming a configuration in which the wiring module 480 is disposed on the opposite side of the hub, the wiring module 480 and the coil end cover 490 are provided so as to protrude toward the outer side of the link portion 444 in the radial direction. Thus, there is a concern that the protrusion extending outward in the radial direction becomes large. However, according to the configuration according to the present embodiment, such inconvenience is eliminated.

A terminal block 531 is provided on an end surface of the stator holder 460 in the axial direction (more specifically, an end surface of the outer cylinder member 461 in the axial direction). The bus bar 483 of the wiring module 480 and the power line 485 are connected via the terminal block 531. Specifically, the terminal portion of the bus bar 483 and the terminal portion of the power line 485 overlap each other, and the bus bar 483 and the power line 485 are fixed to the terminal block 531 by using a fixing tool such as a screw in the overlapping state. In this case, each power line 485 can be securely fixed. In other words, when the bus bar 483 and the power line 485 are simply connected to each other, there is a concern about disconnection at the connection portion due to vibration generated in the rotary electric machine 400. However, since the bus bar 483 and the power line 485 are connected to each other at the terminal block 531 of the stator holder 460 (inner cylinder member 462), disconnection of the connection portion due to vibration can be suppressed.

When the stator 430 and the stator holder 460 are assembled, the stator holder 460 and the stator core 432 may be assembled in advance, and the stator winding 431 may be assembled to the integrated object of the stator holder 460 and the stator core 432 (i.e., assembly of the winding segments 441A, 441B).

Figure 58:
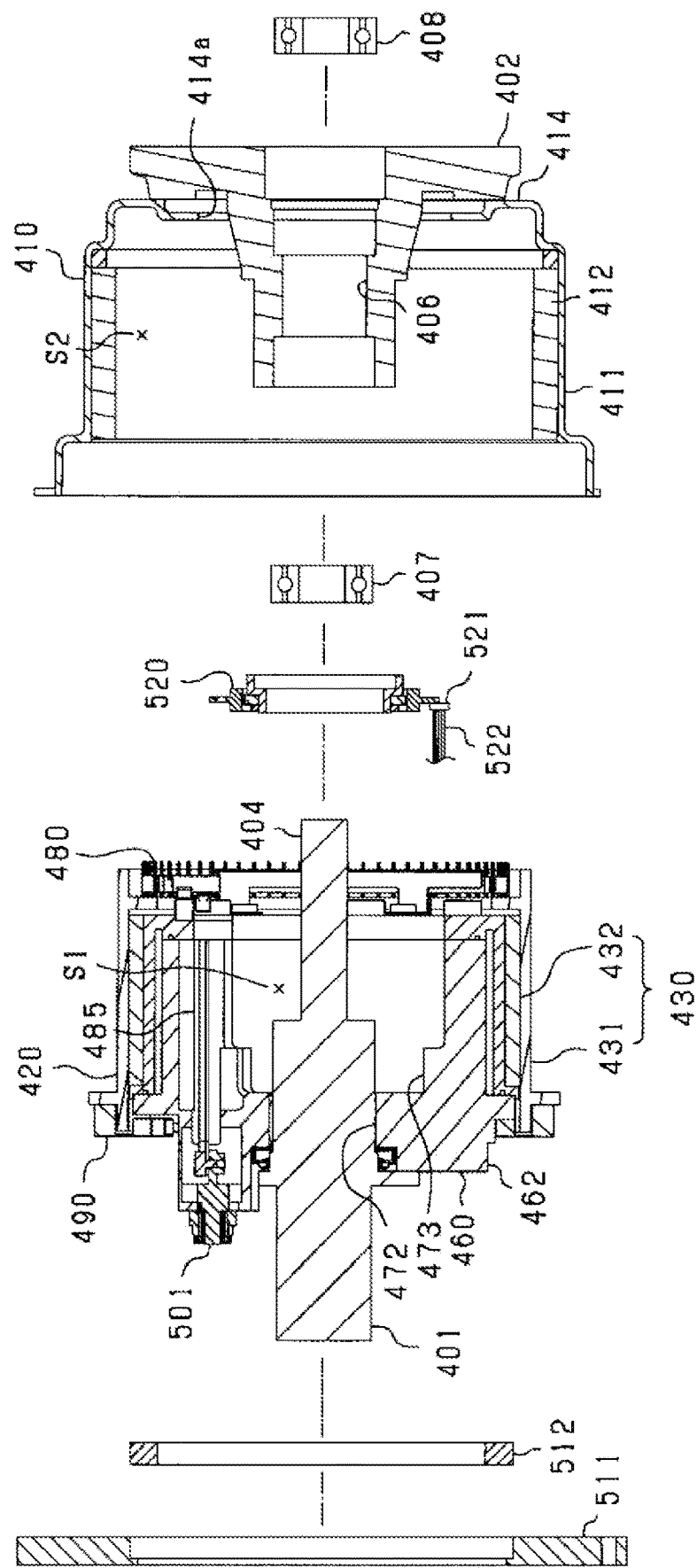
FIG. 58 is an exploded sectional view illustrating the rotary electric machine divided into the stationary portion and a rotary portion.

Next, the overall configuration of the rotary electric machine 400 including the rotor 410 and the stator unit 420 described above will be described with reference to FIGS. 43 and 58. FIG. 58 is an exploded sectional view of the rotary electric machine 400 in a state where the spindle 401 and the stator unit 420 are integrated as a stationary object and the hub 402 and the rotor 410 are integrated as a rotary object.

The spindle 401 is assembled to the stator unit 420 while being inserted through the through-hole 472 of the stator holder 460. Specifically, the stationary shaft 404 of the spindle 401 is inserted through the through-hole 472 of the stator holder 460. In this state, the spindle 401 is joined to the stator holder 460 by a spline, and the spindle 401 is fixed to the end plate portion 471 of the inner cylinder member 462 by using a fixing tool such as a bolt. On the other hand, the hub 402 is fixed to the rotor 410. Specifically, the hub 402 is inserted through a through-hole 414a of the rotor carrier 411, and in this state, the hub 402 is fixed to the end plate portion 414 by using a fixing tool such as a bolt.

While the stationary shaft 404 of the spindle 401 is inserted through the insertion hole 406 of the hub 402, the stator unit 420 and the rotor 410 are respectively disposed at positions on the inner side and the outer side in the radial direction with respect to each other. Here, as illustrated in FIG. 58, an annular space S1 is formed around the stationary shaft 404 of the spindle 401 in an integrated object of the spindle 401 and the stator unit 420. An annular space S2 is formed around the hub 402 in an integrated object of the hub 402 and the rotor 410. The hub 402 enters the annular space S1 and the stator unit 420 enters the annular space S2, whereby the integrated object of the spindle 401 and the stator unit 420, and the integrated object of the hub 402 and the rotor 410 are assembled to each other.

The bearings 407 and 408 are assembled between the stationary shaft 404 of the spindle 401 and the hub 402, and the hub 402 is rotatably supported by the bearings 407 and 408. That is, the hub 402 and the rotor 410 are rotatably supported with respect to the spindle 401 and the stator unit 420 by using the bearings 407 and 408. In the bearings 407 and 408, the inner race is assembled to the stationary shaft 404 side, and the outer race is assembled to the hub 402 side.

While the integrated object of the spindle 401 and the stator unit 420, and the integrated object of the hub 402 and the rotor 410 are assembled to each other, a rotor cover 511 is fixed to the open end side of the rotor 410, that is, the opposite side of the hub 402 in the axial direction (the opposite side of the end plate portion 414 of the rotor carrier 411). The rotor cover 511 has an annular plate shape. The rotor cover 511 is fixed to the rotor carrier 411 by using a fixing tool such as a bolt, with a bearing 512 interposed between the rotor cover 511 and the inner cylinder member 462.

While the integrated object of the spindle 401 and the stator unit 420, and the integrated object of the hub 402 and the rotor 410 are assembled to each other, an annular closed space SA closed in the axial direction and the radial direction is formed on the inner peripheral side of the stator unit 420. A resolver 520 as a rotation sensor is provided in the closed space SA. The resolver 520 has an annular shape, and includes a resolver stator fixed to the inner cylinder member 462 of the stator unit 420 on the stationary object side, and a resolver rotor fixed to the hub 402 on the rotary object side. The resolver rotor is disposed on the inner side of the resolver stator in the radial direction so as to face the resolver stator.

In the present embodiment, as described above, the plurality of protrusions 473 is provided at predetermined intervals in the circumferential direction on the inner peripheral side of the inner cylinder member 462 in the stator holder 460 (see FIG. 56). The resolver 520 (resolver stator) is attached to the end surface in the axial direction of the protrusion 473 of the inner cylinder member 462.

As illustrated in FIG. 44, the resolver 520 includes a terminal 521 in part of the resolver 520 in the circumferential direction, and the resolver signal line 522 is connected to the terminal 521. As illustrated in FIGS. 42 and 43, the resolver signal line 522 is guided to the outside of the rotary electric machine (the end of the rotary electric machine 400 in the axial direction) through the insertion hole 476 provided in the end plate portion 471 of the inner cylinder member 462. The insertion hole 476 is preferably sealed with a sealing member such as a grommet. A signal line terminal connected to the resolver signal line 522 may be provided on the end surface of inner cylinder member 462 in the axial direction.

In the rotary electric machine 400 according to the present embodiment, the power line 485 of each phase and the resolver signal line 522 are provided in the closed space SA on the inner side of the stator unit 420 in the radial direction so as to extend in the axial direction. A blocking portion that shields an electromagnetic field generated by the power line 485 is provided between the power line 485 and the resolver signal line 522. The configuration will be specifically described below.

In the present embodiment, the protrusion 473 is provided on the inner peripheral side of the inner cylinder member 462 as a fixing portion for fixing the resolver 520, and the protrusion 473 is a "blocking portion". Specifically, as illustrated in FIG. 43, the protrusion 473 is provided to extend in the axial direction in a range from one end of the inner cylinder member 462 in the axial direction to the intermediate position in the axial direction. The resolver 520 is fixed to the end surface of the protrusion 473 in the axial direction, and the resolver signal line 522 is provided on the opposite side of the hub in the axial direction along the protrusion 473. In other words, on the inner peripheral side of the inner cylinder member 462 (the hollow portion of the stator holder 460), the protrusion 473 is provided not over the entire range in the axial direction of the inner cylinder member 462 but over a range (partial range) up to the intermediate position where the resolver 520 is provided. The resolver signal line 522 is provided while extending in the axial direction along the protrusion 473 and being inserted through the insertion hole 476 (see FIG. 56).

The power line 485 is provided on the inner peripheral side of the inner cylinder member 462 so as to extend from one end side to the other end side in the axial direction. As illustrated in FIG. 45, two protrusions 473 are provided between the power line 485 and the resolver signal line 522.

The spindle 401 as a shaft body is disposed on the inner peripheral side of the inner cylinder member 462, and the protrusion 473 is formed to protrude toward the stationary shaft 404 of the spindle 401. Therefore, on the inner peripheral side of the inner cylinder member 462, the protrusions 473 are provided on both sides of the resolver signal line 522 in the circumferential direction, and the stationary shaft 404 of the spindle 401 is provided on the inner side of the resolver signal line 522 in the radial direction. In this case, the protrusion 473 and the spindle 401 (more specifically, the stationary shaft 404) form a "blocking portion".

On the inner peripheral side of the inner cylinder member 462, the protrusion 473 is provided only in a range from one end in the axial direction to the intermediate position in the axial direction of the inner cylinder member 462. In a range in which the protrusion 473 is not provided in the axial direction, that is, in a range from the intermediate position in the axial direction to the other end in the axial direction, the extending end of the hub 402, which is a rotary object, is received. In this case, on the inner peripheral side of the inner cylinder member 462, the extending end of the hub 402 is received in a region where the protrusion 473 is not provided, and the hub 402 is rotatably supported by the bearings 407 and 408.

Figure 60:
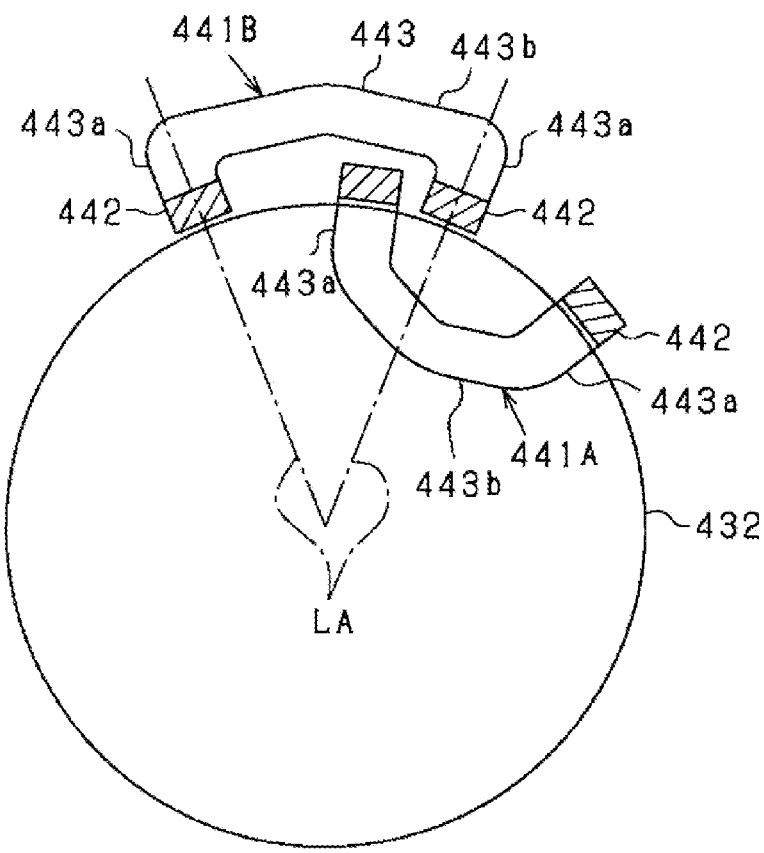
FIG. 60 is a schematic view illustrating a state where the winding segments are disposed on the outer side of a stator core in the radial direction.
Figure 61:
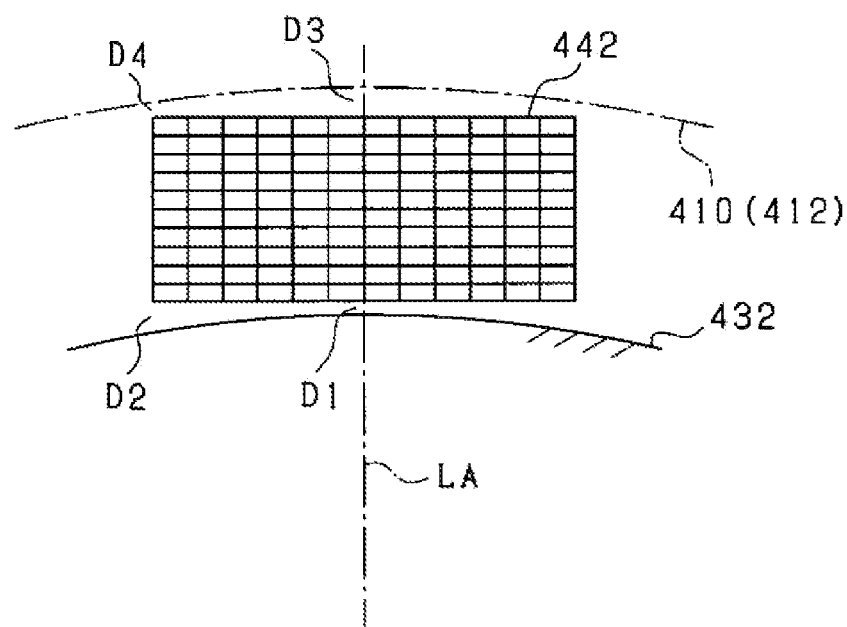
FIG. 61 is an enlarged transverse sectional view of an intermediate conductor portion.

Further, in the present embodiment, the rotary electric machine 400 including the stator 430 having a tooth-less structure has a configuration for appropriately performing heat dissipation in the stator 430. The configuration will be specifically described below. FIG. 60 is a schematic view illustrating a state where one winding segment 441A and one winding segment 441B are disposed on the outer side of the stator core 432 in the radial direction. FIG. 61 is an enlarged transverse sectional view illustrating one of the intermediate conductor portions 442 in the winding segment 441. In FIG. 60, for convenience of explanation, the number of poles and the number of the winding segments 441 in the rotary electric machine 400 are changed from the above-described configuration. The number of magnetic poles is set to be eight and the number of the winding segments 441 is set to be 12.

As illustrated in FIG. 60, in the winding segment 441A, a pair of intermediate conductor portions 442 provided at an interval of full pitch winding in the circumferential direction is coupled by the link portion 443 bent inward in the radial direction. On the other hand, in the winding segment 441B, the pair of intermediate conductor portions 442 provided at an interval of full pitch winding in the same manner is coupled by the link portion 443 bent outward in the radial direction. In FIG. 60, the winding segments 441A and 441B are winding segments of different phases, and for example, the winding segment 441A is a U-phase coil, and the winding segment 441B is a V-phase coil.

As illustrated in FIG. 61, the transverse section of the intermediate conductor portion 442 has a rectangular shape. Specifically, in the intermediate conductor portion 442, the conductive wire members each having a rectangular section are arranged in a plurality of rows in each of the radial direction and the circumferential direction, and the transverse section has a rectangular shape as a whole. The conductive wire member is a square wire, and is particularly preferably a flat square wire having a long side and a short side. The configuration of the intermediate conductor portion 442 is the same or similar in both the winding segments 441A and 441B. The intermediate conductor portion 442 has a flat section in which the thickness dimension in the radial direction is smaller than the width dimension in the circumferential direction. That is, the intermediate conductor portion 442 has a flat shape that is thin in the radial direction. With this configuration, the thickness of the intermediate conductor portion 442 in the radial direction is reduced, making it possible to increase the magnetic flux density and enhance the torque in the stator 430 having a tooth-less structure.

Here, in the intermediate conductor portion 442, two end surfaces in the radial direction facing each other in the radial direction are flat surfaces, whereas the outer peripheral surface of the stator core 432 is a curved surface. Therefore, in the end surfaces of the intermediate conductor portion 442 in the radial direction on the stator core 432 side, the dimensions from the respective end surfaces to the stator core 432 in the radial direction are different in the circumferential direction. In particular, the end surface in the radial direction of each intermediate conductor portion 442 is in a direction orthogonal to a straight line LA passing through the center position of the intermediate conductor portion 442 in the circumferential direction and the axial center of the rotary electric machine 400. Further, D1<D2 is satisfied, where D1 represents a dimension in the radial direction between the intermediate conductor portion 442 and the stator core 432 at the central portion in the circumferential direction, and D2 represents a dimension in the radial direction between the intermediate conductor portion 442 and the stator core 432 at both ends in the circumferential direction.

In this case, a heat dissipation portion that releases the heat generated in the winding segment 441 can be secured between the intermediate conductor portion 442 and the stator core 432. That is, the end surface of the intermediate conductor portion 442 in the radial direction has a portion close to the stator core 432 and a portion far from the stator core 432. In particular, in a portion where the end surface of the intermediate conductor portion 442 in the radial direction and the stator core 432 are separated from each other, the passage amount of the coolant such as air is increased, whereby the winding segments 441 can be suitably cooled.

In FIG. 61, the gap extending in the circumferential direction is illustrated between the intermediate conductor portion 442 and the stator core 432. However, when a conductor insulating portion such as the insulating jacket 445 is provided around the intermediate conductor portion 442, the intermediate conductor portion 442 conceivably comes into contact with the stator core 432 via the conductor insulating portion. However, also in this case, a local heat dissipation portion is secured between the end surface of the intermediate conductor portion 442 in the radial direction and the stator core 432 on both end sides of the intermediate conductor portion 442 in the circumferential direction.

In the relationship between the intermediate conductor portion 442 and the magnet unit 412 (magnet 415) of the rotor 410, D3>D4 is satisfied, where D3 represents a dimension in the radial direction between the intermediate conductor portion 442 and the magnet unit 412 at the central portion in the circumferential direction, and D4 represents a dimension in the radial direction between the intermediate conductor portion 442 and the magnet unit 412 at both ends in the circumferential direction. In this case, the air gap (mechanical separation distance between the intermediate conductor portion 442 and the magnet 415) is larger at the center of the intermediate conductor portion 442 in the circumferential direction than at both ends of the intermediate conductor portion 442 in the circumferential direction. Thus, a measure against local demagnetization occurring in the magnet 415 can be taken.

Figure 62:
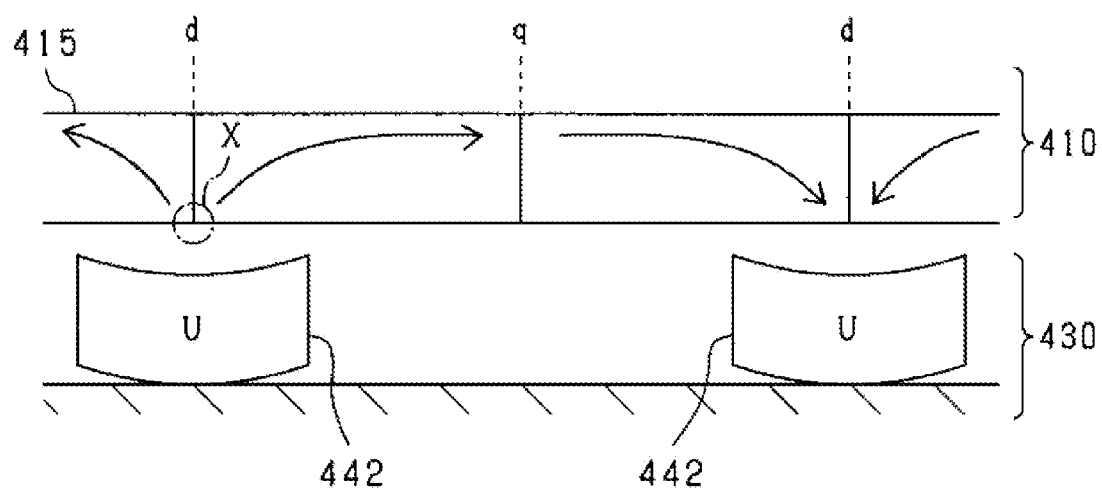
FIG. 62 is a schematic view illustrating the rotor and the stator in a planarly developed manner.

Supplementary description for the above will be made with reference to FIG. 62. In FIG. 62, the rotor 410 and the stator 430 are illustrated in a planarly developed manner for convenience of description. As described above, the magnetic path having an arc shape or a shape close to an arc is formed in the magnet 415. In FIG. 62, a corner portion (an X portion in the drawing) on the stator winding 431 side is a portion where demagnetization is most likely to occur in the magnet 415. In this respect, the intermediate conductor portion 442 is formed as an assembly of a plurality of conductive wire members, and has a larger air gap at the center portion in the circumferential direction than at both ends in the circumferential direction. Thus, the magnetic flux density at the center portion in the circumferential direction is lower than that in a case where the air gap is uniform in the circumferential direction. Therefore, the demagnetization of the magnet 415 with respect to the X portion can be reduced.

In each of the winding segments 441A and 441B having the above-described configuration, contrivance of the shape is required for the link portion 443 protruding inward and outward in the radial direction from the pair of intermediate conductor portions 442. In this case, first, focus is placed on the shape of the link portion 443 bent outward in the radial direction (the link portion 443 of the winding segment 441B). As illustrated in FIG. 60, of a pair of base end portions 443a extending in the radial direction and a connecting portion 443b extending in the circumferential direction between the pair of base end portions 443a, the distance in the circumferential direction between both ends of the connecting portion 443b is preferably larger than the distance in the circumferential direction between the pair of intermediate conductor portions 442. Second, in the link portion 443 bent inward in the radial direction (the link portion 443 of the winding segment 441A), the distance in the circumferential direction between both ends of the connecting portion 443b is preferably made smaller than the distance in the circumferential direction between the pair of intermediate conductor portions 442. In the link portion 443, by curving the connecting portion 443b extending in the circumferential direction, the curved portion serves as an interval adjusting portion that adjusts an interval between the extending end of the pair of base end portions 443a.

Next, a method for manufacturing the winding segments 441A and 441B having the above-described configuration will be described. In manufacturing the winding segments 441A and 441B, first, as illustrated in (a) of FIG. 63, a conductive wire member is wound in a vertically long annular shape to produce an air core coil having an I shape in a side view. In the air core coil, both ends in the axial direction are provided in a symmetrical shape, and both have the same size and the same shape.

Thereafter, as illustrated in (b) of FIG. 63, one end of the air core coil in the axial direction is bent in the radial direction. At this time, in the air core coil, the portion corresponding to the pair of intermediate conductor portions 442 and the portion corresponding to the link portion 443 are individually held by jigs or the like. In this state, one end side in the axial direction may be bent to have an angle of about 90 degrees.

In a state where one end side in the axial direction of the air core coil is bent, a transverse section at an intermediate position in the axial direction is as shown in (c) of FIG. 63. In this state, the end surfaces in the radial direction (upper and lower end surfaces in the drawing) of the pair of intermediate conductor portions 442 are located on the same plane.

Thereafter, as illustrated in (d) of FIG. 63, the direction of the end surface of each intermediate conductor portion 442 in the radial direction is adjusted. At the same time, the link portion 443 is formed by adjusting the curved shape on one end side in the axial direction using a jig J for adjusting the angle of each intermediate conductor portion 442. The jig J has a pair of contact surfaces Ja and Jb with which the end surfaces of the intermediate conductor portions 442 in the radial direction are brought into contact. The curved shape of the link portion 443 is adjusted while the end surfaces of the intermediate conductor portion 442 in the radial direction are brought into contact with the contact surfaces Ja and Jb, respectively. Each of the contact surfaces Ja and Jb is a flat surface. By this operation, the direction of the end surface of each intermediate conductor portion 442 in the radial direction is adjusted to the direction orthogonal to the straight line LA while the interval of the pair of intermediate conductor portions 442 in the circumferential direction is maintained constant. At this time, the transverse section of the intermediate conductor portion 442 is maintained in a rectangular shape. (d) of FIG. 63 illustrates a configuration in which the link portion 443 is bent outward in the radial direction. In the link portion 443 having such a configuration, the connecting portion 443b between the pair of base end portion 443a is deformed such that the distance in the circumferential direction between both ends thereof is greater than the distance in the circumferential direction between the pair of intermediate conductor portions 442.

An angle θ formed by the pair of contact surfaces Ja and Jb in the jig J may correspond to the diameter (core diameter) of the stator core 432. The angle θ is preferably increased if the core diameter is large. The angle θ is preferably decreased if the core diameter is small. When the link portion 443 is bent outward in the radial direction, the angle θ is θ<180°.

When the link portion 443 is bent inward in the radial direction, as illustrated in (e) of FIG. 63, the angle θ formed by the pair of contact surfaces Ja and Jb in the jig J is preferably set to θ>180°. By the formation using the jig J, the connecting portion 443b between the pair of base end portions 443a in the link portion 443 is deformed such that the distance in the circumferential direction between both ends thereof is smaller than the distance in the circumferential direction between the pair of intermediate conductor portions 442. In this case, since the length of the connecting portion 443b is excessive in the link portion 443, the central portion of the connecting portion 443b may be deformed so as to protrude inward in the radial direction.

Figure 64:
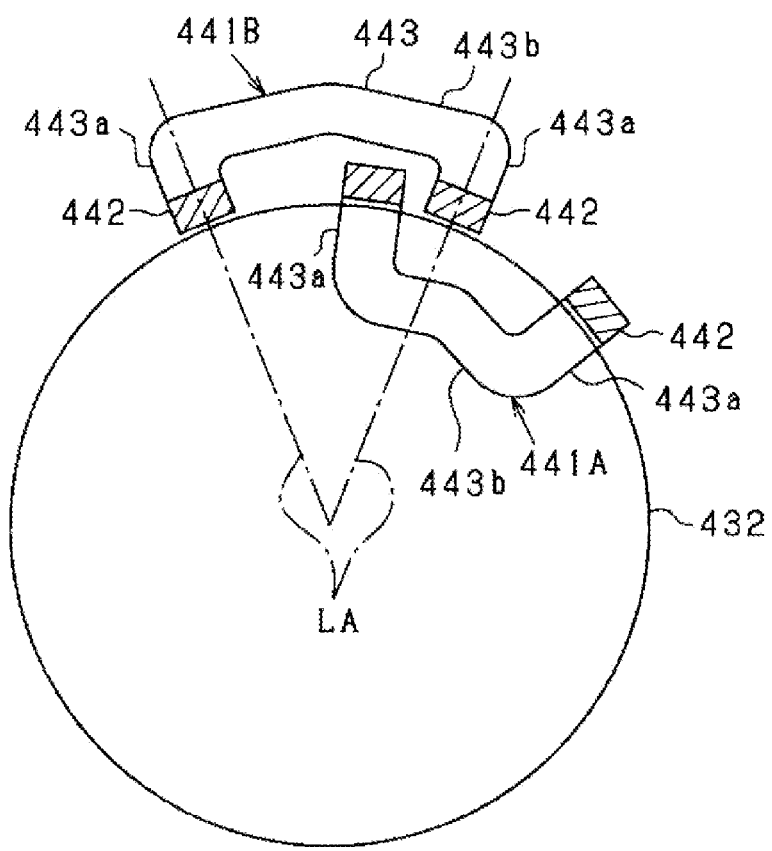
FIG. 64 is a schematic view illustrating a state where the winding segments are disposed on the outer side of the stator core in the radial direction.

In the winding segment 441A (corresponding to the "inner bent winding") in which the link portion 443 is bent inward in the radial direction, the link portion 443 may be formed as illustrated in FIG. 64. In FIG. 64, in the winding segment 441A, the central portion of the connecting portion 443b is curved so as to protrude outward in the radial direction. In this case, with the curved shape of the connecting portion 443b, the amount of protruding toward the inner side of the link portion 443 in the radial direction can be reduced. In the winding segment 441A, the central portion of the connecting portion 443b may be curved so as to protrude inward or outward in the axial direction.

In the configuration in which the plurality of winding segments 441 is used in the stator winding 431 as described above, the core diameter is changed in accordance with the number of magnetic poles of the rotor 410, and the winding segments 441 whose number corresponds to the number of magnetic poles are used. For example, in the configuration of FIG. 48 and the like described above, the number of magnetic poles is 24 and the number of the winding segments 441 is 36. However, in addition to this, the following configuration can be adopted: a configuration in which the number of magnetic poles is four and the number of the winding segments 441 is six as illustrated in (a) of FIG. 65; and a configuration in which the number of magnetic poles is eight and the number of the winding segments 441 is 12 as illustrated in (b) of FIG. 65. In this case, assuming that the outer diameter of the stator winding 431 in the four-pole rotary electric machine is φ, an outer diameter φ2 of the stator winding 431 in the eight-pole rotary electric machine is "φ1×2". Assuming that the number of magnetic poles of the rotary electric machine is "4×n" (n is a natural number), the outer diameter of the stator winding 431 can be generalized as "φ1×n".

Further, the discloser of the present application has been found that, in the surface permanent magnetic three-phase rotary electric machine having a tooth-less structure, there is an optimum range of the diameter of the stator winding 431 in optimizing the torque for each number of magnetic poles (the number of the winding segments 441). That is, when the number of magnetic poles of the rotary electric machine is 4n and the number of the winding segments 441 is 6n (n is a natural number), the diameter of the stator windings 431 is set to "φ40 mm to φ100 mm"×n, whereby an increase in the maximum torque in the rotary electric machine can be expected. When the number of magnetic poles is four as illustrated in (a) of FIG. 65, the diameter of the stator winding 431 is preferably "φ40 mm to φ100 mm". When the number of magnetic poles is eight as illustrated in (b) of FIG. 65, the diameter of the stator winding 431 is preferably "φ80 mm to φ200 mm".

In this case, for example, assuming that the diameter of the stator winding 431 is φ80 in a four-pole rotary electric machine, the circumferential length of the stator winding 431 is about 240 mm, and the entire circumference of the magnet portion in the magnet unit 412 is about 240 mm although being greater than the circumferential length of the coil. Therefore, the width in the circumferential direction of the magnet for one pole is preferably about 60 mm. The thickness of the magnet in the radial direction is preferably about 30 mm, for example.

Here, when the width in the circumferential direction of the magnet 415 for one pole is defined as W, and the gap dimension that is the distance in the radial direction between the magnet 415 and the stator core 432 is defined as Lg, "W/Lg" and the torque constant indicating the torque per turn in the rotary electric machine 400, have the relationship illustrated in FIG. 66. Here, a sintered neodymium magnet is used as the magnet 415, and the thickness of the magnet is ½ of the pole pitch (width of magnet). The width W of the magnet is an effective width of a magnet, and a gap dimension Lg is a dimension in the radial direction of a portion where magnetic permeability is about air between the rotor 410 and the stator 430.

In FIG. 66, the torque constant increases as "W/Lg" increases. Specifically, the slope of the increase in the torque constant with respect to the increase in "W/Lg" varies depending on the magnitude of "W/Lg". The correlation between "W/Lg" and the torque constant has a point of inflection. In this case, magnetic loading and electric loading can be balanced well by determining "W/Lg" within the range A at or near the point of inflection. That is, in a case where "W/Lg" is smaller than the range A, there is a concern over decrease in torque due to a too low magnetic loading, but in a case where "W/Lg" is greater than the range A, an increase in the torque constant cannot be expected even if "W/Lg" is increased. Therefore, the appropriate range of "W/Lg" is set to at or near the point of inflection, specifically, "W/Lg=2.5 to 7".

In the configuration of the motor as in the present embodiment, such a situation occurs stemming from factors including: a decreased permeance coefficient Pc of the magnet in accordance with the increased Lg (airgap of magnetic circuit) with respect to the magnet; and the increased winding space in inverse proportion to Lg. There has been a known fact that the permeance coefficient Pc is a value having an inverse proportional relationship in which Lg decreases in proportion to increase when a magnet is determined. An equation of the effective magnetic flux density Bd based on the permeance coefficient Pc is as follows.

$$Bd=Br/(1+(1/Pc))$$

As can be seen from this equation, the value of the denominator, that is, the devisor in the equation with respect to the remanent flux density Br gradually approaches 1 as the permeance coefficient Pc increases. In other words, what can be seen is that the higher permeance coefficient Pc is more advantageous for the effective magnetic flux density and the torque constant per turn of the winding. For this reason, in conventional coreless motors such as a tooth-less motor, it is common to use a thin coil by decreasing Lg. However, the present application discloses that a coil having a value of "W/Lg=2.5 to 7" as a coil thickness is, indeed, advantageous for increasing torque. This conclusion is opposite to the argument that a thin coil is generally excellent within a range in which a general conductor such as copper, carbon nanotube (CNT), or aluminum wire is used.

Here, when the value becomes less than the lower limit value of 2.5, a phenomenon occurs in which the motor torque drops due to the too thick coil, as in general. In the disclosure of the present application, this value is determined based on the premise that a magnet having a large BHmax such as Br=1 [T] or more and iHc=400 [kA/m] or more is made to have a coercive force higher than that of a conventionally mass-produced sintered magnet by contriving an orientation angle. As a result, the lower limit value of W/Lg can be extended to 2.5, so that a high torque motor that is distinct from a conventional motor can be implemented. Therefore, a particularly large effect is obtained by using the dimensional relationship of the magnetic circuit according to the disclosure of the present application. This effect is exhibited particularly for a sintered neodymium magnet, a sintered samarium magnet, an Fe—Ni magnet having an L10 structure, or a magnet to be developed in the future and having performance equivalent to the aforementioned magnets combined with orientation contrivances.

Figure 67:
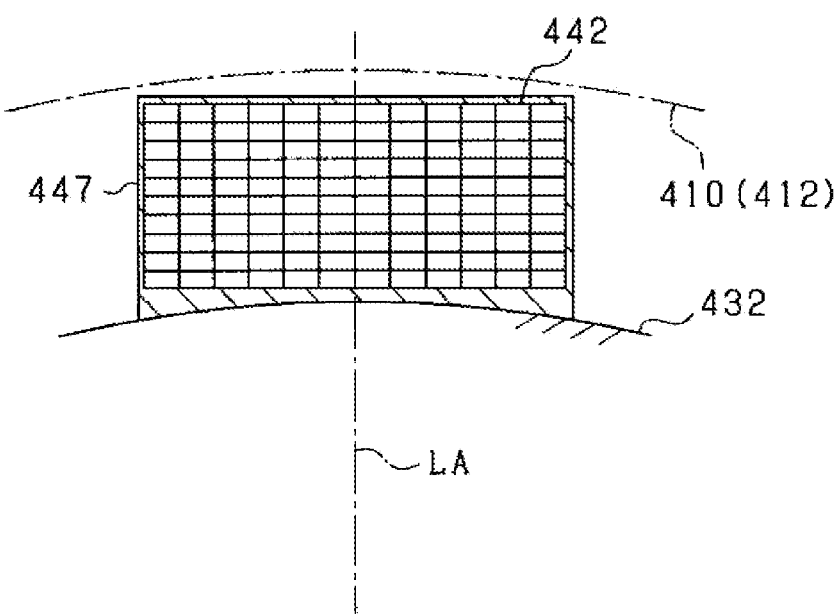
FIG. 67 is an enlarged transverse sectional view of the intermediate conductor portion.

As illustrated in FIG. 67, a sealing member 447 having an insulation property may be interposed between the end surface of each intermediate conductor portion 442 in the radial direction and the stator core 432. The sealing member 447 is, for example, a synthetic resin. The thermal conductivity of the sealing member 447 is preferably higher than the thermal conductivity of the insulating film of the conductive wire member. In this case, heat can be dissipated through the sealing member 447, and the intermediate conductor portion 442 can be fixed by the sealing member 447.

According to the present embodiment described in detail above, the following excellent effects can be obtained.

In the rotary electric machine 400, the stator 430 has a tooth-less structure, and the plurality of winding segments 441 constituting the stator winding 431 are disposed side by side in the circumferential direction along the outer peripheral surface of the stator core 432. In addition, the transverse section of the intermediate conductor portion 442 is rectangular, and the dimensions in the radial direction between the intermediate conductor portion 442 and the stator core 432 are different in the circumferential direction at the end surface in the radial direction on the stator core 432 side. With this configuration, heat dissipating ability required for the rotary electric machine 400 can be improved. That is, in the above-described configuration, the dimensions in the radial direction between the intermediate conductor portion 442 and the stator core 432 are different in the circumferential direction. In other words, the end surface of the intermediate conductor portion 442 in the radial direction includes a portion close to the stator core 432 and a portion far from the stator core 432. In this case, the winding segments 441 can be assembled in a state of being close to the stator core 432 that is the back yoke in the stator 430 having a tooth-less structure. At the same time, a heat dissipation portion that dissipates heat generated in the winding segments 441 between the intermediate conductor portion 442 and the stator core 432 can be secured. As a result, in the rotary electric machine 400 including the stator 430 having a tooth-less structure, heat dissipation in the stator 430 can be appropriately performed.

Here, consideration is made to the configuration in which the intermediate conductor portion 442 having a rectangular transverse section is disposed on the curved surface of the stator core 432. If the sizes of the winding segments 441 are equal to each other, the smaller the radius (core radius) of the curved surface of the stator core 432, in other words, the larger the curvature of the curved surface, the larger the difference in dimension in the radial direction between the intermediate conductor portion 442 and the stator core 432 (the difference in dimension in the radial direction between the central portion in the circumferential direction and both ends in the circumferential direction). For example, in a rotary electric machine in which the core radius of the stator 430 is small and the number of magnetic poles is small, that is, in a rotary electric machine in which the number of the winding segments 441 is small, a difference in dimension in the radial direction between the intermediate conductor portion 442 and the stator core 432 becomes significant. In this case, the stator 430 having a small core radius is considered to have a smaller heat capacity than the stator 430 having a large core radius. However, the difference in dimension in the radial direction between the intermediate conductor portion 442 and the stator core 432 is increased, so that heat dissipation can be improved.

In each intermediate conductor portion 442, the end surface in the radial direction on the stator core 432 side is set to a direction orthogonal to the straight line LA passing through the center position of the intermediate conductor portion 442 in the circumferential direction and the axial center of the rotary electric machine 400. The dimensions in the radial direction with respect to the stator core 432 are different at the end surface in the radial direction between the central portion in the circumferential direction and both ends in the circumferential direction. In this case, in the stator winding 431, the intermediate conductor portions 442 arranged along the curved surface of the stator core 432 can be disposed in the same state with respect to the stator core 432.

The sealing member 447 having an insulation property is interposed between the end surface on the inner side in the radial direction of each intermediate conductor portion 442 and the stator core 432. With this arrangement, heat can be dissipated through the sealing member 447 and the intermediate conductor portion 442 can be fixed by using the sealing member 447. In this case, since the thermal conductivity of the sealing member 447 is made higher than the thermal conductivity of the insulating film of the conductive wire member, the heat dissipating ability of each winding segment 441 is improved.

In the configuration including the winding segment 441A (inner bent winding) in which the link portion 443 is bent inward in the radial direction as the winding segment 441, when the winding segments 441A are adjacent to each other in the circumferential direction, interference between the link portions 443 of the respective winding segments 441A is considered to easily occur. In this regard, in the link portion 443 of the winding segment 441A, the connecting portion 443b extending in the circumferential direction between the pair of base end portions 443a is curved such that the central portion thereof protrudes outward in the radial direction or protrudes in the axial direction. With this configuration, the link portions 443 of the respective winding segments 441A can be prevented from interfering with each other in the circumferential direction. In addition, the connecting portion 443b extending in the circumferential direction is curved in the link portion 443. The curved portion serves as an interval adjusting portion that adjusts an interval between the extending ends of the pair of base end portions 443a. Thus, the curved portion contributes to preventing the link portions 443 in the circumferential direction from interfering with each other. In this case, in particular, since the connecting portion 443b is curved so as to protrude outward in the radial direction or protrude in the axial direction, an available space on the inner side of the stator 430 in the radial direction can be expanded. Further, interference with the rotating shaft or the like of the rotary electric machine 400 can be prevented by reducing the amount of protrusion toward the inner side in the radial direction.

In the three-phase stator winding 431, one intermediate conductor portion 442 for each of the winding segments 441 of the other two phases is disposed between the pair of intermediate conductor portions 442 in the winding segment 441. The link portion 443 of one winding segment 441 are bent in the radial direction between the winding segments 441 in which the link portions 443 and 444 overlap each other in the circumferential direction. With this configuration, the intermediate conductor portions 442 can be disposed side by side in the circumferential direction along the circumferential surface of the stator core 432 while avoiding mutual interference of the winding segments 441. In view of the configuration in which the link portion 443 is bent in the radial direction, the winding segments 441 are respectively fixed to the stator core 432 and the coil end cover 490 by the protrusions 455a and 457a of the brackets 455 and 457 on the inner side of the curved portion of the link portion 443. With this configuration, the winding segments 441 can be suitably fixed in the stator 430 having a tooth-less structure.

In the surface permanent magnetic rotary electric machine 400, magnets whose number corresponds to the number of poles are disposed side by side in the circumferential direction in the rotor 410. The specification of the magnet for each magnetic pole is determined in accordance with the diameter (coil diameter) of the stator winding 431 and the number of poles. In this case, if the coil diameter with respect to the number of poles is too small, the width of the magnet in the circumferential direction becomes small at each magnetic pole, and there is a concern over a decrease in magnetic loading. On the other hand, if the coil diameter is too large with respect to the number of poles, the width of the magnet in the circumferential direction increases, the magnetic loading can be expected to increase, but the electric loading cannot be expected to increase so much. Therefore, there is a concern that the torque enhancement effect commensurate with the increase in size of the rotary electric machine 400 cannot be expected.

In this regard, the discloser of the present application has found that there is an appropriate range of the coil diameter with respect to the number of poles in order to strike a balance between magnetic loading and electric loading. The discloser of the present application sets the diameter of the stator windings 431 to be "φ40 mm to φ100 mm"×n when the number of magnetic poles is 4n and the number of the winding segments 441 is 6n in the rotary electric machine 400. As a result, the torque in the rotary electric machine 400 can be optimized.

In the surface permanent magnetic tooth-less rotary electric machine, "W/Lg" has a correlation with the torque constant [Nm/A] per turn of the stator winding 431 (see FIG. 66). "W/Lg" is the ratio of the width W in the circumferential direction of the magnet for one pole to the distance Lg in the radial direction between the magnet and the stator core 432. In view of this, the configuration of "W/Lg=2.5 to 7" is adopted, whereby optimization of the torque in the rotary electric machine 400 can be achieved.

In the magnet of the rotor 410, the following configurations are adopted. The direction of the easy axis of magnetization is oriented so as to be in parallel to the d-axis serving as the center of the magnetic pole on a side of the d-axis as compared with that on a side of the q-axis serving as the boundary of the magnetic pole. Alternatively, the direction of the easy axis of magnetization is inclined with respect to a pair of acting surfaces facing each other and serving as inflow and outflow surfaces of the magnetic flux as well as with respect to the d-axis so as to approach the d-axis on the stator winding 431 side. In this case, the magnetic flux at each magnetic pole can be strengthened, but there is a concern over an increase in the eddy-current loss. However, the stator winding 431 is formed using the winding segment 441 formed by multiply winding conductive wire members, whereby the eddy-current loss can be reduced. In the winding segment 441, when the conductive wire member includes a twisted wire in which a plurality of wires are twisted, a further eddy current reduction effect can be obtained.

Both the winding segments 441A and 441B can be manufactured by using air core coils having the same shape. The winding segment 441A in which the link portion 443 is bent inward in the radial direction and the winding segment 441B in which the link portion 443 is bent outward in the radial direction can be manufactured by separately using different jigs. Further, the rotary electric machines can be easily manufactured by changing the type of jig even when the rotary electric machine has the different number of poles. As a result, components can be shared.

Third Embodiment

Figure 68:
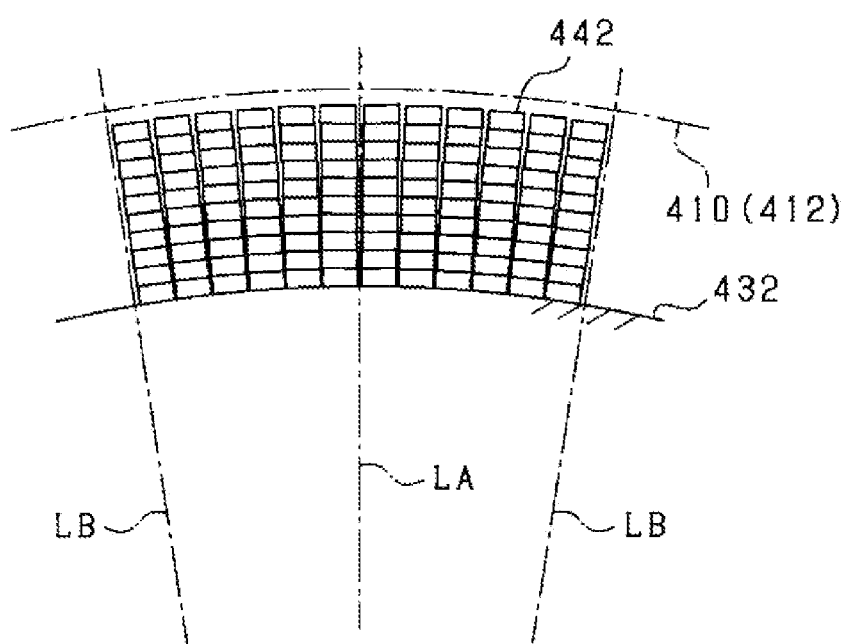
FIG. 68 is an enlarged transverse sectional view of the intermediate conductor portion.

In the present embodiment, the configuration illustrated in FIG. 68 is used as a configuration for appropriately dissipating heat in the stator 430. FIG. 68 is an enlarged transverse sectional view illustrating one of the intermediate conductor portions 442 in the winding segment 441. In the present embodiment, the configuration other than the intermediate conductor portion 442 is preferably the same as that of the second embodiment.

In FIG. 68, in the intermediate conductor portion 442, a plurality of conductive wire members are arranged in each of the radial direction and the circumferential direction, and an interval between the conductive wire members arranged in the circumferential direction is wider on the outer side in the radial direction than on the inner side in the radial direction. On the other hand, the intervals in the radial direction between the conductors are substantially the same. Specifically, in the winding segment 441, the conductive wire member is a square wire having a quadrangular section. The square wires are multiply wound with the side surfaces facing each other in the radial direction and the circumferential direction. The conductive wire member is preferably a flat square wire. In the intermediate conductor portion 442, the side surfaces of the square wires closely face each other in the radial direction, and the side surfaces of the square wires face each other in the circumferential direction more apart than in the radial direction.

In the intermediate conductor portion 442, two surfaces serving as end surfaces in the radial direction (inner and outer end surfaces in the radial direction) are formed to extend in a substantially arc shape. In addition, two surfaces serving as end surfaces in the circumferential direction (end surfaces at both ends in the circumferential direction) are formed so as to extend radially from the axial center of the rotary electric machine 400 and to be substantially parallel to two straight lines LB separated from each other at a predetermined angle. The angle formed by the two straight lines LB varies depending on the number of poles (the number of the winding segments 441) and is preferably "360°×(2/K)" (K is the number of coils).

In the above-described configuration, the circumferential lengths of the stator winding 431 differ between the inner side and the outer side in the radial direction. In view of this, in the intermediate conductor portion 442, the conductive wire members on the inner side in the radial direction are densely arranged in the circumferential direction, whereas the conductive wire members on the outer side in the radial direction are coarsely arranged in the circumferential direction. With this configuration, a heat dissipation portion that releases the heat generated in each winding segment 441 can be secured between the conductive wire members. As a result, in the rotary electric machine 400 including the stator 430 having a tooth-less structure, heat dissipation in the stator 430 can be appropriately performed.

In the above-described configuration, the side surfaces of the square wires closely face each other in the radial direction, and the side surfaces of the square wires face each other in the circumferential direction more apart than in the radial direction. Therefore, the thickness of the intermediate conductor portion 442 in the radial direction is a predetermined thickness in accordance with the number of turns of the square wire (conductive wire member). Further, the widths of the intermediate conductor portion 442 in the circumferential direction differ between the inner side and the outer side in the radial direction in accordance with the separation distance between the square wires. In this case, only the width dimension in the circumferential direction between the inner side and the outer side of the radial direction is adjusted while the thickness in the radial direction of the intermediate conductor portion 442 is constant in the circumferential direction.

The configuration of the intermediate conductor portion 442 is the same or similar in both the winding segments 441A and 441B. The intermediate conductor portion 442 has a flat section in which the thickness dimension in the radial direction is smaller than the width dimension in the circumferential direction. With this configuration, the thickness of the intermediate conductor portion 442 in the radial direction is reduced, making it possible to increase the magnetic flux density and enhance the torque in the stator 430 having a tooth-less structure.

In addition, a sealing member having an insulation property is preferably interposed between the conductive wire members arranged in the radial direction and the circumferential direction in each intermediate conductor portion 442. In this way, heat can be dissipated through the sealing member and the conductive wire member can be fixed by the sealing member. In addition, since the thermal conductivity of the sealing member is made higher than the thermal conductivity of the insulating film of the conductive wire member, the heat dissipating ability of each winding segment is improved.

The winding segment 441 having the above-described configuration may be manufactured by, for example, the following procedure. After the air core coil is formed, the intermediate conductor portion 442 is placed in a die frame 601 illustrated in (a) of FIG. 69. The die frame 601 has a bottom 602 and two walls 603 on both sides of the bottom 602. The bottom 602 has a bottom surface having a curved surface shape protruding inward, and the walls 603 are provided such that an interval therebetween is expanded toward the open end side. The curvature of the bottom surface of the bottom 602 is preferably the same as the curvature of the outer peripheral surface of the stator core 432 to which the winding segments 441 are assembled.

A gap is then formed between the conductive wire members by pressing a pressing jig 605 for gap adjustment against the intermediate conductor portion 442 in the die frame 601. The pressing jig 605 includes a base portion 606 having a curved plate surface and a plurality of comb tooth portions 607 protruding from the concaved surface side in the base portion 606. The plurality of comb tooth portions 607 are thin plate portions provided so as to extend in the same direction as the conductive wire member at intervals each of which is the same as the width in the circumferential direction of one conductive wire member. The comb tooth portions 607 each have a tapered sectional shape (wedge shape) that becomes thinner toward the tip and has a sharply pointed tip. The comb tooth portion 607 is preferably formed of, for example, an elastic metal or resin material.

As illustrated in (b) of FIG. 69, in a state where the pressing jig 605 is pressed against the intermediate conductor portion 442, the comb tooth portion 607 enters between the conductive wire members arranged in the circumferential direction, and the conductive wire members are separated at a distance away from each other in the circumferential direction. Accordingly, the interval between the conductive wire members arranged in the circumferential direction is wider on the outer side in the radial direction than on the inner side in the radial direction. In addition, both end surfaces in the radial direction of the intermediate conductor portion 442 are formed into curved surfaces by the curved surface shape of the bottom surface of the die frame 601 and the curved surface shape of the base portion 606. In addition to being provided at intervals each of which is the same as the width in the circumferential direction of one conductive wire member, the comb tooth portions 607 may be provided at intervals each of which is the same as the width in the circumferential direction of a plurality of conductive wire members (for example, intervals of two conductive wire members).

Thereafter, the pressing jig 605 is removed from the intermediate conductor portion 442, and a sealing member such as a resin material is filled in the gap between the conductive wire members. The end of the air core coil in the axial direction is then bent to form the link portion 443.

The bending of the end of the air core coil in the axial direction may be performed after the formation of the gap of the intermediate conductor portion 442 by using the pressing jig 605 as described above. Alternatively, the bending thereof may be performed before the formation of the gap of the intermediate conductor portion 442 by the pressing jig 605.

Figure 70:
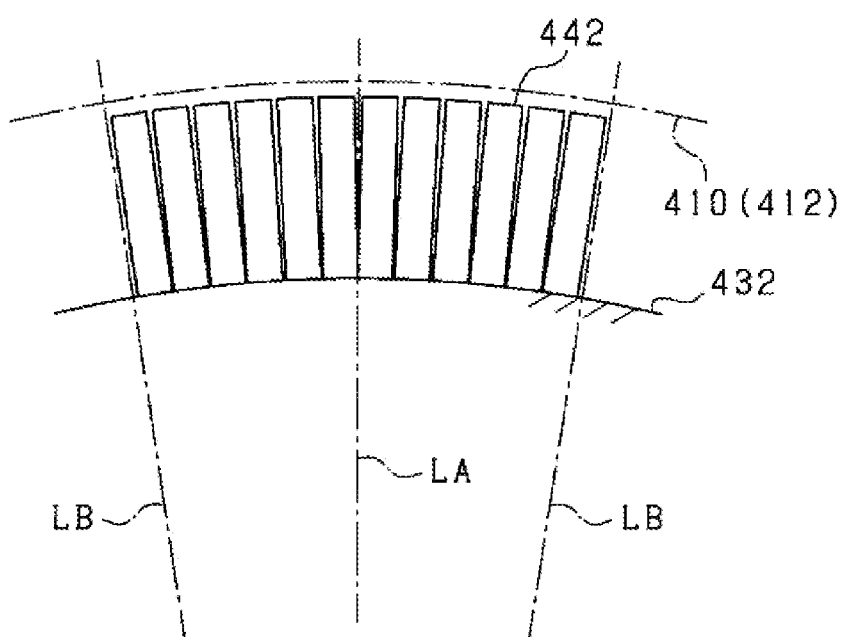
FIG. 70 is an enlarged transverse sectional view of the intermediate conductor portion.

Each of the intermediate conductor portions 442 may have a configuration illustrated in FIG. 70. In the configuration of FIG. 70, a flat square wire is used as the conductive wire member. The longitudinal direction of the section of the conductive wire member is set to the radial direction, and the wide surfaces are disposed to face each other in the circumferential direction. In the intermediate conductor portion 442, the interval between the conductive wire members arranged in the circumferential direction is wider on the outer side in the radial direction than on the inner side in the radial direction.

Modifications of Second and Third Embodiments

The dimensions in the radial direction between the intermediate conductor portion 442 and the stator core 432 are different in the circumferential direction, at the end surface in the radial direction. To such ends, in the above-described embodiments, the dimension in the radial direction between the intermediate conductor portion 442 and the stator core 432 is set to be different between the central portion in the circumferential direction and both ends in the circumferential direction at the end surface in the radial direction. However, this configuration may be changed. For example, in the end surfaces in the radial direction of the intermediate conductor portion 442, the dimension in the radial direction between the stator core 432 and the one end side in the circumferential direction and the other end side in the circumferential direction may be different.

In the above-described embodiments, the air core coil used for manufacturing the winding segments 441A and 441B is provided so that both ends in the axial direction is symmetrically to each other (see (a) of FIG. 63), but this may be changed. For example, in the air core coil, only the end portion in the axial direction to be bent in the radial direction may be wider or narrower than the interval between the portions corresponding to the pair of intermediate conductor portions 442. In this case, the end in the axial direction, which is to be bent outward in the radial direction, is wider than the interval between the pair of intermediate conductor portions 442. In addition, the end in the axial direction, which is to be bent inward in the radial direction, is narrower than the interval between the pair of intermediate conductor portions 442. As for the winding segments 441A and 441B, the air core coil for the winding segment 441A and the air core coil for the winding segment 441B may be separately produced.

In the stator winding 431 of the above-described embodiments, the winding segments 441A and 441B having a substantially L shape in a side view are used (see FIGS. 51 to 54), but this may be changed. For example, as illustrated in (a) and (b) of FIG. 71, a winding segment 441C having a substantially C shape in a side view and a winding segment 441D having a substantially I shape in a side view may be used. (a) of FIG. 71 illustrates a state where the winding segments 441C and 441D are separated from the stator core 432, and (b) of FIG. 71 illustrates a state where the winding segments 441C and 441D are assembled to the stator core 432.

In the above-described embodiments, in the winding segment 441, the pair of intermediate conductor portions 442 is provided parallel to each other and parallel to the axial direction, but this may be changed. For example, the pair of intermediate conductor portions 442 may be non-parallel to each other or non-parallel to the axial direction.

The rotary electric machine 400 may be a rotary electric machine having an inner rotor structure instead of the rotary electric machine having an outer rotor structure. In the rotary electric machine having the inner rotor structure, the stator 430 is provided on the outer side in the radial direction, and the rotor 410 is provided on the inner side in the radial direction. In the rotary electric machine having the inner rotor structure, as described in the second embodiment, the transverse section of the intermediate conductor portion 442 preferably have a rectangular shape. Further, the dimension in the radial direction between the intermediate conductor portion 442 and the stator core 432 and the stator core may be different in the circumferential direction at the end surface in the radial direction on the stator core 432 side. In this case, in the configuration in which the stator windings 431 are disposed on the outer side of the stator core 432 in the radial direction (outer rotor type rotary electric machine), the dimension in the radial direction is larger at both ends in the circumferential direction than at the central portion in the circumferential direction. On the other hand, in the configuration in which the stator windings 431 are disposed on the inner side of the stator core 432 in the radial direction (inner rotor type rotary electric machine), the dimension in the radial direction is larger at the central portion in the circumferential direction than at both ends in the circumferential direction.

As the rotary electric machine 400, instead of a revolving-field type rotary electric machine in which a field element is a rotor and an armature is a stator, a revolving armature type rotary electric machine in which an armature is a rotor and a field element is a stator can also be adopted.

The rotary electric machine 400 may be used for an application other than a motor for traveling of a vehicle. The rotary electric machine 400 may be rotary electric machines widely used for moving bodies including aircraft, or a rotary electric machine used for electric equipment for industrial or domestic applications.

The disclosure in this specification is not limited to the exemplified embodiments. The present disclosure includes embodiments described above and modifications of the above-described embodiments made by a person skilled in the art. For example, the present disclosure is not limited to a combination of the components and/or elements described in the embodiments. The present disclosure may be implemented by various different combinations. The present disclosure may include additional configuration that can be added to the above-described embodiments. The present disclosure also includes modifications which include partial components/elements of the above-described embodiments. The present disclosure also includes replacement or combination of components and/or elements between one embodiment and another. The technical scope disclosed in the present disclosure is not limited to the above-described embodiments. It should be understood that part of disclosed technical scope is indicated by recitation of claims, and includes every modification within the equivalent meaning and the recitation of the scope of claims.

What is claimed is:

1. A rotary electric machine comprising:
   a field element having a plurality of magnetic poles having polarities that are alternate in a circumferential direction;
   an armature including an armature winding and an armature core, the armature winding being multi-phase and including a phase winding including a plurality of winding segments for each phase, the armature core being tooth-less, in a cylindrical shape, and opposed to the field element in a radial direction of the armature winding, wherein
   the field element and the armature face each other in the radial direction,
   each of the winding segments includes a pair of intermediate conductor portions and link portions,
   the pair of intermediate conductor portions are provided at a predetermined interval in the circumferential direction,
   the link portions are provided on one end side and an other end side of the pair of intermediate conductor portions in an axial direction, in an annular shape, and connect the pair of intermediate conductor portions,
   the pair of intermediate conductor portions and the link portions include a conductive wire member that is multi-wound,
   in the pair of intermediate conductor portions, rectangular transverse sections of the conductive wire member are arranged in the radial direction and in the circumferential direction, the pair of intermediate conductor portions are provided side by side along a curved surface of an outer peripheral surface of the armature core or a curved surface of an inner peripheral surface of the armature core,
each of the pair of intermediate conductor portions has a rectangular transverse section, and
a dimension between an end surface of the intermediate conductor portion, which is on a side of the armature core in the radial direction, and the armature core in the radial direction differs in the circumferential direction.

2. The rotary electric machine according to claim 1, wherein
the end surface of the intermediate conductor portion, which is on the side of the armature core in the radial direction, is orthogonal to a straight line, which passes through a center position of the intermediate conductor portion in the circumferential direction and an axial center of the rotary electric machine, and
a dimension, which is between a central portion of the end surface in the circumferential direction and the armature core in the radial direction, differs from a dimension, which is between each of ends of the end surface in the circumferential direction and the armature core in the radial direction.

3. The rotary electric machine according to claim 1, wherein
a sealing member having an insulation property is interposed between the armature core and the end surface of the intermediate conductor portion in the radial direction, and
a thermal conductivity of the sealing member is higher than a thermal conductivity of an insulating film of the conductive wire member.

4. The rotary electric machine according to claim 1, wherein
the winding segments include an inner bent winding in which at least one of the link portions at both ends in the axial direction is bent inward in the radial direction, and
in the inner bent winding, each of the link portions includes a pair of base end portions extending in the radial direction and a connecting portion extending in the circumferential direction between the pair of base end portions, and
a central portion of the connecting portion is curved to protrude outward in the radial direction or to protrude in the axial direction.

5. The rotary electric machine according to claim 1, wherein
the armature winding is a three-phase winding,
in each of the winding segments, the pair of intermediate conductor portions are provided apart from each other at an interval of full pitch winding, one of intermediate conductor portions of the winding segment of an other of two phases and one of intermediate conductor portions of the winding segment of an other of the two phases are provided between the pair of intermediate conductor portions, and the link portion of at least one of two winding segments, in which the link portions overlap each other in the circumferential direction, is bent in the radial direction to avoid interference between the two winding segments, and
a fixing portion is provided on an inner side of a curved portion of the link portion, which is bent in the radial direction and extends in the radial direction, to fix the winding segment to the armature core or to an integrated object integrated with the armature core.

6. The rotary electric machine according to claim 1, wherein
the field element is of a surface permanent magnet type and includes magnets whose number corresponds to a number of poles in the circumferential direction, and
a diameter of the armature winding is "$\varphi 40$ mm to $\varphi 100$ mm"$\times n$, where a number of the magnetic poles of the rotary electric machine is $4n$, a number of the winding segments is $6n$, and $n$ is a natural number.

7. The rotary electric machine according to claim 1, wherein
the field element is of a surface permanent magnet type and includes magnets whose number corresponds to a number of poles in the circumferential direction, and
$W/Lg=2.5$ to 7 is satisfied, where $W$ represents a width of the magnet of one pole in the circumferential direction, and $Lg$ represents a distance between one of the magnets and the armature core in the radial direction.

8. The rotary electric machine according to claim 1, wherein
the field element is of a surface permanent magnet type and includes magnets whose number corresponds to a number of poles in the circumferential direction, and
in each of the magnets, a direction of an easy axis of magnetization is
oriented such that the easy axis of magnetization is in parallel to a d-axis, which is a magnetic pole center, on a side of the d-axis, as compared with the easy axis of magnetization on a side of a q-axis, which is a magnetic pole boundary, or
inclined with respect to a pair of acting surfaces, which are inflow and outflow surfaces of a magnetic flux and face each other, and a direction of inclination thereof is inclined with respect to the d-axis such that the easy axis of magnetization approaches the d-axis on a side of the armature winding.

* * * * *